(12) United States Patent
Tsukamoto et al.

(10) Patent No.: US 12,078,564 B2
(45) Date of Patent: Sep. 3, 2024

(54) THREE-AXIS SENSOR, SENSOR MODULE, AND ELECTRONIC APPARATUS

(71) Applicant: Sony Group Corporation, Tokyo (JP)

(72) Inventors: Kei Tsukamoto, Tokyo (JP); Ken Kobayashi, Tokyo (JP); Tetsuro Goto, Tokyo (JP); Yoshiaki Sakakura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 244 days.

(21) Appl. No.: 17/777,668

(22) PCT Filed: Nov. 17, 2020

(86) PCT No.: PCT/JP2020/042771
§ 371 (c)(1),
(2) Date: May 18, 2022

(87) PCT Pub. No.: WO2021/100697
PCT Pub. Date: May 27, 2021

(65) Prior Publication Data
US 2022/0412825 A1    Dec. 29, 2022

(30) Foreign Application Priority Data

Nov. 18, 2019   (JP) ................................ 2019-208156

(51) Int. Cl.
*G01L 5/165*   (2020.01)
*G01L 1/14*    (2006.01)
(Continued)

(52) U.S. Cl.
CPC .............. *G01L 5/165* (2013.01); *G01L 1/142* (2013.01); *G06F 3/041* (2013.01); *G06F 3/044* (2013.01)

(58) Field of Classification Search
CPC ......... G01L 5/165; G01L 1/142; G06F 3/041; G06F 3/044
See application file for complete search history.

(56) References Cited

U.S. PATENT DOCUMENTS

2014/0298921 A1   10/2014  Surapaneni
2015/0055308 A1    2/2015  Lim
(Continued)

FOREIGN PATENT DOCUMENTS

JP    2010122018 A    6/2010
JP    2016205942 A   12/2016
(Continued)

OTHER PUBLICATIONS

International Search Report from corresponding PCT application PCT/JP2020/042771, dated Feb. 9, 2021.

*Primary Examiner* — Peter J Macchiarolo
*Assistant Examiner* — John M Royston
(74) *Attorney, Agent, or Firm* — K&L Gates LLP

(57) ABSTRACT

A three-axis sensor includes: a first detection layer having a first surface, and a second surface on side opposite to the first surface, and including a first sensing section of a capacitive type; a second detection layer having a first surface opposed to the second surface of the first detection layer, and including a second sensing section of the capacitive type; a first electrically conductive layer provided to be opposed to the first surface of the first detection layer; a second electrically conductive layer provided between the first detection layer and the second detection layer; a separation layer provided between the first detection layer and the second electrically conductive layer to separate the first detection layer and the second electrically conductive layer from each other; a first deformation layer that is provided between the first electrically conductive layer and the first detection layer, and is elastically deformed in accordance with pressure acting in a (Continued)

thickness direction of a sensor; and a second deformation layer that is provided between the second electrically conductive layer and the second detection layer, and is elastically deformed in accordance with pressure acting in the thickness direction of the sensor. A 25% CLD value of the separation layer is 10 or more times a 25% CLD value of the first deformation layer, and the 25% CLD value of the separation layer is 10 or more times a 25% CLD value of the second deformation layer.

20 Claims, 36 Drawing Sheets

(51) Int. Cl.
    *G06F 3/041*     (2006.01)
    *G06F 3/044*     (2006.01)

(56) References Cited

U.S. PATENT DOCUMENTS

| | | |
|---|---|---|
| 2018/0073942 A1 | 3/2018 | Wu |
| 2018/0356299 A1 | 12/2018 | Watazu et al. |
| 2019/0212844 A1 | 7/2019 | Leigh et al. |
| 2021/0285831 A1 | 9/2021 | Hotta |

FOREIGN PATENT DOCUMENTS

| | | | |
|---|---|---|---|
| JP | 2017156126 A | 9/2017 | |
| JP | 2018085097 A | 5/2018 | |
| WO | 2018061416 A1 | 4/2018 | |
| WO | WO-2018151268 A1 * | 8/2018 | ........... B32B 15/046 |

* cited by examiner

[ FIG. 1 ]
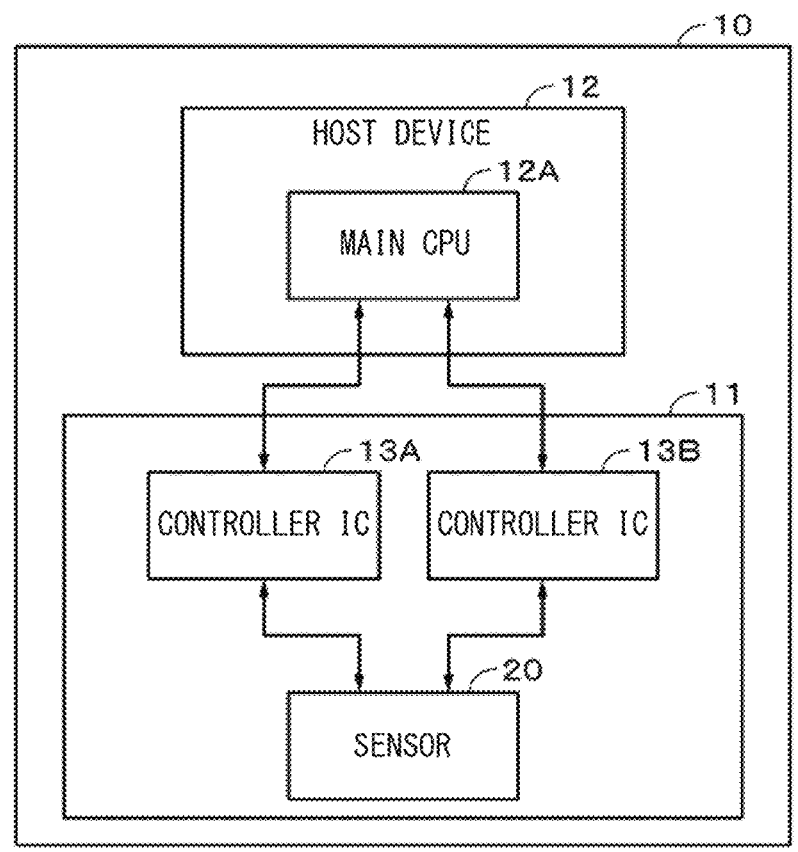

[FIG. 2]
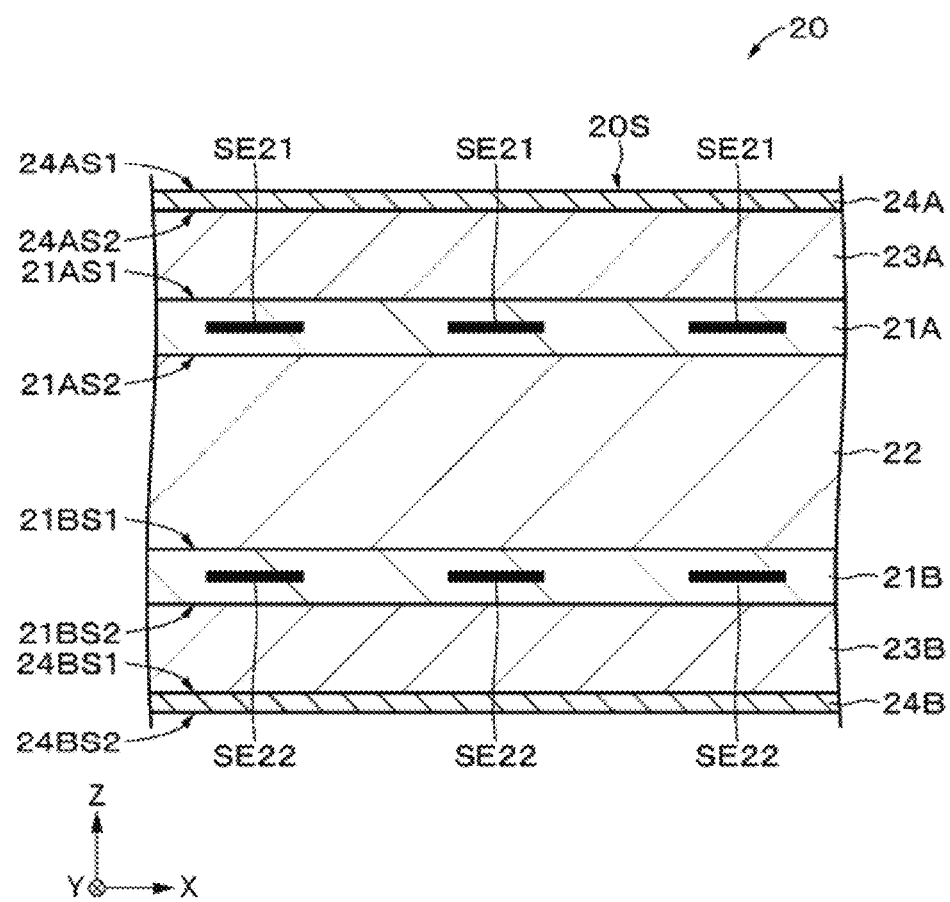

[FIG. 3]
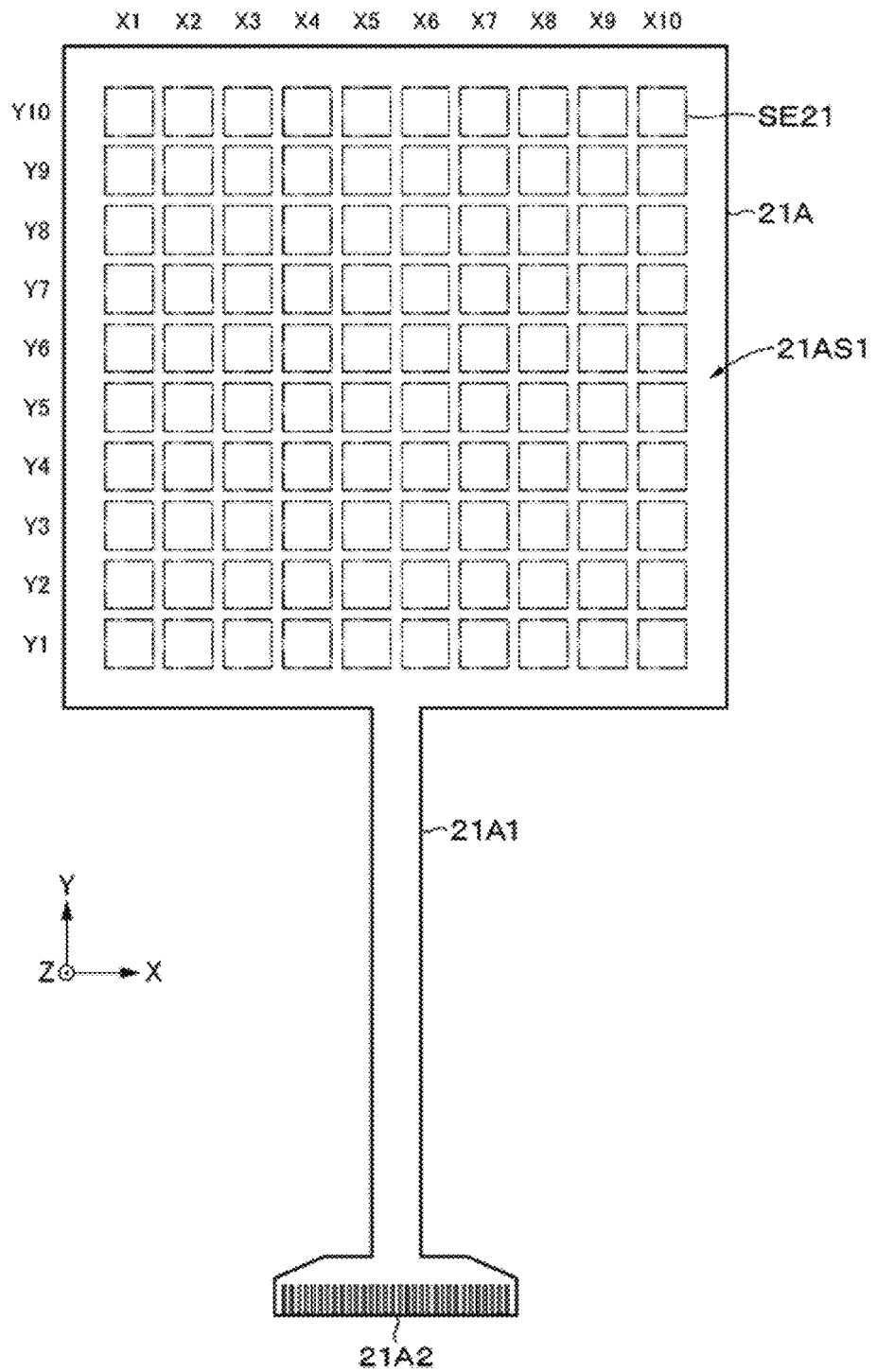

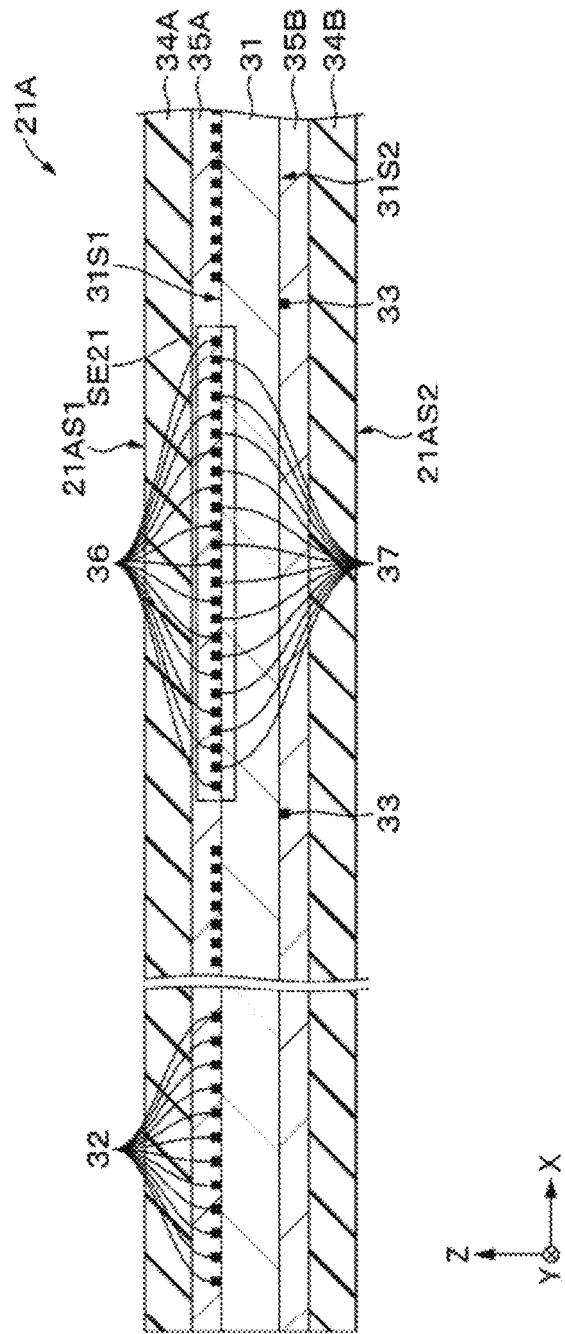
[FIG. 4]

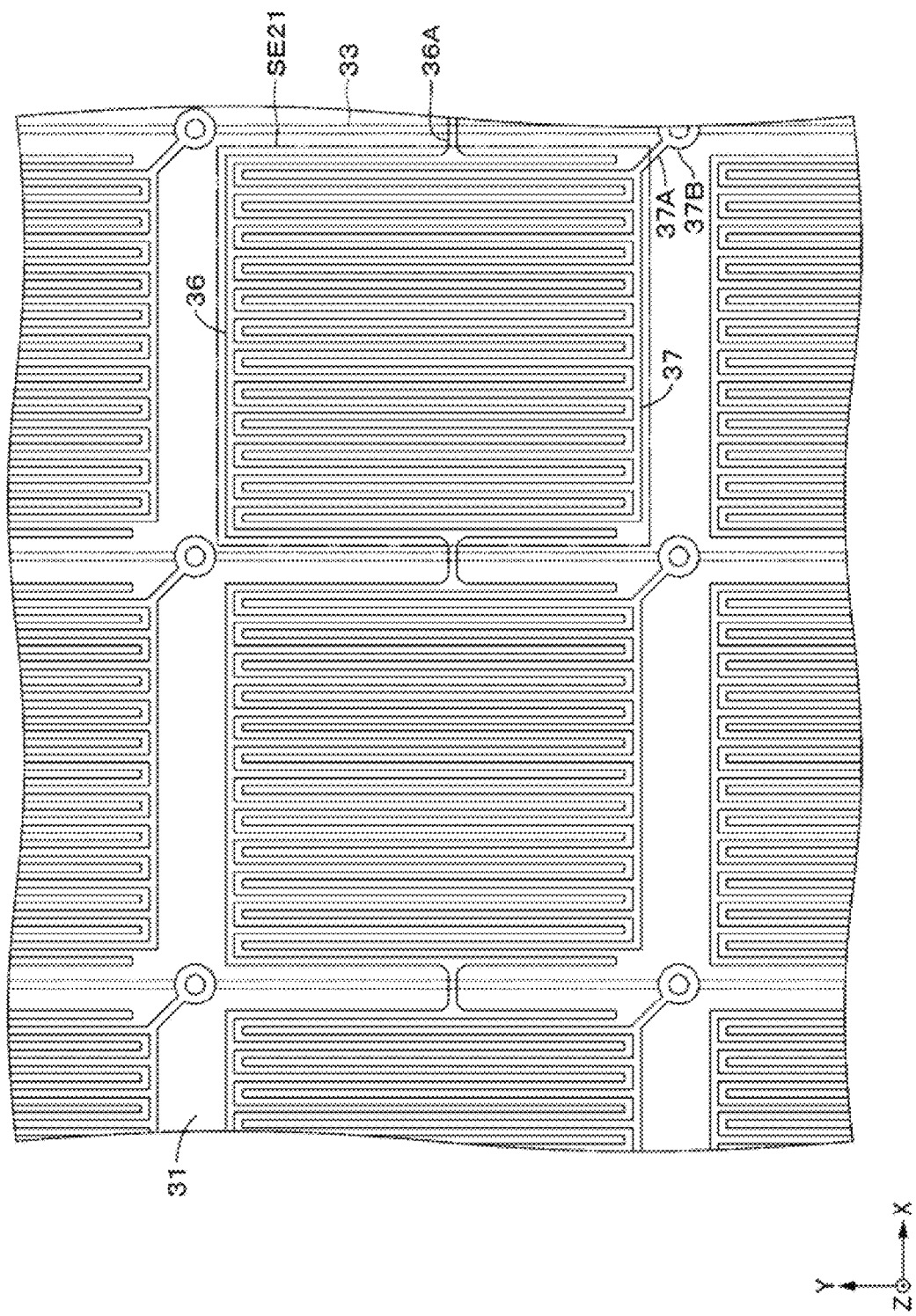
[FIG. 5]

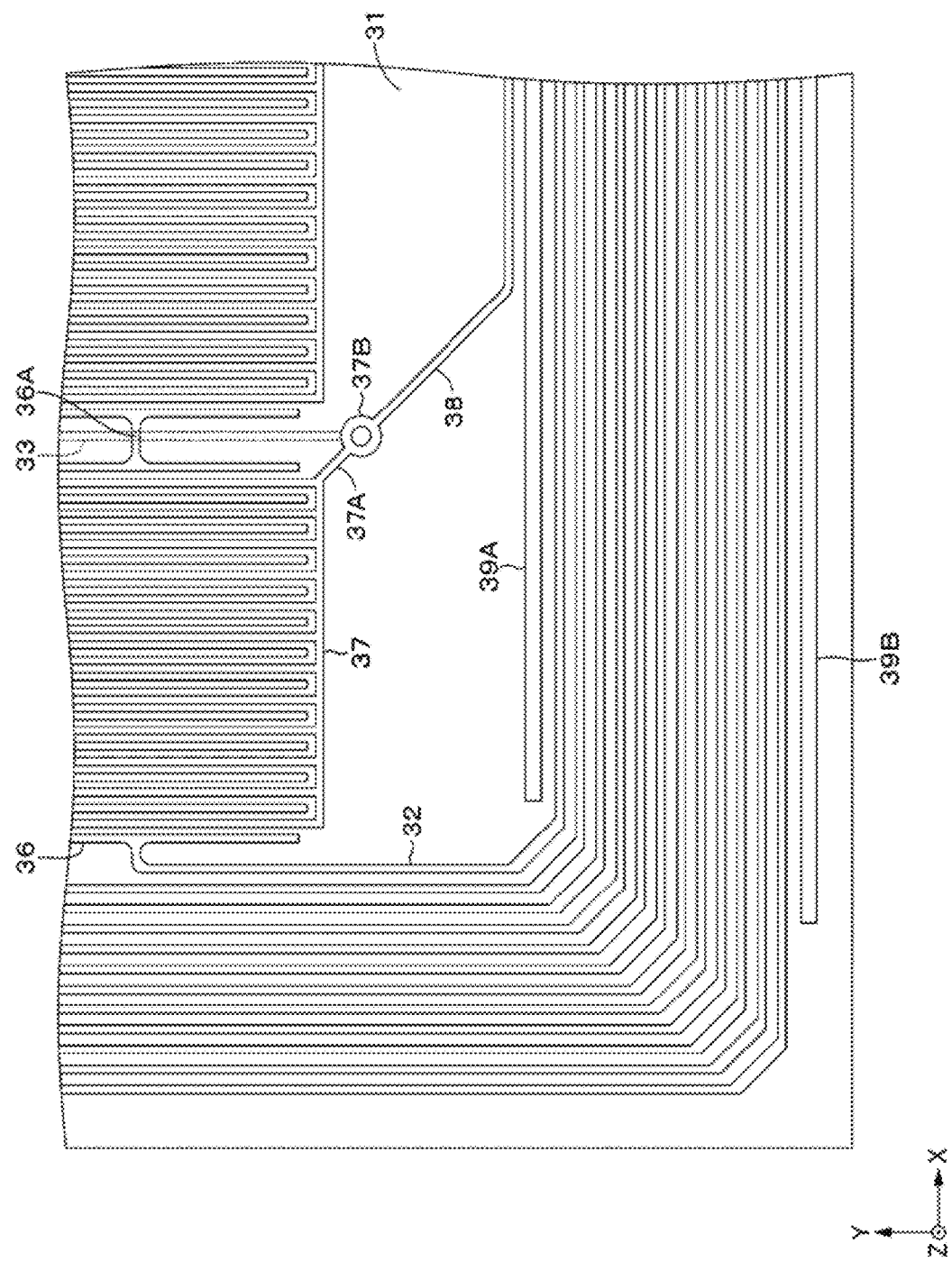

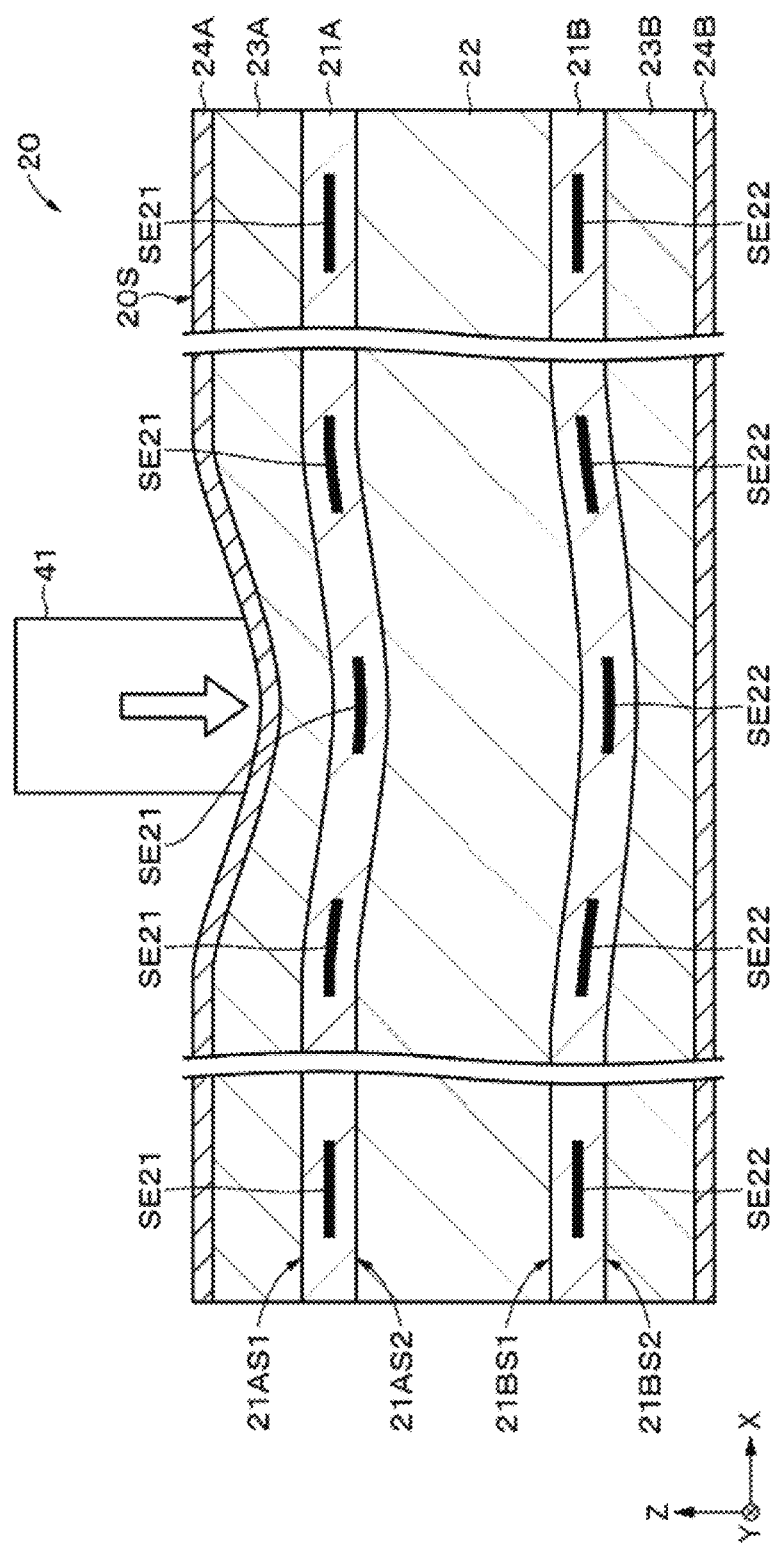

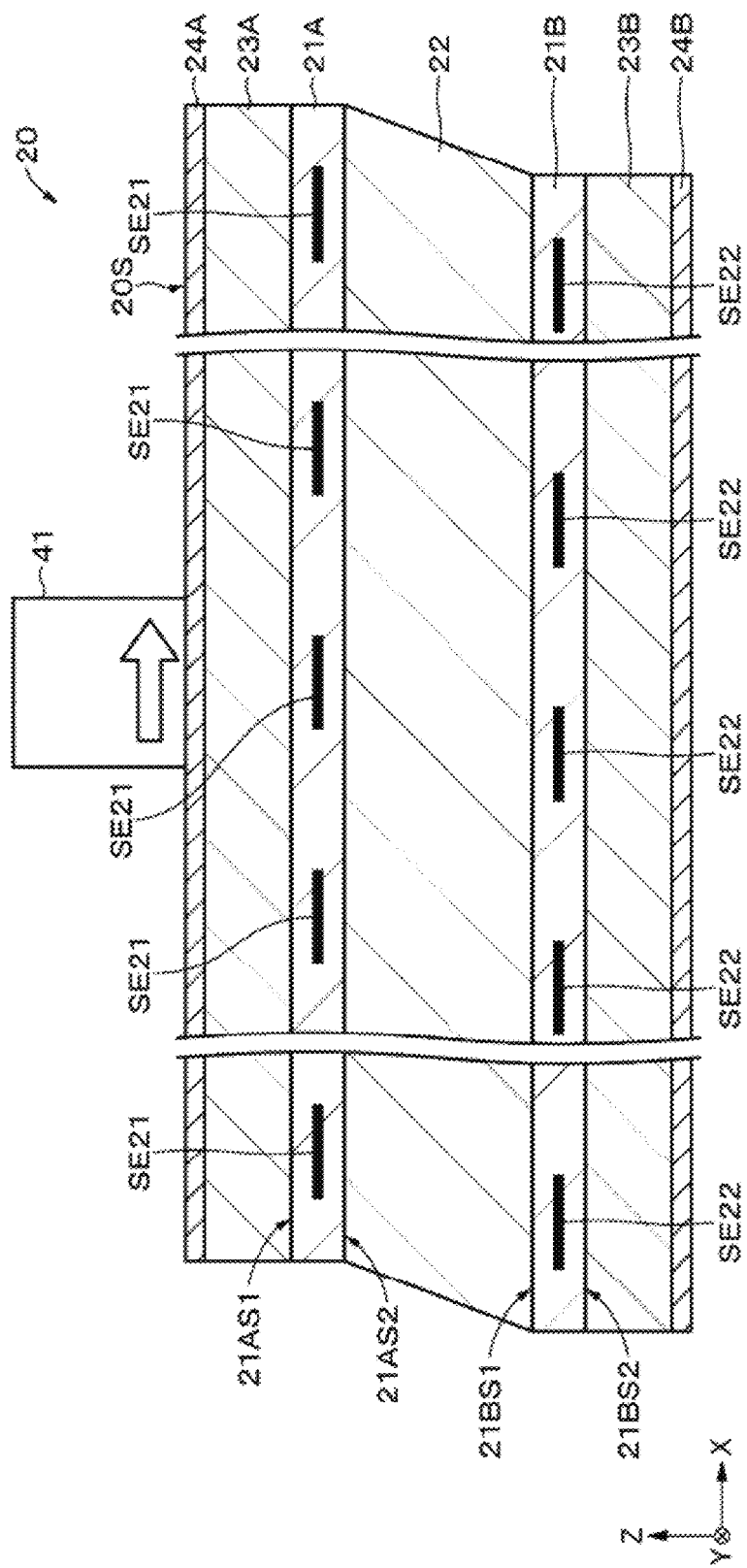

[FIG. 9]
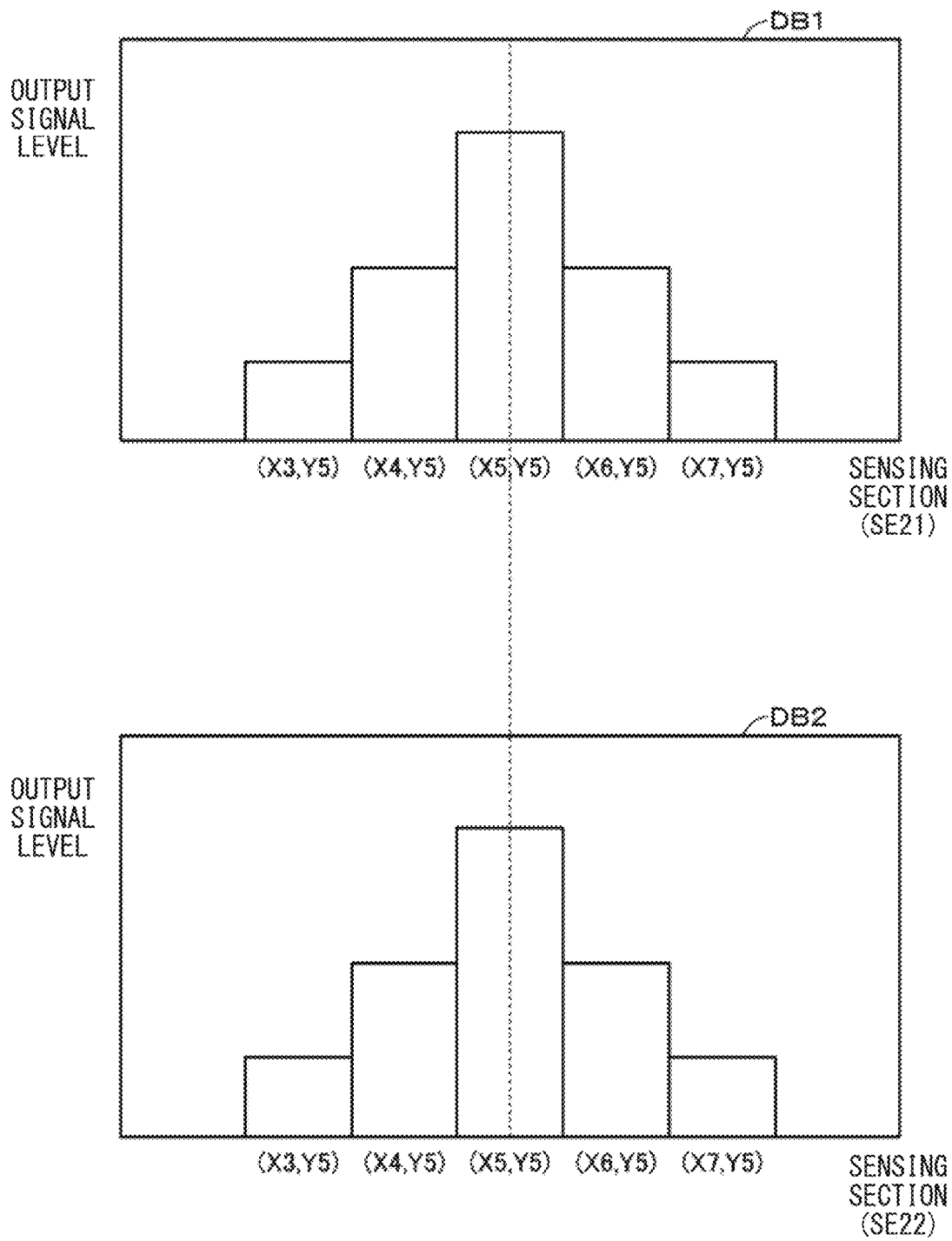

[ FIG. 10 ]
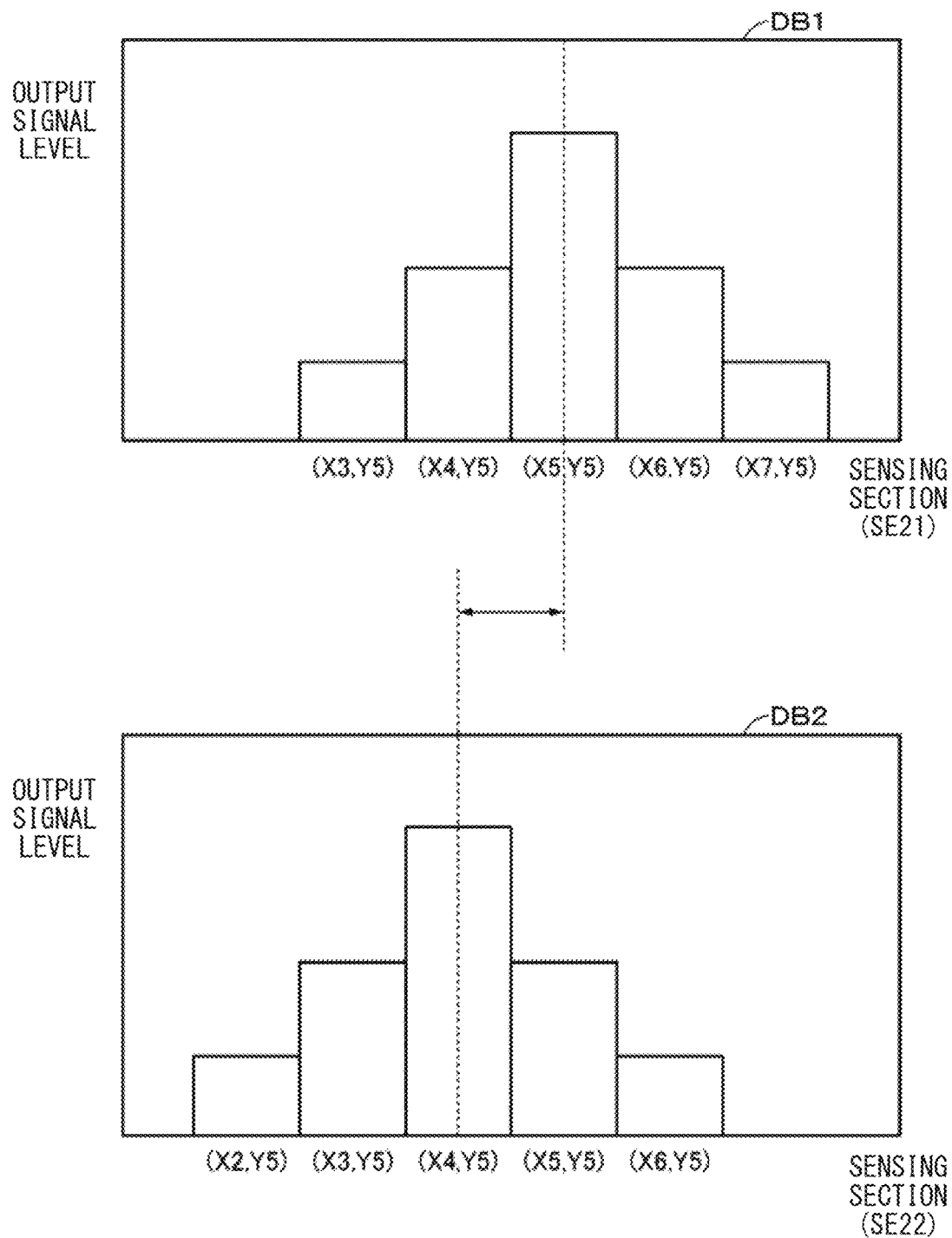

[ FIG. 11 ]
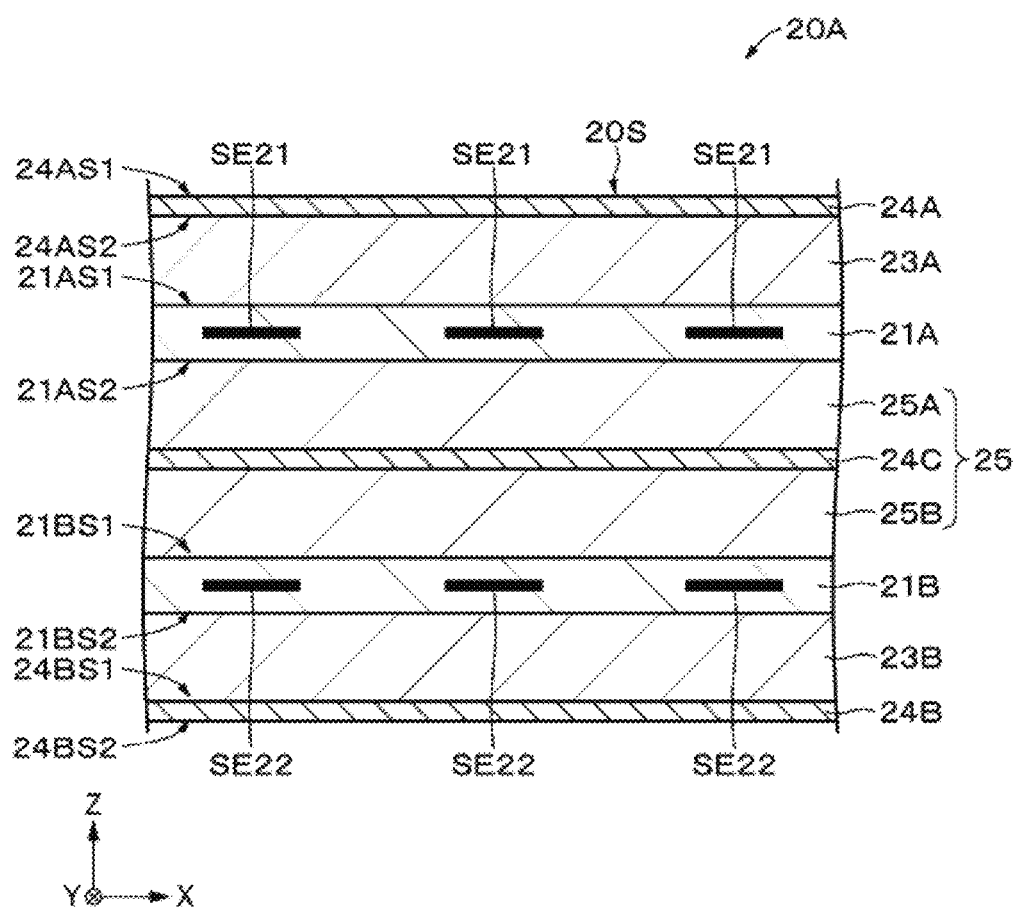

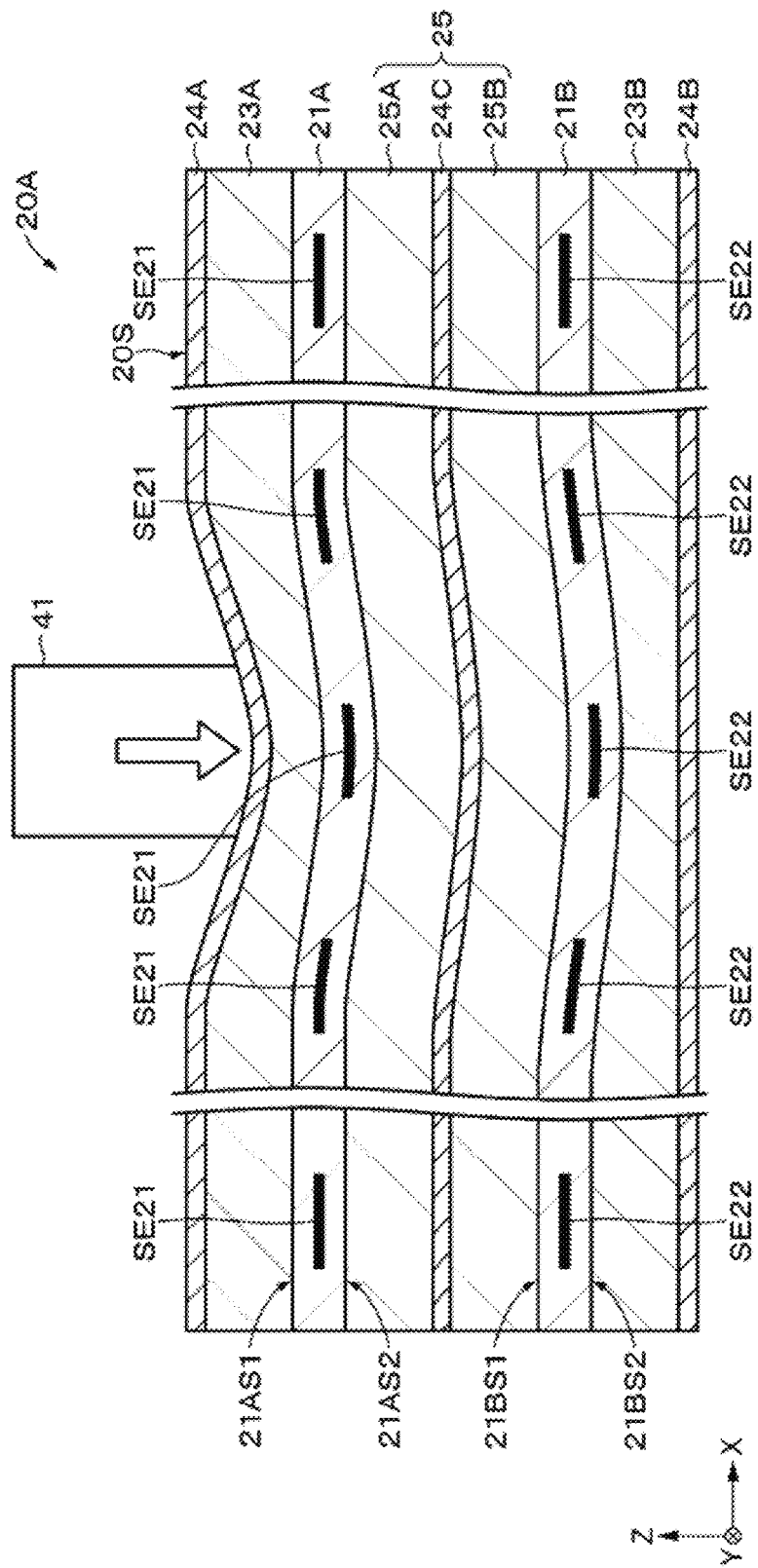
[FIG. 12]

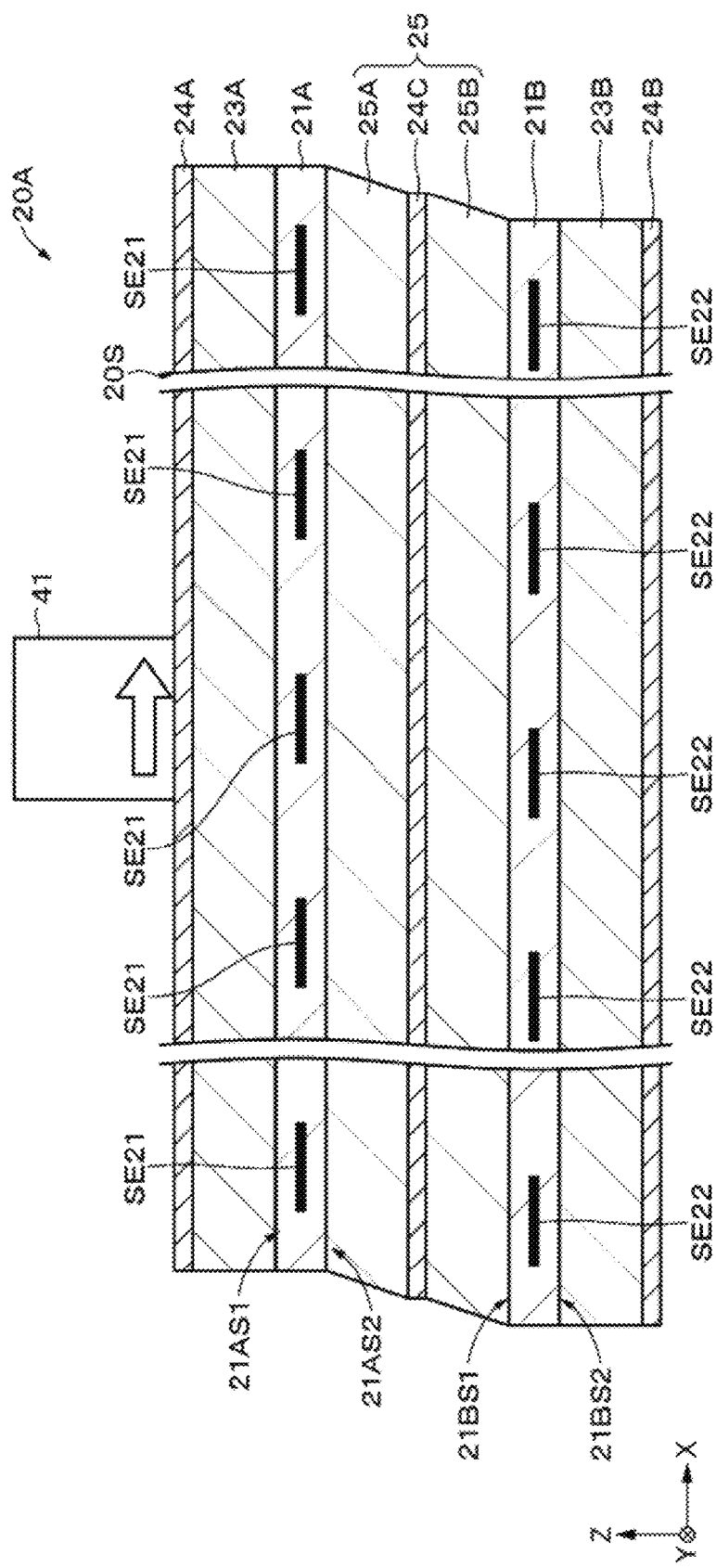
[FIG. 13]

[FIG. 14]
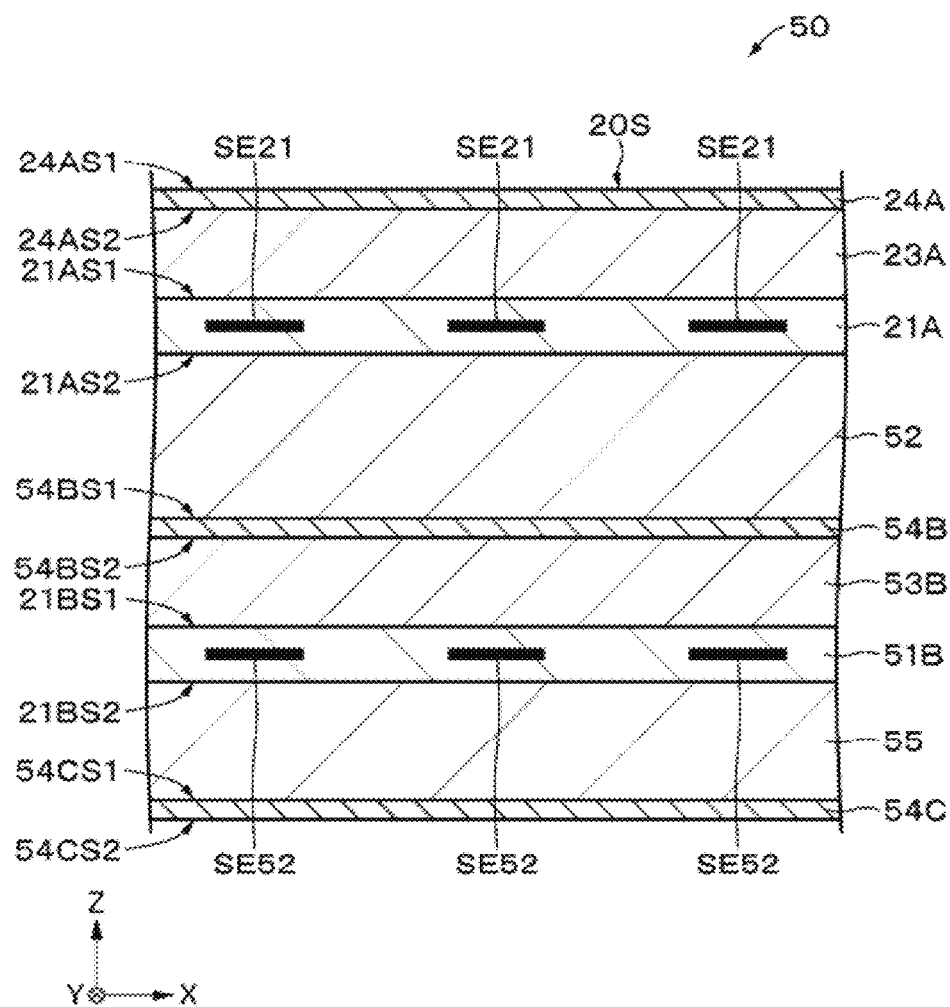

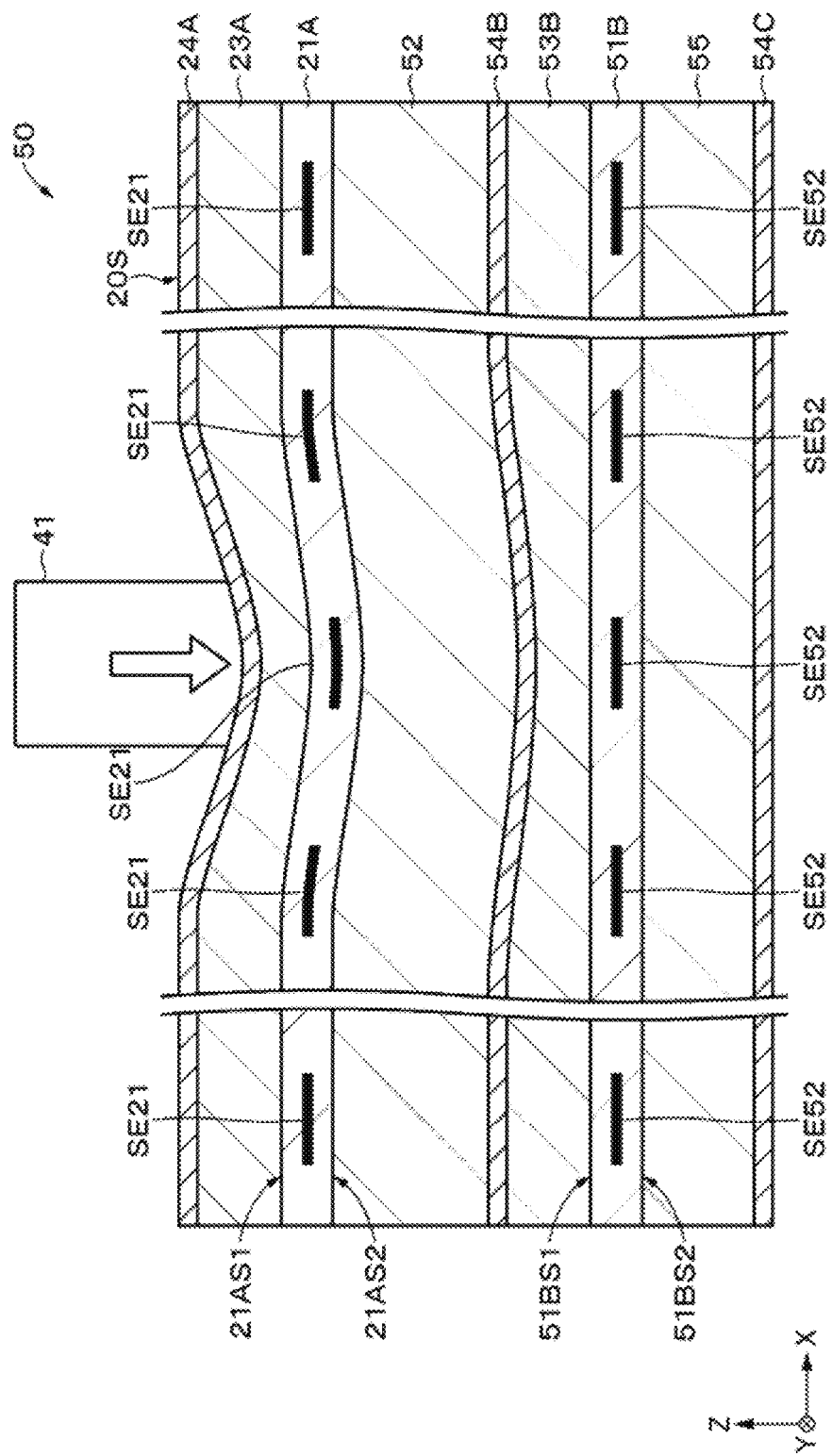
[FIG. 15]

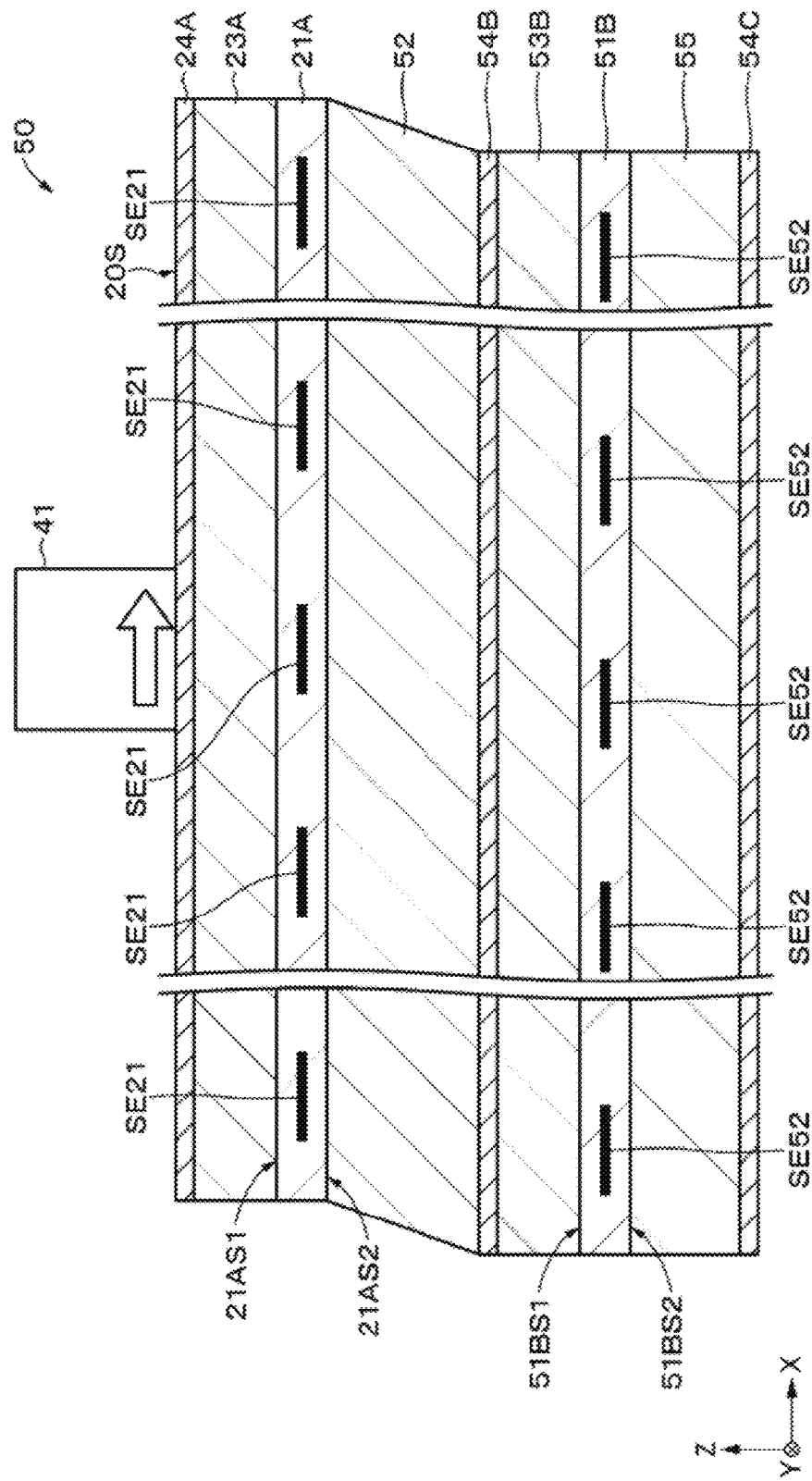
[FIG. 16]

[FIG. 17]
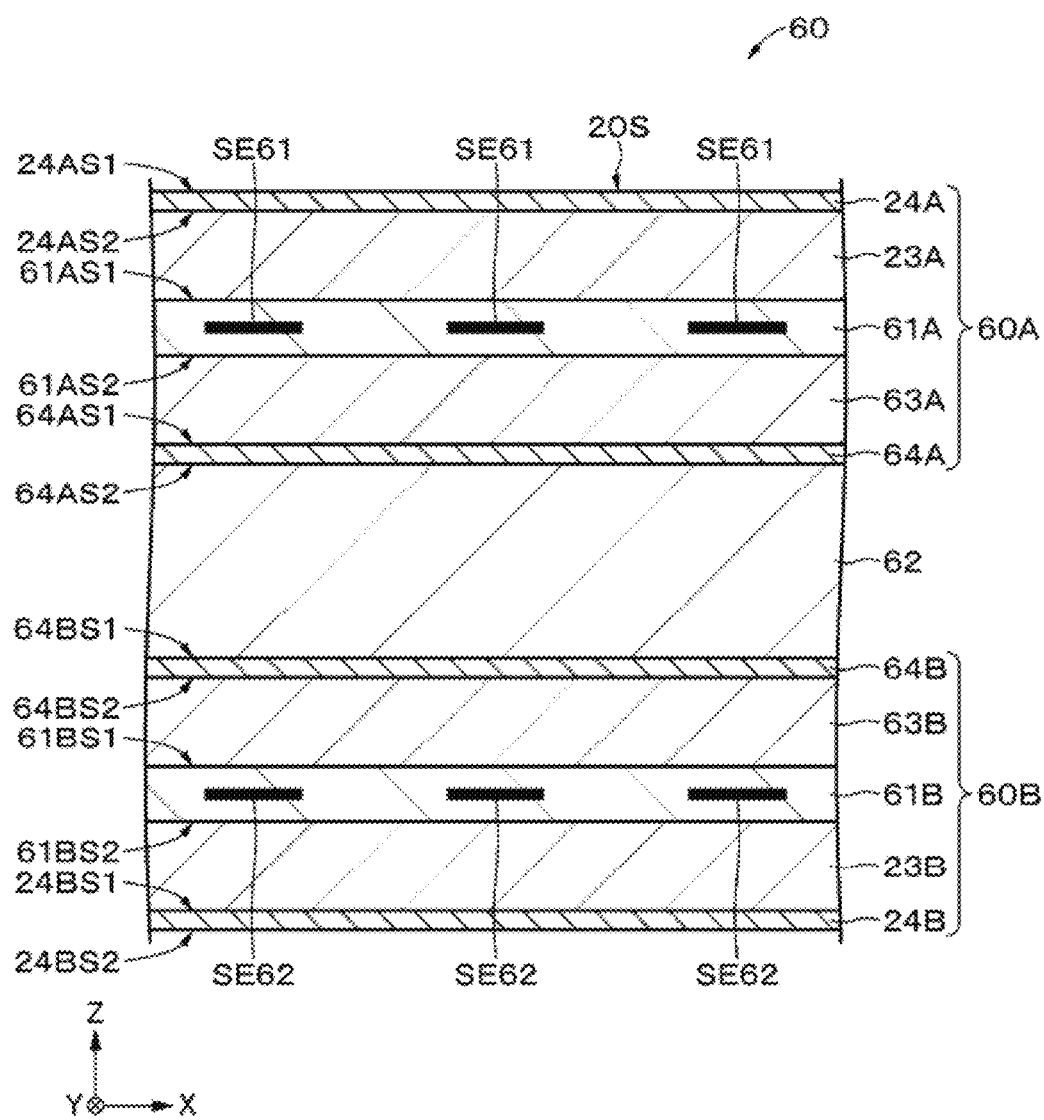

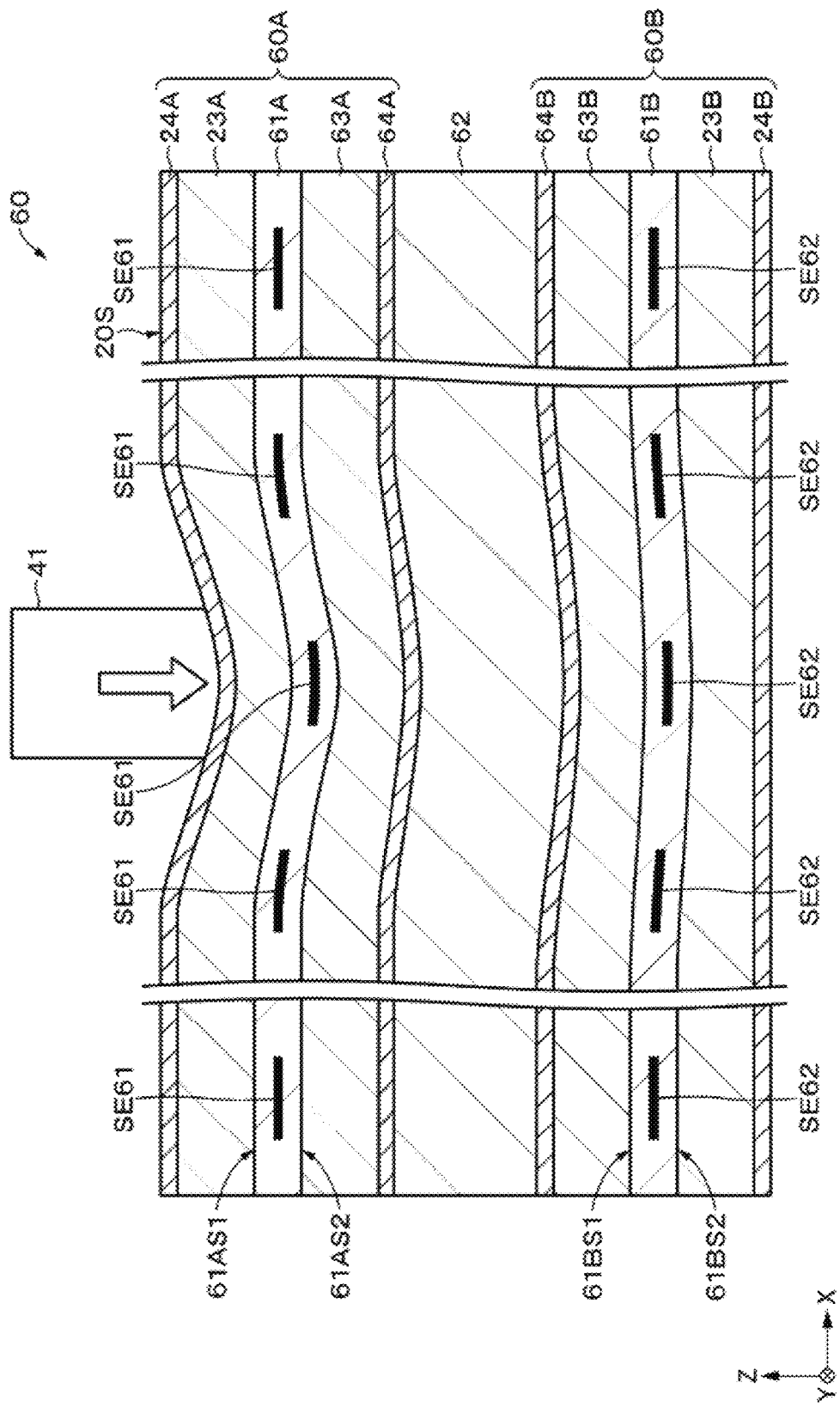
[FIG. 18]

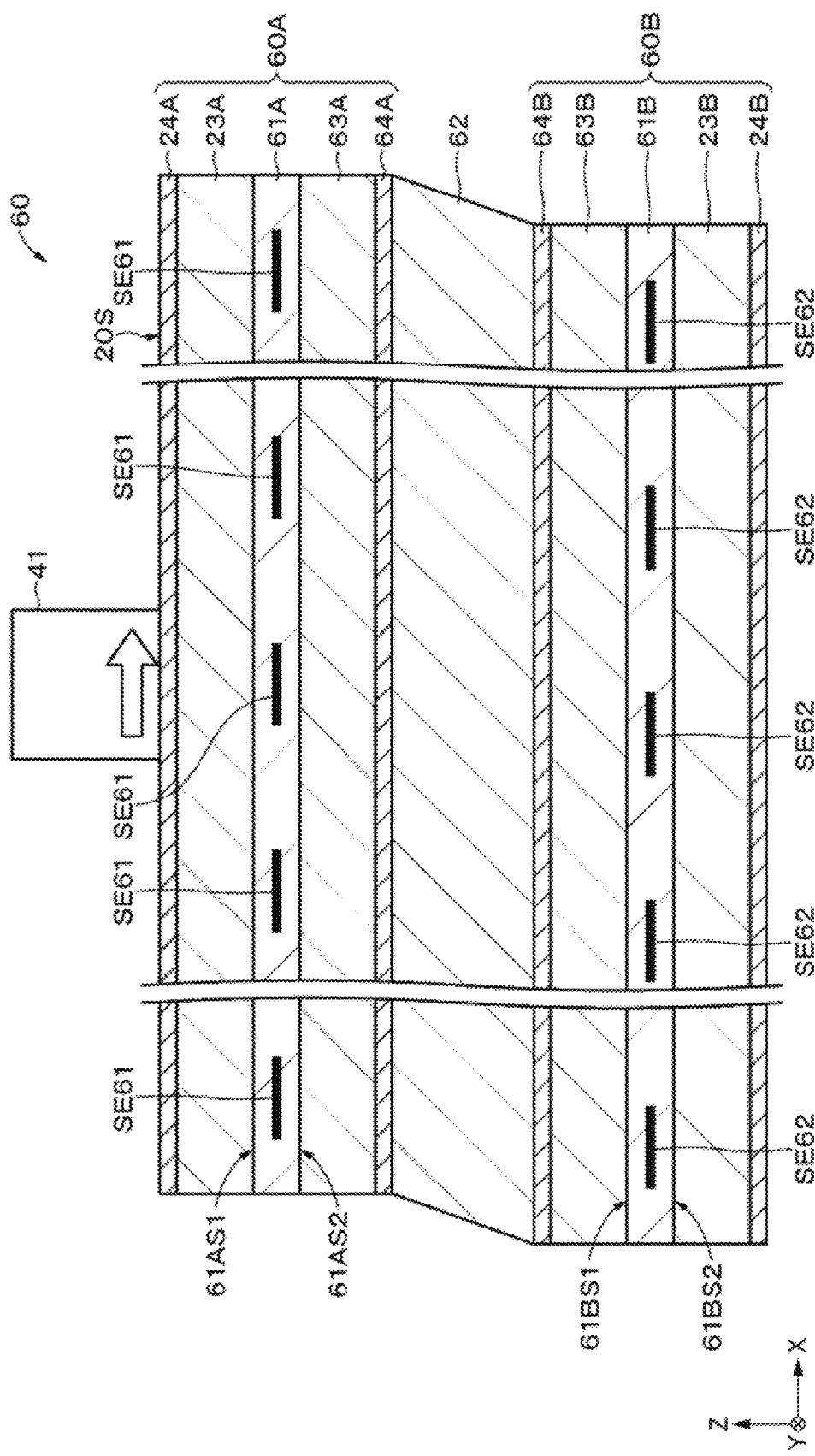

[FIG. 20]
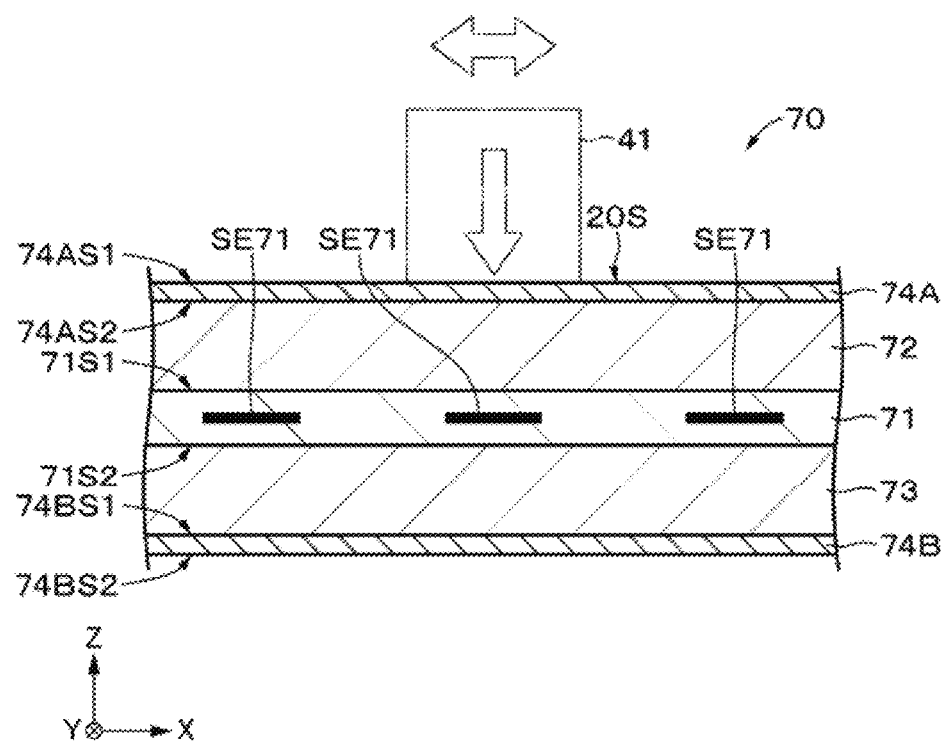

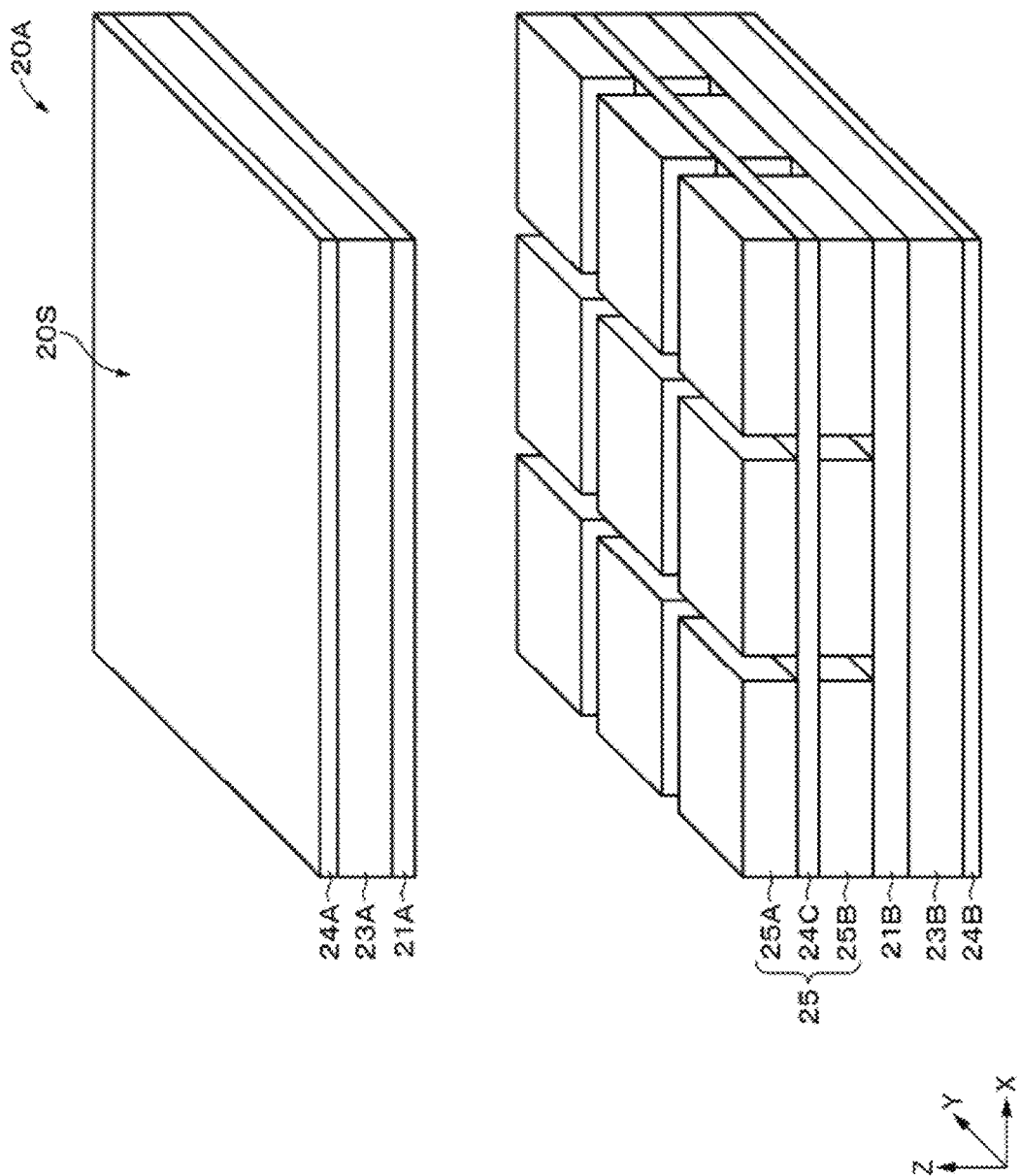

[FIG. 22]
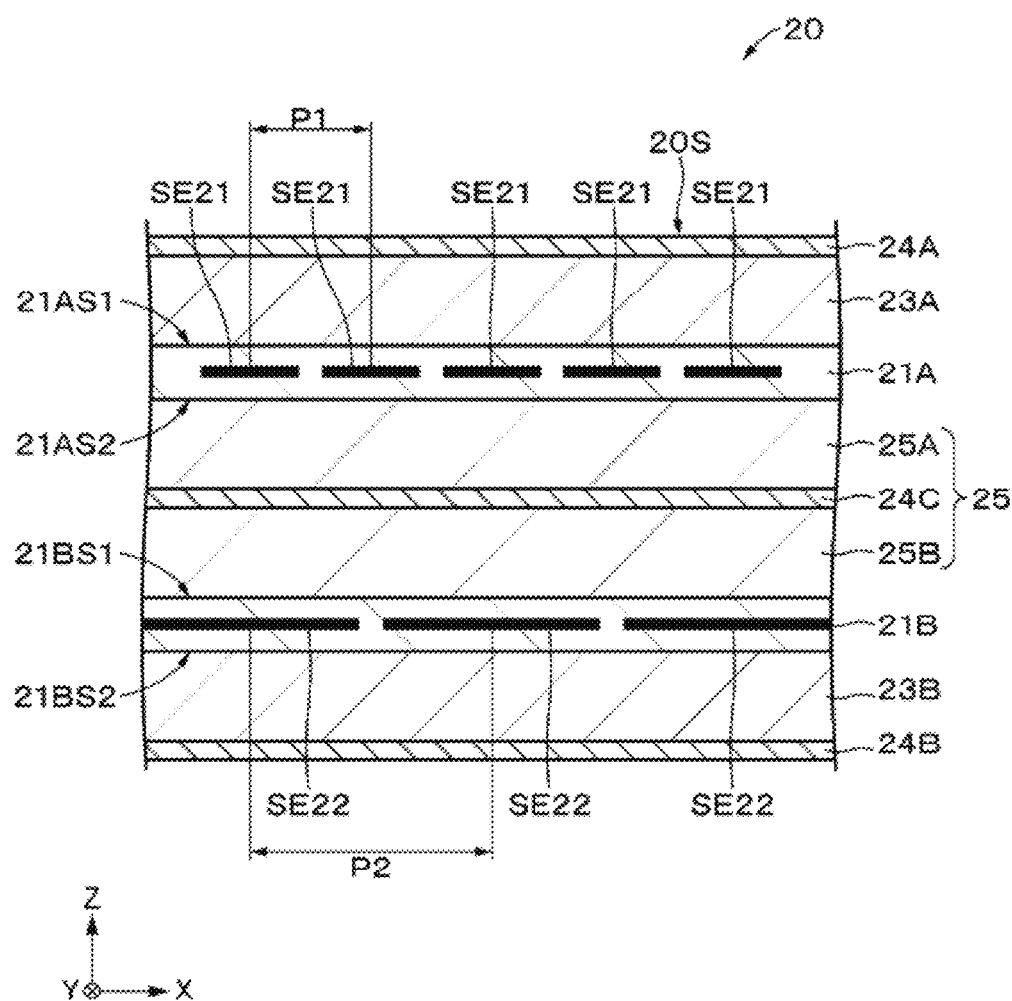

[FIG. 23]
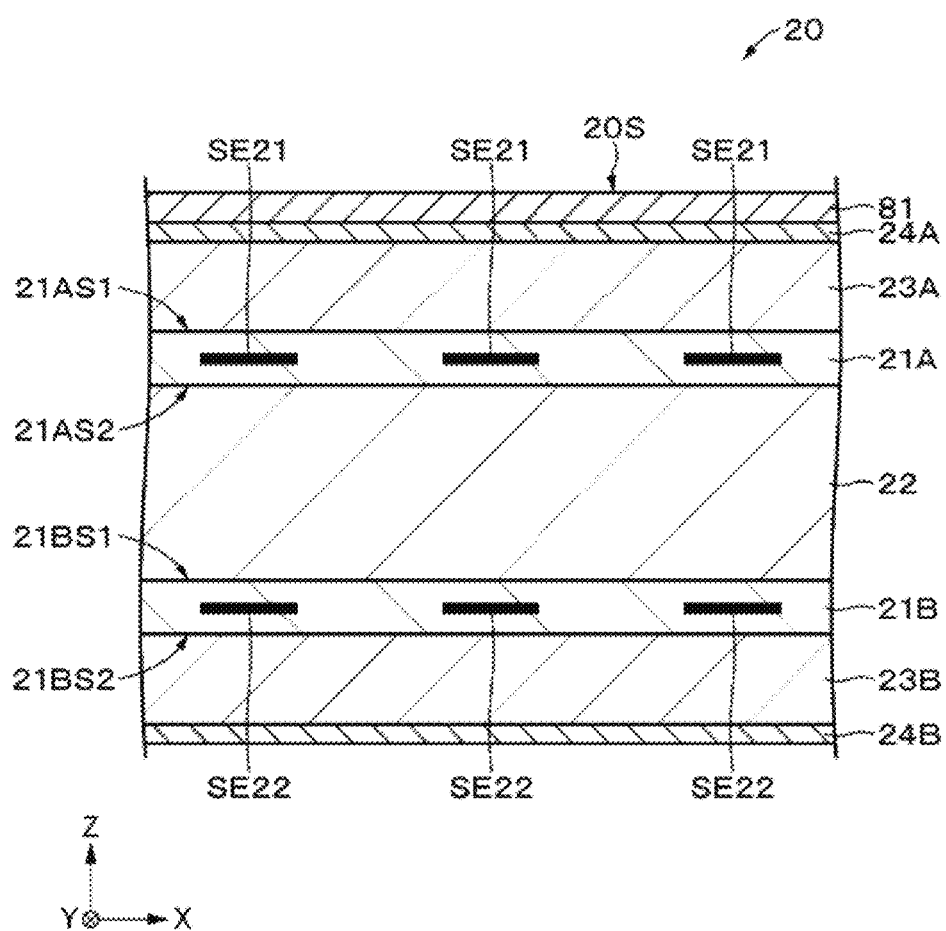

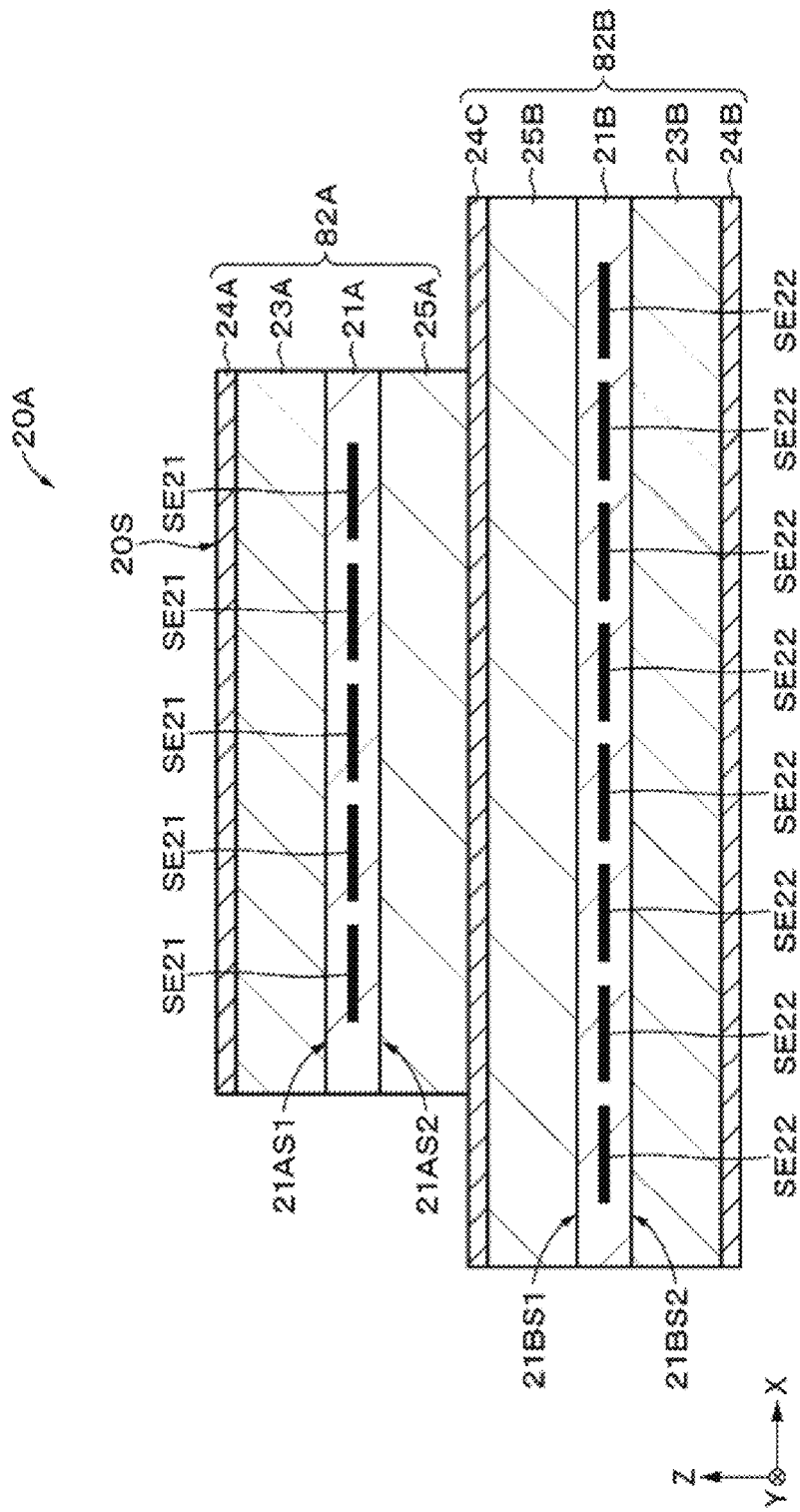

[FIG. 25]
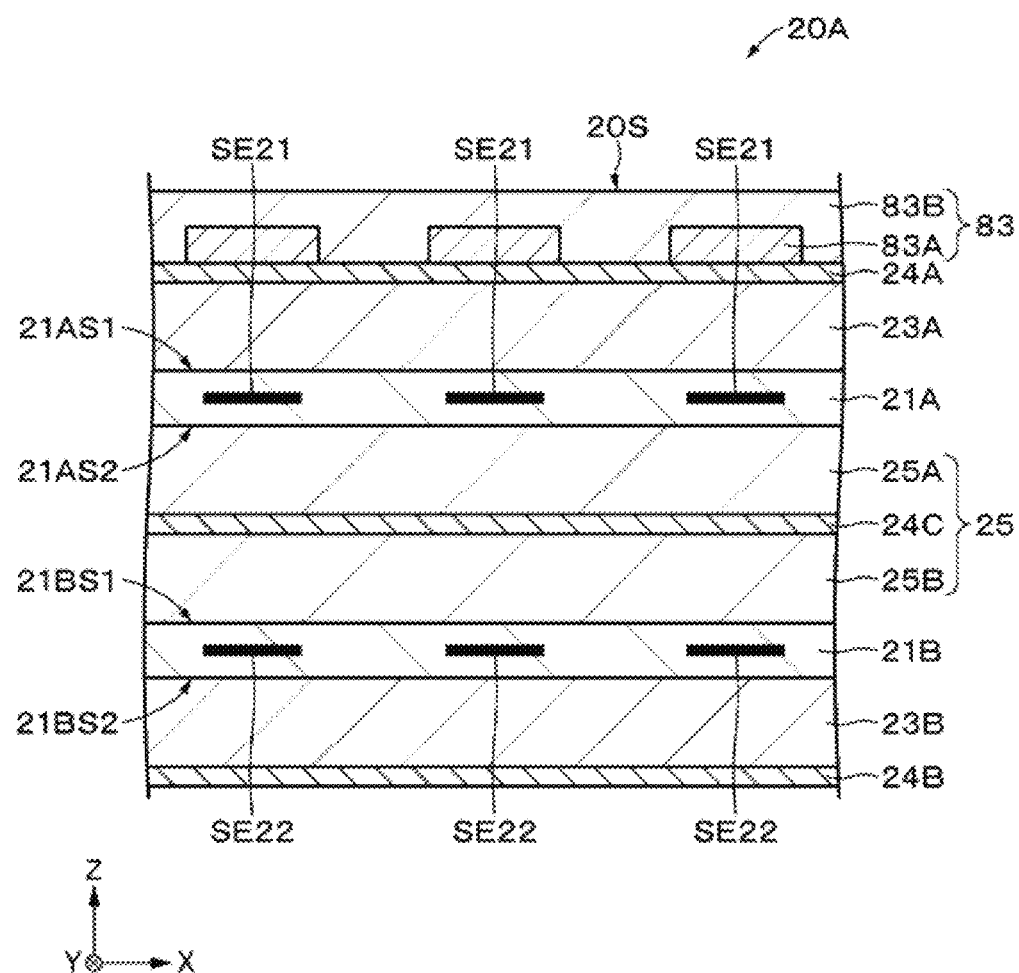

[ FIG. 26 ]
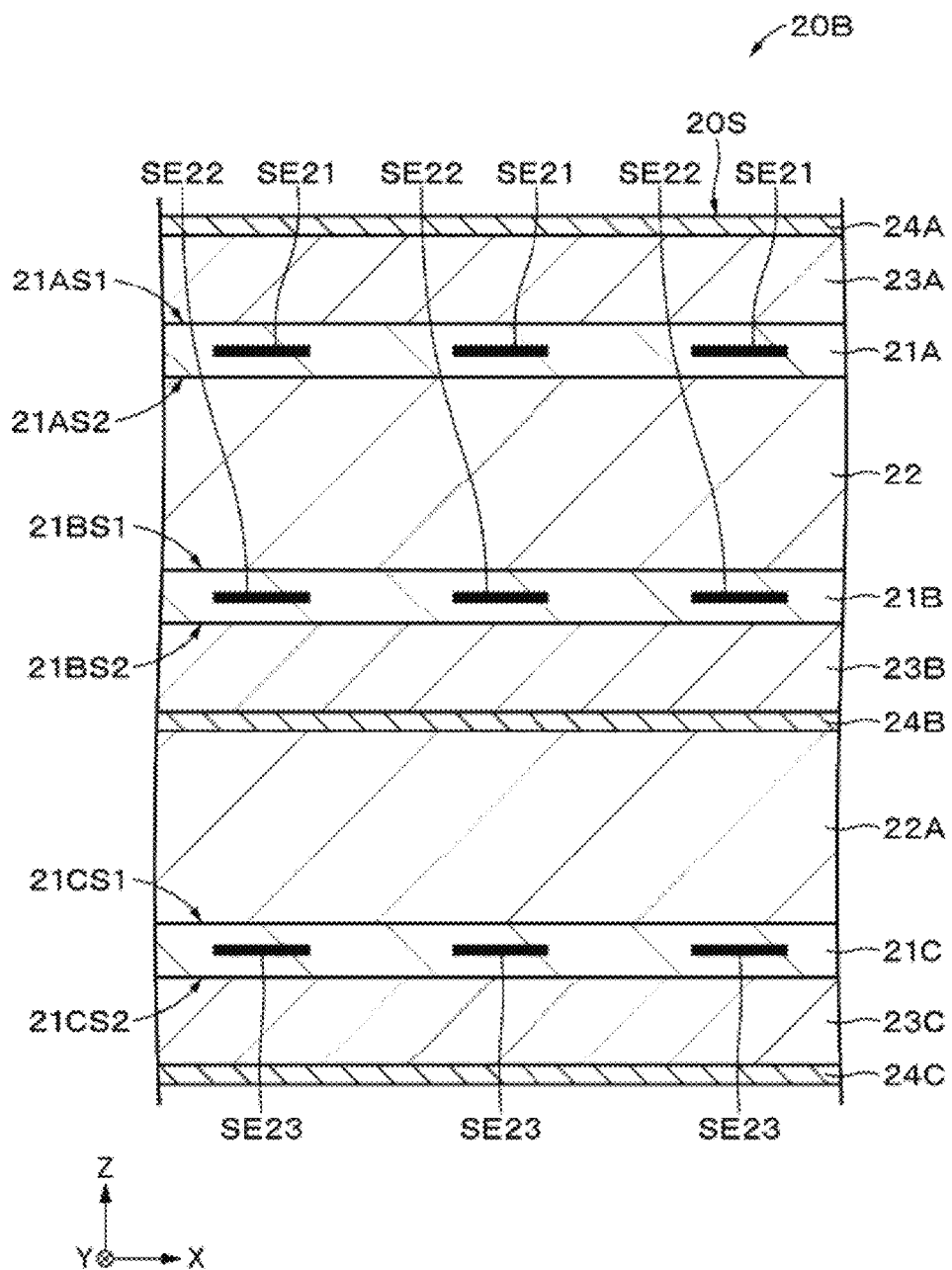

[ FIG. 27 ]
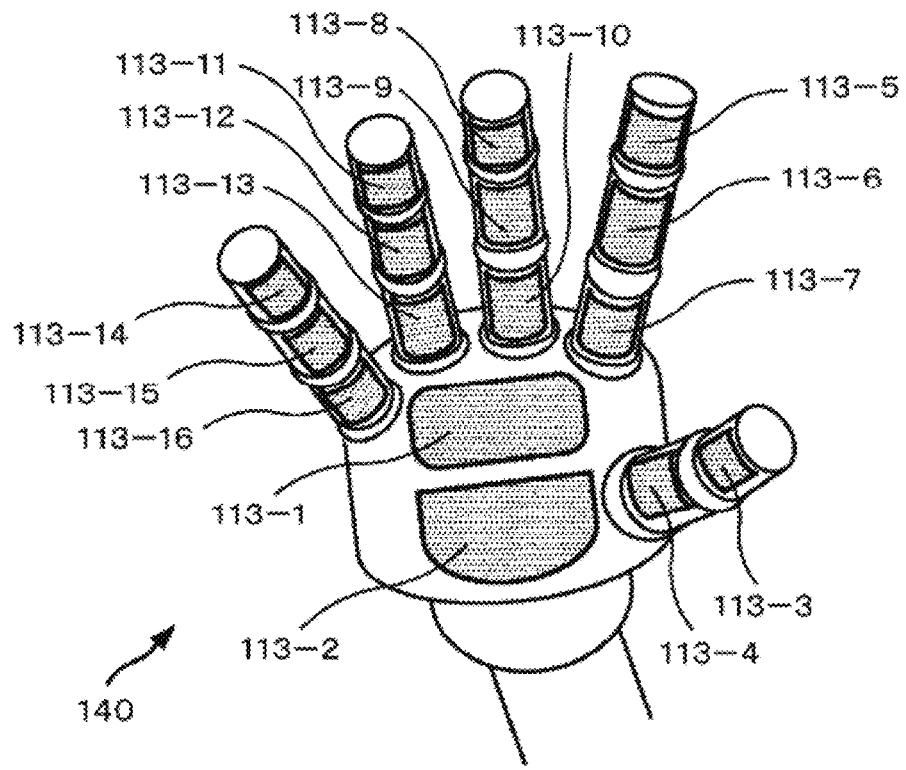
[ FIG. 28 ]
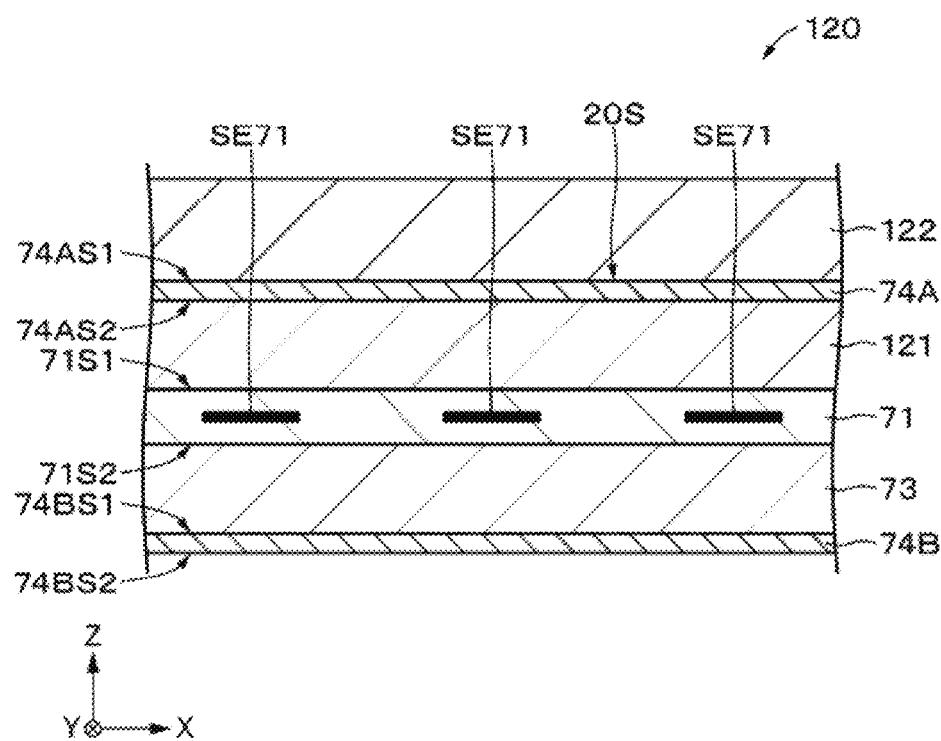

[ FIG. 29 ]
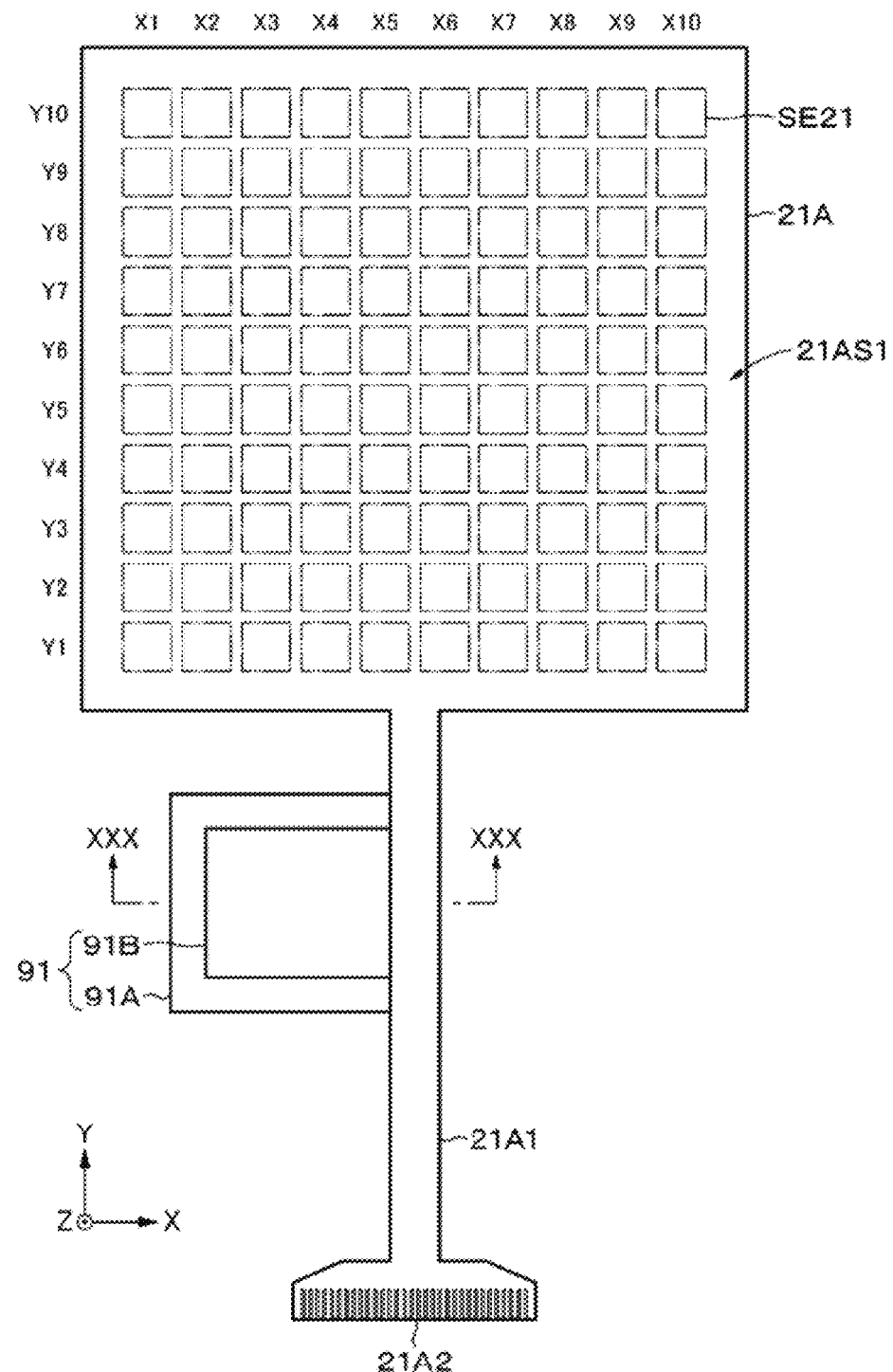

[ FIG. 30 ]
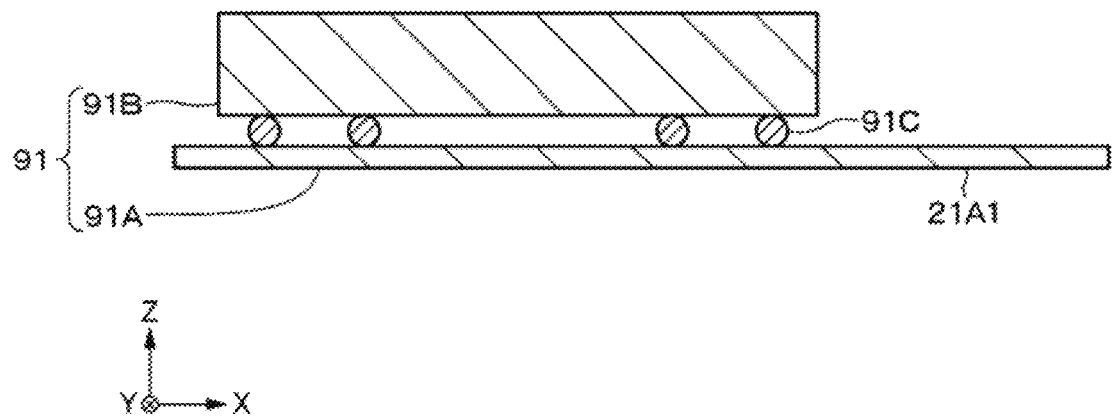

[FIG. 31]
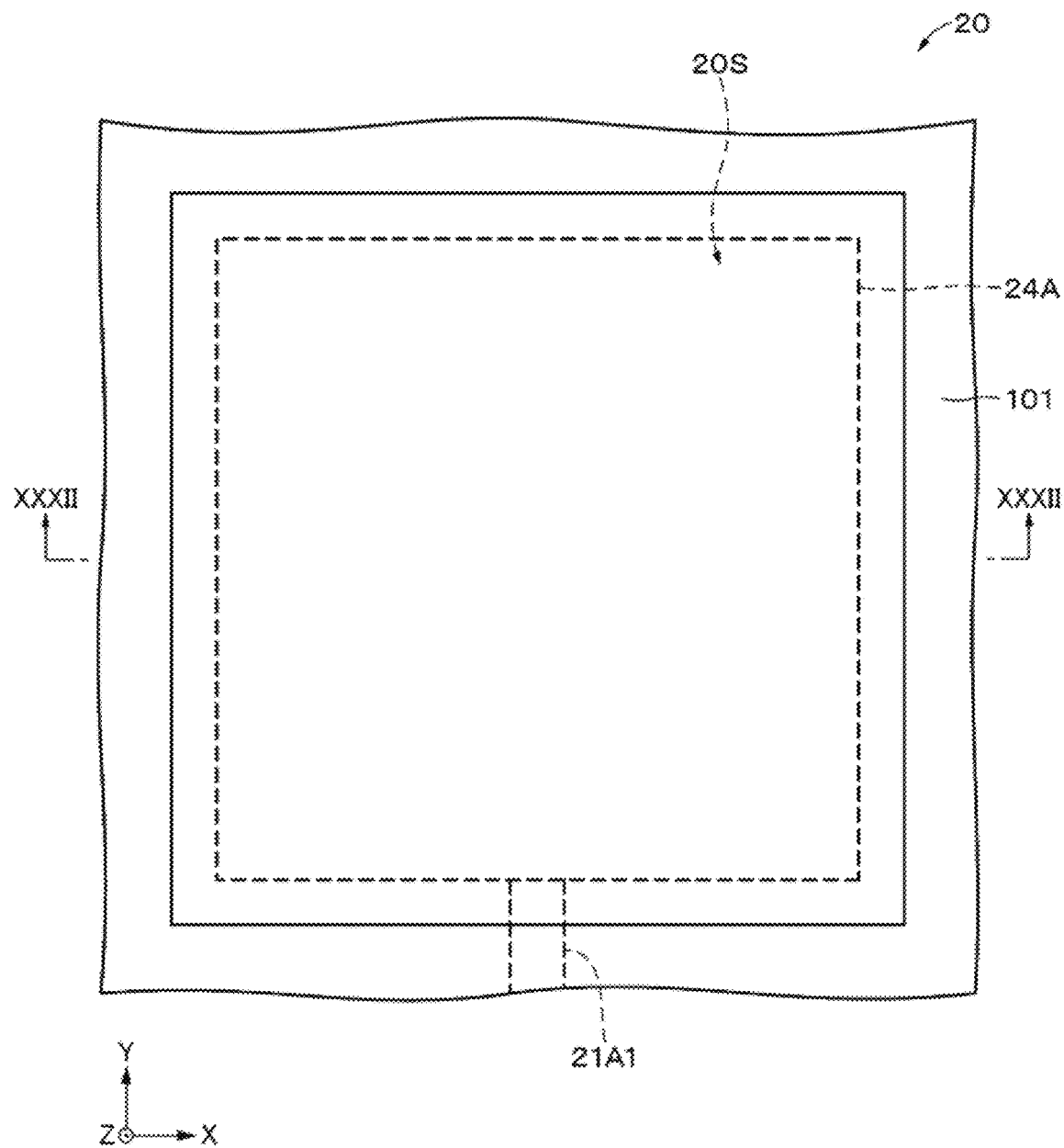

[FIG. 32]
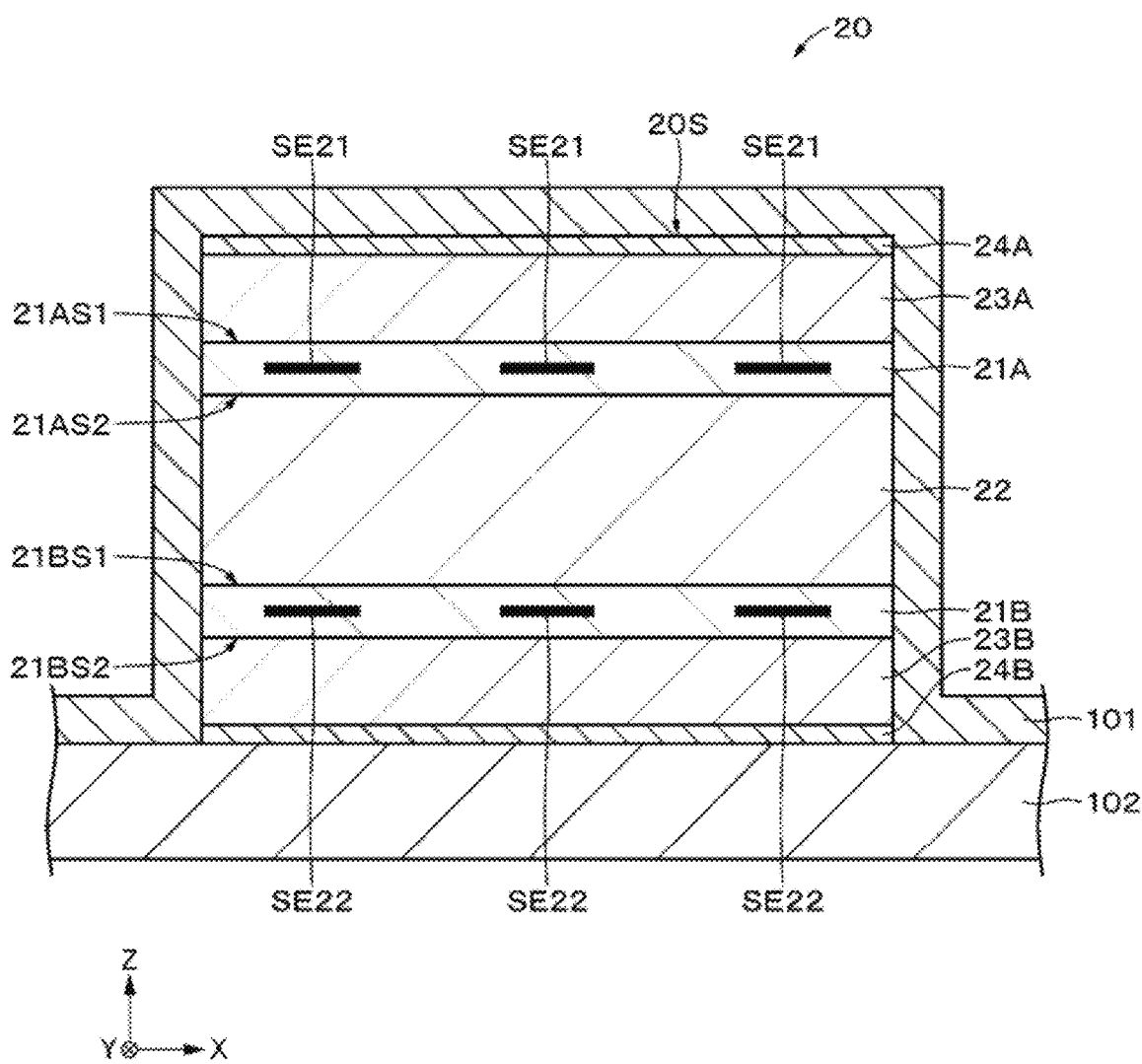

[ FIG. 33 ]
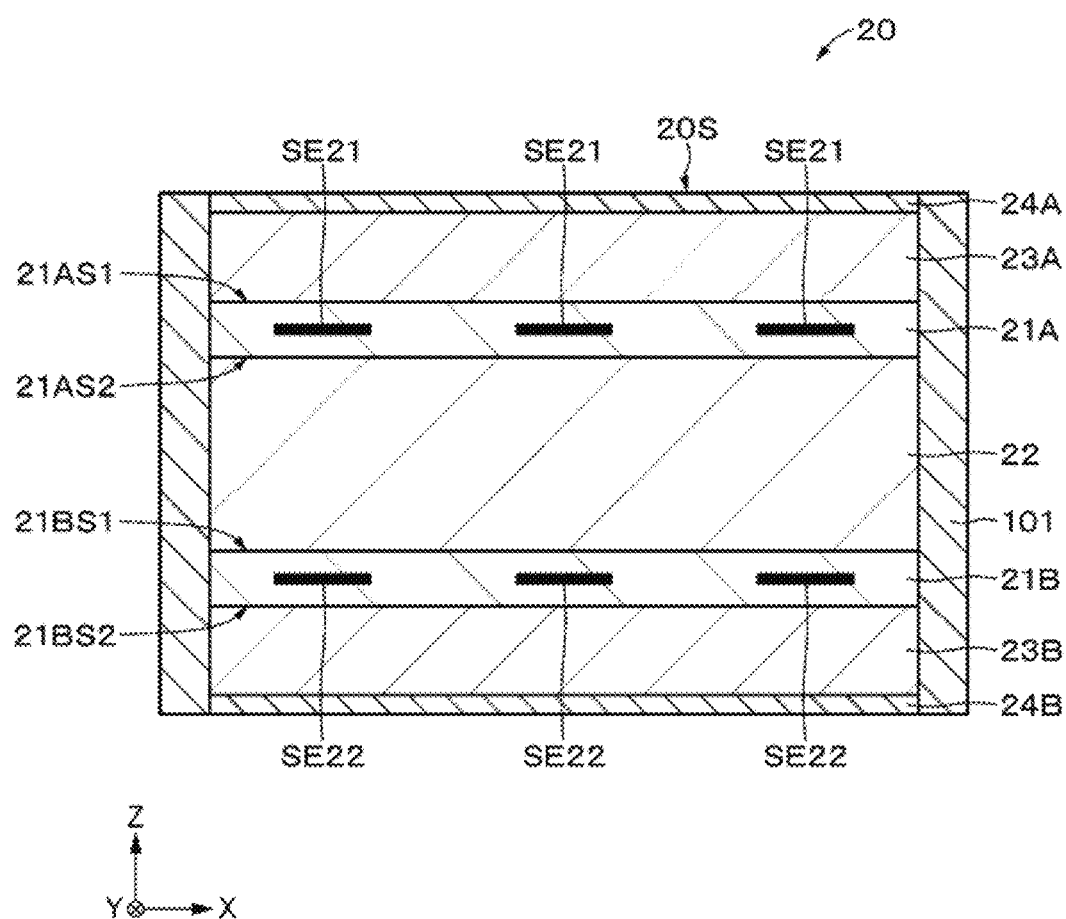

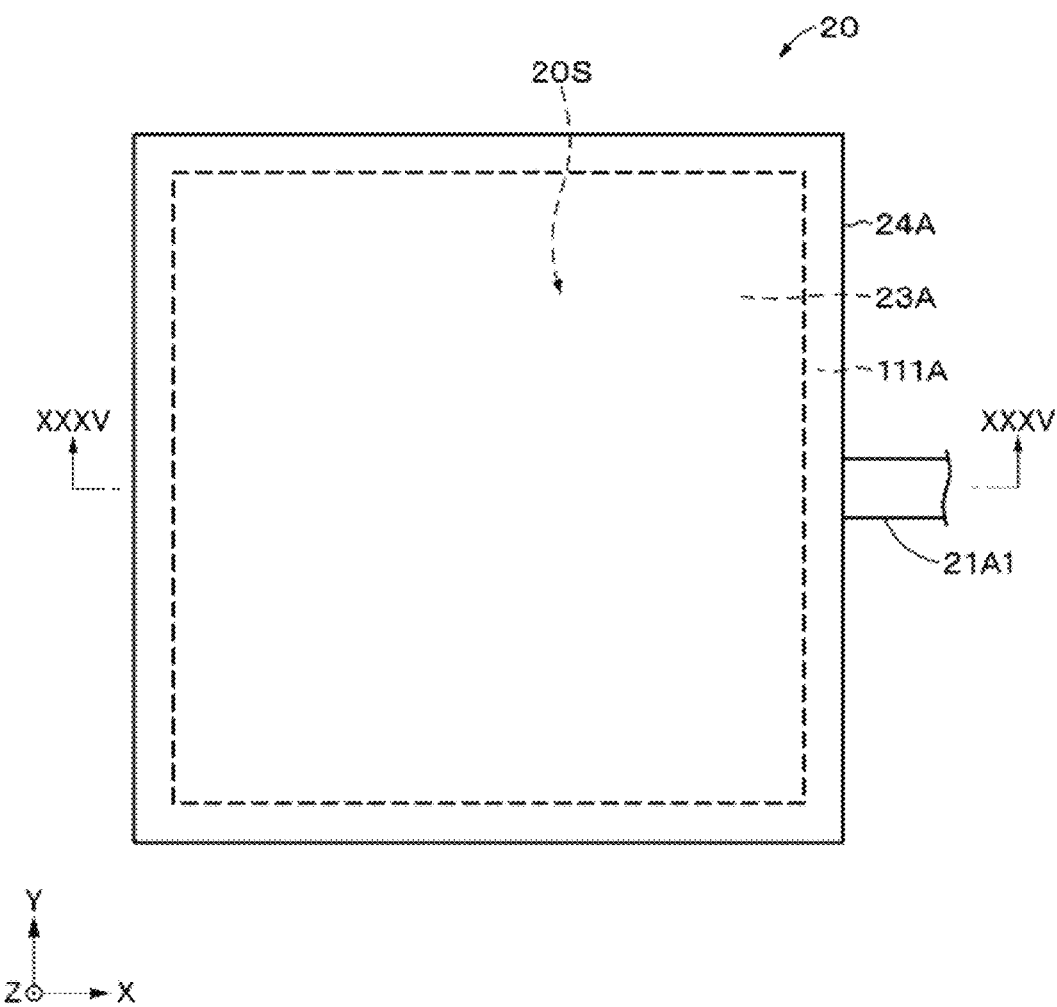
[FIG. 34]

[ FIG. 35 ]
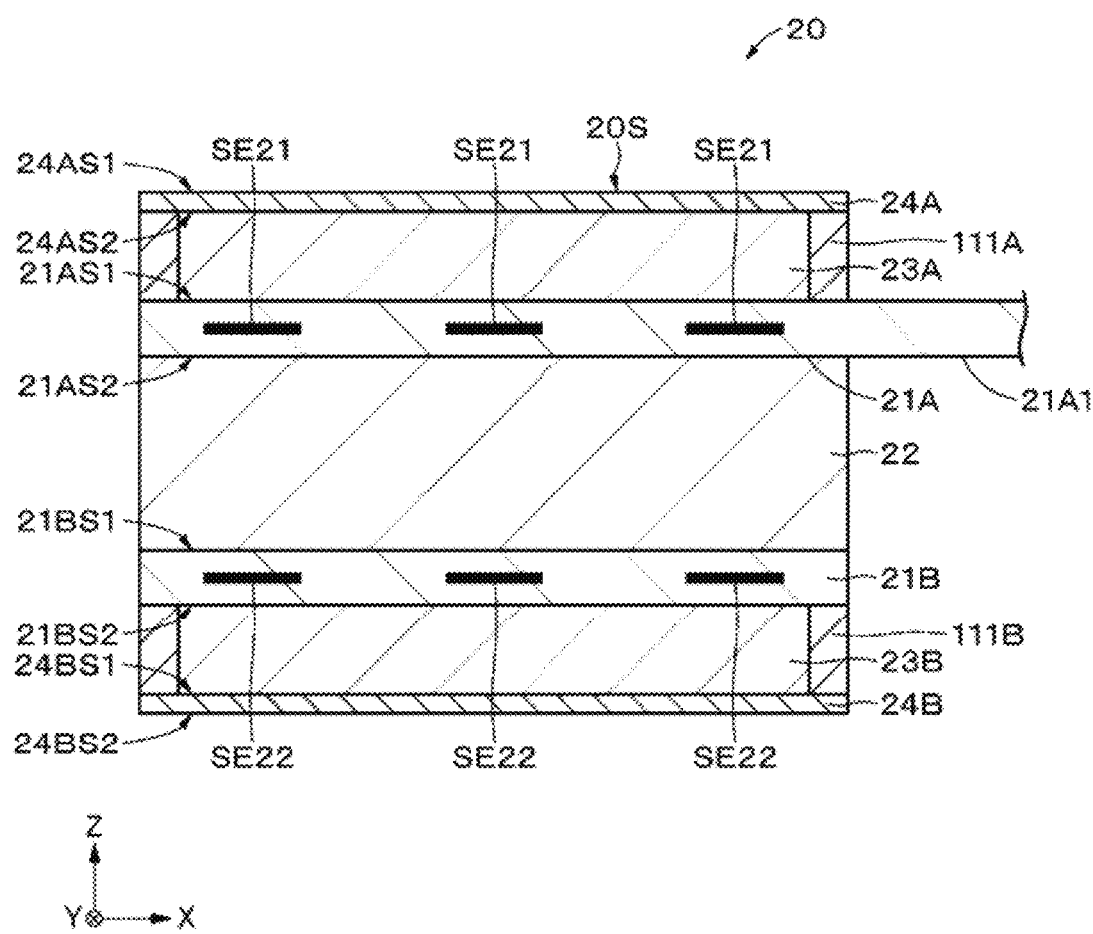

[FIG. 36]
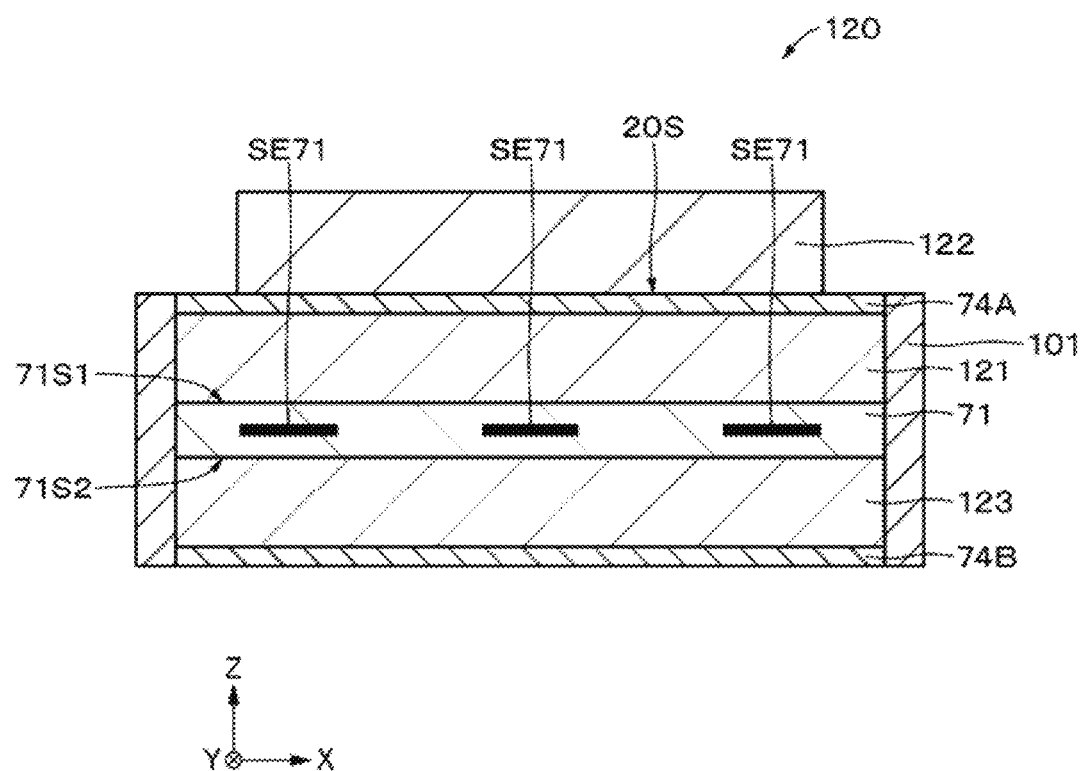

[ FIG. 37 ]
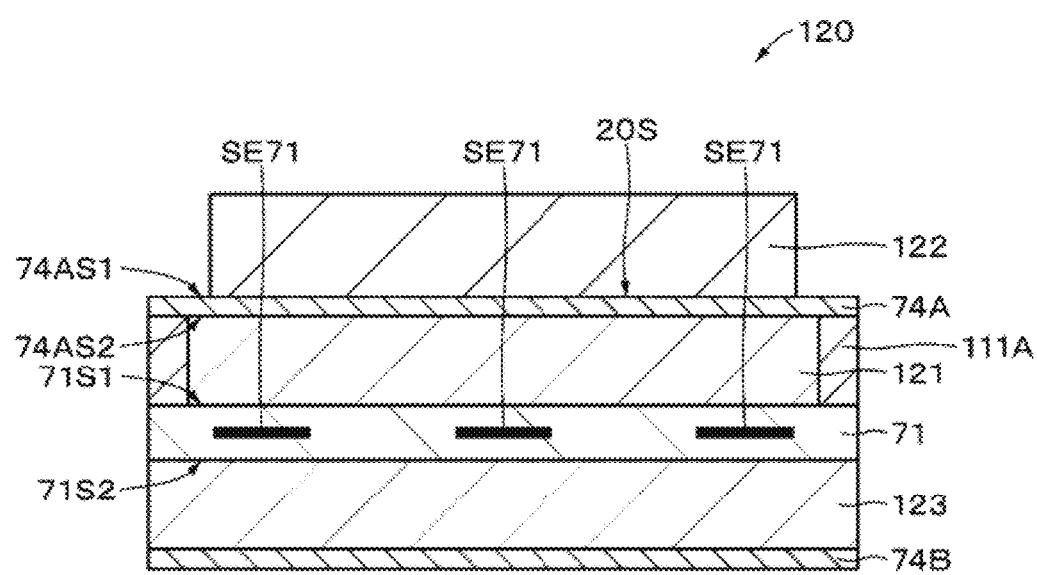
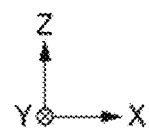

THREE-AXIS SENSOR, SENSOR MODULE, AND ELECTRONIC APPARATUS

TECHNICAL FIELD

The present disclosure relates to a three-axis sensor, a sensor module, and an electronic apparatus.

BACKGROUND ART

In recent years, automation of work by robots has been studied in various scenes with a decrease in the labor population. Accordingly, a sensor has been studied that is mounted on a front surface of a robot to detect a force acting on a contact region with an object on the front surface. Detecting the direction of the force acting on the contact region is particularly important in control of the robot. PTL 1 discloses, as a sensor that detects the direction of such a force on multiple axes, a multi-axis force sensor that includes one-axis pressure sensors disposed in respective axis directions to have a function of detecting a multi-axis force vector as a whole.

CITATION LIST

Patent Literature

PTL 1: Japanese Unexamined Patent Application Publication No. 2016-205942

SUMMARY OF THE INVENTION

Problem to be Solved by the Invention

In order to highly control action of a robot, it is desired that it be possible to detect on which portion of a front surface and in which direction a multi-axis force acts. However, as with PTL 1 described above, in a case where a multi-axis force is to be detected with a combination of a plurality of pressure sensors having a single detection axis, a sensor has a complicated configuration.

An object of the present disclosure is to provide a three-axis sensor, a sensor module, and an electronic apparatus that have a relatively simple configuration.

Means for Solving the Problem

To solve the issues described above, a first disclosure is a three-axis sensor including:
- a first detection layer having a first surface, and a second surface on side opposite to the first surface, and including a first sensing section of a capacitive type;
- a second detection layer having a first surface opposed to the second surface of the first detection layer, and including a second sensing section of the capacitive type;
- a first electrically conductive layer provided to be opposed to the first surface of the first detection layer;
- a second electrically conductive layer provided between the first detection layer and the second detection layer;
- a separation layer provided between the first detection layer and the second electrically conductive layer to separate the first detection layer and the second electrically conductive layer from each other;
- a first deformation layer that is provided between the first electrically conductive layer and the first detection layer, and is elastically deformed in accordance with pressure acting in a thickness direction of a sensor; and
- a second deformation layer that is provided between the second electrically conductive layer and the second detection layer, and is elastically deformed in accordance with pressure acting in the thickness direction of the sensor, in which
- a 25% CLD value of the separation layer is 10 or more times a 25% CLD value of the first deformation layer, and
- the 25% CLD value of the separation layer is 10 or more times a 25% CLD value of the second deformation layer.

A second disclosure is a three-axis sensor including:
- a first detection layer having a first surface, and a second surface on side opposite to the first surface, and includes a first sensing section of a capacitive type;
- a second detection layer having a first surface opposed to the first surface of the first detection layer, and a second surface on side opposite to the first surface, and including a second sensing section of the capacitive type;
- a separation layer provided between the first detection layer and the second detection layer to separate the first detection layer and the second detection layer from each other;
- a first electrically conductive layer provided to be opposed to the first surface of the first detection layer;
- a second electrically conductive layer provided to be opposed to the second surface of the second detection layer;
- a first deformation layer that is provided between the first electrically conductive layer and the first detection layer, and is elastically deformed in accordance with pressure acting in a thickness direction of a sensor; and
- a second deformation layer that is provided between the second electrically conductive layer and the second detection layer, and is elastically deformed in accordance with pressure acting in the thickness direction of the sensor, in which
- a 25% CLD value of the separation layer is 10 or more times a 25% CLD value of the first deformation layer, and
- the 25% CLD value of the separation layer is 10 or more times a 25% CLD value of the second deformation layer.

A third disclosure is a sensor module including the three-axis sensor of the first disclosure or the second disclosure.

A fourth disclosure is an electronic apparatus including:
- the sensor module of the third module; and
- a computing section that computes a three-axis force on the basis of output signal distributions of the first sensing section and the second sensing section outputted from the sensor module.

BRIEF DESCRIPTION OF THE DRAWINGS

FIG. 1 is a block diagram illustrating an example of a configuration of an electronic apparatus according to a first embodiment of the present disclosure.

FIG. 2 is a cross-sectional view of an example of a configuration of a sensor.

FIG. 3 is a plan view of an example of a configuration of a detection layer.

FIG. 4 is a cross-sectional view of an example of the configuration of the detection layer.

FIG. 5 is a plan view of an example of a configuration of a sensing section.

FIG. 6 is a plan view of an example of arrangement of a plurality of routing wiring lines.

FIG. 7 is a cross-sectional view for describing an example of an operation of the sensor upon pressure detection.

FIG. 8 is a cross-sectional view for describing an example of an operation of the sensor upon shear force detection.

FIG. 9 is a graph illustrating an example of output signal distributions of a first detection layer and a second detection layer in a state in which only pressure acts on the sensor.

FIG. 10 is a graph illustrating an example of output signal distributions of the first detection layer and the second detection layer in a state in which a shear force acts on the sensor.

FIG. 11 is a cross-sectional view of an example of a configuration of a sensor according to a second embodiment of the present disclosure.

FIG. 12 is a cross-sectional view for describing an example of an operation of the sensor upon pressure detection.

FIG. 13 is a cross-sectional view for describing an example of an operation of the sensor upon shear force detection.

FIG. 14 is a cross-sectional view of an example of a configuration of a sensor according to a third embodiment of the present disclosure.

FIG. 15 is a cross-sectional view for describing an example of an operation of the sensor upon pressure detection.

FIG. 16 is a cross-sectional view for describing an example of an operation of the sensor upon shear force detection.

FIG. 17 is a cross-sectional view of an example of a configuration of a sensor according to a fourth embodiment of the present disclosure.

FIG. 18 is a cross-sectional view for describing an example of an operation of the sensor upon pressure detection.

FIG. 19 is a cross-sectional view for describing an example of an operation of the sensor upon shear force detection.

FIG. 20 is a cross-sectional view of an example of a configuration of a sensor according to a fifth embodiment of the present disclosure.

FIG. 21 is an exploded perspective view of an example of a configuration of a sensor according to a modification example.

FIG. 22 is a cross-sectional view of an example of a configuration of a sensor according to a modification example.

FIG. 23 is a cross-sectional view of an example of a configuration of a sensor according to a modification example.

FIG. 24 is a cross-sectional view of an example of a configuration of a sensor according to a modification example.

FIG. 25 is a cross-sectional view of an example of a configuration of a sensor according to a modification example.

FIG. 26 is a cross-sectional view of an example of a configuration of a sensor according to a modification example.

FIG. 27 is a schematic view of an example of a configuration of a robot hand according to an application example.

FIG. 28 is a cross-sectional view of an example of a configuration of a sensor according to a sixth embodiment of the present disclosure.

FIG. 29 is a plan view of an example of a configuration of a flexible printed circuit board according to a modification example.

FIG. 30 is a cross-sectional view taken along a XXX-XXX line of FIG. 29.

FIG. 31 is a plan view of an example of a configuration of a sensor according to a modification example.

FIG. 32 is a cross-sectional view taken along a XXXII-XXXII line of FIG. 31.

FIG. 33 is a cross-sectional view of an example of a configuration of a sensor according to a modification example.

FIG. 34 is a plan view of an example of a configuration of a sensor according to a modification example.

FIG. 35 is a cross-sectional view taken along a XXXV-XXVX line of FIG. 34.

FIG. 36 is a cross-sectional view of an example of a configuration of a sensor according to a modification example.

FIG. 37 is a cross-sectional view of an example of a configuration of a sensor according to a modification example.

MODES FOR CARRYING OUT THE INVENTION

Embodiments of the present disclosure are described in the following order. It is to be noted that the same or corresponding portions are denoted by the same reference signs in all drawings illustrating the following embodiments.
1 First Embodiment (Examples of a Sensor and an Electronic Apparatus Including the Sensor)
2 Second Embodiment (an Example of the Sensor)
3 Third Embodiment (an Example of the Sensor)
4 Fourth Embodiment (an Example of the Sensor)
5 Fifth Embodiment (an Example of the Sensor)
6 Sixth Embodiment (an Example of the Sensor)
7 Modification Examples
8 Application Examples 1 First Embodiment

[Configuration of Electronic Apparatus]

FIG. 1 is a block diagram illustrating an example of a configuration of an electronic apparatus 10 according to a first embodiment of the present disclosure. The electronic apparatus 10 includes a sensor module 11 and a host device 12 that is a main body of the electronic apparatus 10. The host device 12 includes a main CPU (Central Processing Unit) (hereinafter simply referred to as "CPU") 12A and an exterior material (not illustrated) such as a housing, and detects a three-axis force acting on a front surface of the exterior material by the sensor module 11, and operates in accordance with a detection result.

(Sensor Module)

The sensor module 11 includes a three-axis sensor (hereinafter simply referred to as "sensor") 20, a controller IC (Integrated Circuit)(hereinafter simply referred to as "IC") 13A as a first control section, and an IC 13B as a second control section. The sensor 20 is provided on the front surface of the exterior material of the electronic apparatus 10. The exterior material may have a curved surface, and the sensor 20 may be provided on the curved surface. The sensor 20 is configured to be able to detect a three-axis force acting between a front surface of the sensor 20 and an object contacting the front surface in a surface distribution. The sensor 20 detects pressure and a shear force that act on the sensor 20 as a capacitance distribution, and outputs a detection result to the IC 13A and the IC 13B.

The IC 13A and the IC 13B each control the sensor 20 to acquire a capacitance distribution corresponding to pressure and a shear force that act on the sensor 20, and outputs a result of such acquirement to the CPU 12A of the host device 12. The CPU 12A computes a three-axis force to be applied to the sensor 20 on the basis of output signals (capacitance distributions) from the IC 13A and the IC 13B, and executes various types of control of the host device 12 on the basis of a result of such a computation.

[Configuration of Sensor]

FIG. 2 is a cross-sectional view of an example of a configuration of the sensor 20. The sensor 20 is a capacitive type sensor that is able to detect a three-axis force distribution, and detects pressure acting on the front surface of the sensor 20 and a shear force in a in-plane direction of the sensor 20. The sensor 20 has a film shape. In the present disclosure, it is defined that a film also encompasses a sheet. The sensor 20 has a film shape, and is therefore applicable not only to a flat surface but also to a curved surface. In this description, axes orthogonal to each other in a plane of the front surface of the sensor 20 in a flat state are referred to as an X axis and a Y axis, and an axis perpendicular to the front surface of the sensor 20 in the flat state is referred to as a z axis.

The sensor 20 includes a detection layer (first detection layer) 21A, a detection layer (second detection layer) 21B, a separation layer 22, a deformation layer (first deformation layer) 23A, a deformation layer (second deformation layer) 23B, an electrically conductive layer (first electrically conductive layer) 24A, and an electrically conductive layer (second electrically conductive layer) 24B. Unillustrated adhesive layers are provided between respective layers of the sensor 20 to bond the respective layers together. However, in a case where at least one of two adjacent layers has an adhesive property, the adhesive layer may not be provided. A first surface on side of the electrically conductive layer 24A of both surfaces of the sensor 20 is a sensing surface 20S that detects pressure and a shear force, and a second surface on side opposite to the sensing surface 20S is a back surface bonded to an exterior material such as a housing. The detection layer 21A is coupled to the IC 13A, and the detection layer 21B is coupled to the IC 13B.

The detection layer 21A has a first surface 21AS1, and a second surface 21AS2 on side opposite to the first surface 21AS1. The detection layer 21B has a first surface 21BS1 opposed to the first surface 21AS1, and a second surface 21BS2 on side opposite to the first surface 21BS1. The detection layer 21A and the detection layer 21B are disposed in parallel to each other. The separation layer 22 is provided between the detection layer 21A and the detection layer 21B. The electrically conductive layer 24A is provided to be opposed to the first surface 21AS1 of the detection layer 21A. The electrically conductive layer 24A is disposed in parallel to the detection layer 21A. The electrically conductive layer 24B is provided to be opposed to the second surface 21BS2 of the detection layer 21B. The electrically conductive layer 24B is disposed in parallel to the detection layer 21B. The deformation layer 23A is provided between the detection layer 21A and the electrically conductive layer 24A. The deformation layer 23B is provided between the detection layer 21B and the electrically conductive layer 24B.

(Detection Layer)

The detection layer 21A and the detection layer 21B are capacitive type detection layers, and more specifically, mutual capacitive type detection layers. The detection layer 21A has flexibility. In a case where pressure acts on the sensing surface 20S, the detection layer 21A bends toward the detection layer 21B. The detection layer 21A includes a plurality of sensing sections (first sensing sections) SE21. The sensing section SE21 detects pressure acting on the sensing surface 20S, and outputs a detection result to the IC 13A. Specifically, the sensing section SE21 detects a capacitance corresponding to a distance between the sensing section SE21 and the electrically conductive layer 24A, and outputs a detection result to the IC 13A.

The detection layer 21B has flexibility. In a case where pressure acts on the sensing surface 20S, the detection layer 21B bends toward the electrically conductive layer 24B. The detection layer 21B includes a plurality of sensing sections (second sensing sections) SE22. The sensing section SE22 detects pressure acting on the sensing surface 20S, and outputs a detection result to the IC 13B. Specifically, the sensing section SE22 detects a capacitance corresponding to a distance between the sensing section SE22 and the electrically conductive layer 24B, and outputs a detection result to the IC 13B.

An arrangement pitch P1 of the plurality of sensing sections SE21 included in the detection layer 21A and an arrangement pitch P2 of the plurality of sensing sections SE22 included in the detection layer 21B are the same as each other. In an initial state in which no shear force is applied, the sensing sections SE22 are provided at positions opposed to the sensing sections SE21. That is, in the initial state in which no shear force is applied, the sensing sections SE22 and the sensing sections SE22 are superimposed on each other in a thickness direction of the sensor 20. However, in the initial state in which no shear force is applied, the sensing sections SE22 may be configured not to be provided at positions opposed to the sensing sections SE21.

The detection layer 21B has a configuration similar to that of the detection layer 21A; therefore, only the configuration of the detection layer 21A is described below.

FIG. 3 is a plan view of an example of the configuration of the detection layer 21A. The plurality of sensing sections SE21 are arranged in a matrix form. The sensing sections SE21 each have, for example, a square shape. However, the shape of each of the sensing sections SE21 is not specifically limited, and may be a circular shape, an ellipse shape, a polygonal shape other than the square shape, or the like.

It is to be noted that in FIG. 3, reference signs X1 to X10 each indicate a central position of the sensing section SE21 in an X-axis direction, and reference signs Y1 to Y10 each indicate a central position of the sensing section SE21 in a Y-axis direction.

A coupling section 21A1 having a film shape extends from a portion of an outer edge of the detection layer 21A. A plurality of coupling terminals 21A2 for coupling to a sensor substrate (not illustrated) is provided at an end of the coupling section 21A1. The IC 13A and the IC 13B are provided on the sensor substrate.

The detection layer 21A and the coupling section 21A1 are preferably integrally configured by one flexible printed circuit board (Flexible Printed Circuits: FPC). Integrally configuring the detection layer 21A and the coupling section 21A1 in such a manner makes it possible to reduce the number of components of the sensor 20. In addition, it is possible to improve impact durability of coupling between the sensor 20 and the sensor substrate.

FIG. 4 is a cross-sectional view of an example of the configuration of the detection layer 21A. The detection layer 21A includes abase 31, the plurality of sensing sections SE21, a plurality of routing wiring lines 32, a plurality of routing wiring lines 33, a coverlay film 34A, a coverlay film 34B, an adhesive layer 35A, and an adhesive layer 35B.

The base 31 has a first surface 31S1, and a second surface 31S2 on side opposite to the first surface 31S1. The plurality of sensing sections SE21 and the plurality of routing wiring lines 32 are provided on the first surface 31S1 of the base 31. The plurality of routing wiring lines 33 is provided on the second surface 31S2 of the base. The coverlay film 34A is bonded to the first surface 31S1, which is provided with the plurality of sensing sections SE21 and the plurality of routing wiring lines 32, of the base 31 by the adhesive layer 35A. The coverlay film 34B is bonded to the second surface 31S2, which is provided with the plurality of routing wiring lines 33, of the base 31 by the adhesive layer 35B.

The base 31 has flexibility. The base 31 has a film shape. A base 31A includes a polymeric resin. Examples of the polymeric resin include polyethylene terephthalate (PET), polyethylene naphthalate (PEN), polycarbonate (PC), an acrylic resin (PMMA), polyimide (PI), triacetylcellulose (TAC), polyester, polyamide (PA), aramid, polyethylene (PE), polyacrylate, polyethersulfone, polysulfone, polypropylene (PP), diacetyl cellulose, polyvinyl chloride, an epoxy resin, a urea resin, an urethane resin, a melamine resin, cyclic olefin polymer (COP), norbornene-based thermoplastic resin, and the like; however, the polymeric resin is not limited these polymeric resins.

FIG. 5 is a plan view of an example of a configuration of the sensing section SE21. The sensing section SE21 includes a sense electrode (reception electrode (first electrode)) 36 and a pulse electrode (transmission electrode (second electrode)) 37. The sense electrode 36 and the pulse electrode 37 are configured to be able to form capacitive coupling. More specifically, the sense electrode 36 and the pulse electrode 37 each have a comb shape, and are disposed to engage comb-shaped portions thereof with each other.

The sense electrodes 36 adjacent in the X-axis direction are coupled to each other by the coupling line 36A. A lead wiring line 37A is provided for each pulse electrode 37, and an end of the lead wiring line 37A is coupled to the routing wiring line 33 via a through hole 37B. The routing wiring line 33 couples the pulse electrodes 37 adjacent in the Y-axis direction to each other.

FIG. 6 is a plan view of an example of arrangement of the plurality of routing wiring lines 32 and the plurality of routing wiring lines 33. The routing wiring line 32 is led out from the sense electrode 36 located at one end in the X-axis direction of a plurality of sense electrodes 36 coupled to each other by a plurality of coupling lines 36A. The plurality of routing wiring lines 32 is routed to an outer edge section of the first surface 31S1 of the base 31 to be coupled to the coupling terminals 21A2 via the coupling section 21A1.

The detection layer 21A further includes a plurality of routing wiring lines 38. The routing wiring line 38 is coupled to the lead wiring line 37A led out from the pulse electrode 37 located at one end in the Y-axis direction of a plurality of pulse electrodes 37 coupled to each other by the routing wiring line 33. The plurality of routing wiring lines 38 are routed together with the plurality of routing wiring lines 32 to the outer edge section of the first surface 31S1 of the base 31 to be coupled to the coupling terminals 21A2 via the coupling section 21A1.

The detection layer 21A further includes a ground electrode 39A and a ground electrode 39B. The ground electrode 39A and the ground electrode 39B are coupled to a reference potential. The ground electrode 39A and the ground electrode 39B extend in parallel to the plurality of routing wiring lines 32. The plurality of routing wiring lines 32 is provided between the ground electrode 39A and the ground electrode 39B. Providing the plurality of routing wiring lines 32 between the ground electrode 39A and the ground electrode 39B in such a manner makes it possible to prevent external noise (external electric field) from entering the plurality of routing wiring lines 32. This makes it possible to suppress a decrease in detection accuracy of the sensor or false detection due to the external noise.

(Separation Layer)

The separation layer 22 separates the detection layer 21A and the detection layer 21B from each other. This makes it possible to suppress electromagnetic interference between the detection layer 21A and the detection layer 21B. The separation layer 22 is configured to be elastically deformable in an in-plane direction of the sensing surface 20S (that is, the in-plane direction of the sensor 20) by a shear force acting in the in-plane direction of the sensing surface 20S.

The separation layer 22 preferably includes gel. The separation layer 22 including gel resists crushing by pressure acting on the sensing surface 20S, is easily elastically deformed by a shear force acting in the in-plane direction of the sensing surface 20S, thereby acquiring desirable characteristics as the separation layer 22. The gel is, for example, at least one type of polymer gel selected from a group including silicone gel, urethane gel, acrylic gel, and styrene gel. The separation layer 22 may be supported by an unillustrated base.

A 25% CLD (Compression-Load-Deflection) value of the separation layer 22 is 10 or more times a 25% CLD value of the deformation layer 23A, preferably 30 or more times the 25% CLD value of the deformation layer 23A, and more preferably 50 or more times the 25% CLD value of the deformation layer 23A. In a case where the 25% CLD value of the separation layer 22 is 10 or more times the 25% CLD value of the deformation layer 23A, when pressure acts on the sensing surface 20S, the deformation layer 23A is sufficiently easily crushed as compared with the separation layer 22, which makes it possible to improve detection sensitivity of the sensing section SE21.

The 25% CLD value of the separation layer 22 is 10 or more times a 25% CLD value of the deformation layer 23B, preferably 30 or more times the 25% CLD value of the deformation layer 23B, and more preferably 50 or more times the 25% CLD value of the deformation layer 23B. In a case where the 25% CLD value of the separation layer 22 is 10 or more times the 25% CLD value of the deformation layer 23B, when pressure acts on the sensing surface 20S, the deformation layer 23B is sufficiently easily crushed as compared with the separation layer 22, which makes it possible to improve detection sensitivity of the sensing section SE22.

The 25% CLD value of the separation layer 22 is preferably 500 kPa or less. In a case where the 25% CLD value of the separation layer 22 exceeds 500 kPa, it may be difficult to elastically deform the separation layer 22 in the in-plane direction of the sensing surface 20S (that is, the in-plane direction of the sensor 20) by a shear force acting in the in-plane direction of the sensing surface 20S. Accordingly, detection sensitivity to a shear force in the in-plane direction of the sensor 20 may be decreased.

The 25% CLD values of the separation layer 22, the deformation layer 23A, and the deformation layer 23B are measured according to JIS K 6254.

A thickness of the separation layer 22 is preferably twice or more a thickness of the deformation layer 23A, more preferably four or more times the thickness of the deformation layer 23A, and still more preferably eight or more times the thickness of the deformation layer 23A. The thickness of the separation layer 22 is twice or more the thickness of the deformation layer 23A, which allows the separation layer 22 to be sufficiently easily deformed in the in-plane direction of the sensing surface 20S in a case where a shear force acts in the in-plane direction of the sensing surface 20S, as compared with the deformation layer 23A. This makes it possible to further improve the detection sensitivity to the shear force.

The thickness of the separation layer 22 is preferably twice or more a thickness of the deformation layer 23B, more preferably four or more times the thickness of the deformation layer 23B, and still more preferably eight or more times the thickness of the deformation layer 23B. The thickness of the separation layer 22 is twice or more the thickness of the deformation layer 23B, which allows the separation layer 22 to be sufficiently easily deformed in the in-plane direction of the sensing surface 20S in a case where a shear force acts in the in-plane direction of the sensing surface 20S, as compared with the deformation layer 23B. This makes it possible to further improve the detection sensitivity to the shear force.

The thickness of the separation layer 22 is preferably 10000 µm or less, and more preferably 4000 µm or less. In a case where the thickness of the separation layer 22 exceeds 10000 µm, it may be difficult to apply the sensor 20 to an electronic apparatus or the like.

The thicknesses of the separation layer 22, the deformation layer 23A, and the deformation layer 23B are determined as follows. First, the sensor 20 is processed by a FIB (Focused Ion Beam) method or the like to form a cross section, and an image of the cross section is captured with use of a scanning electron microscope (Scanning Electron Microscope: SEM). Next, the image of the cross section is used to measure the thicknesses of the separation layer 22, the deformation layer 23A, and the deformation layer 23B.

A basis weight of the separation layer 22 is preferably 10 or more times a basis weight of the deformation layer 23A, and more preferably 25 or more times the basis weight of the deformation layer 23A. In a case where the basis weight of the separation layer 22 is 10 or more times the basis weight of the deformation layer 23A, when pressure acts on the sensing surface 20S, the deformation layer 23A is sufficiently easily crushed as compared with the separation layer 22, which makes it possible to further improve detection sensitivity of the sensing section SE21.

The basis weight of the separation layer 22 is preferably 10 or more times a basis weight of the deformation layer 23B, and more preferably 25 or more times the basis weight of the deformation layer 23B. In a case where the basis weight of the separation layer 22 is 10 or more times the basis weight of the deformation layer 23B, when pressure acts on the sensing surface 20S, the deformation layer 23B is sufficiently easily crushed as compared with the separation layer 22, which makes it possible to further improve detection sensitivity of the sensing section SE22.

The basis weight of the separation layer 22 is preferably 1000 mg/cm$^2$ or less. In a case where the basis weight of the separation layer 22 exceeds 1000 mg/cm$^2$, it may be difficult to elastically deform the separation layer 22 in the in-plane direction of the sensing surface 20S (that is, the in-plane direction of the sensor 20) by a shear force acting in the in-plane direction of the sensing surface 20S. Accordingly, detection sensitivity to a shear force in the in-plane direction of the sensor 20 may be decreased.

The basis weight of the separation layer 22 is determined as follows. First, after a front surface of the separation layer 22 is exposed by peeling of the electrically conductive layer 24A, the deformation layer 23A, and the detection layer 21A from the sensor 20, or the like, a mass M1 of the sensor 20 in this state is measured. Next, after the separation layer 22 is removed by dissolution of the separation layer 22 with a solvent, or the like, a mass M2 of the sensor 20 in this state is measured. Finally, the basis weight of the deformation layer 23 is determined by the following expression.

Basis weight of separation layer 22[mg/cm$^2$]=(mass $M1$−mass$M2$)/(area $S1$ of separation layer 22)

The basis weight of the deformation layer 23A is determined as follows. First, after a front surface of the deformation layer 23A is exposed by peeling of the electrically conductive layer 24A from the sensor 20, or the like, a mass M3 of the sensor 20 in this state is measured. Next, after the deformation layer 23A is removed by dissolution of the deformation layer 23A with a solvent, or the like, a mass M4 of the sensor 20 in this state is measured. Finally, the basis weight of the deformation layer 23A is determined by the following expression.

Basis weight of deformation layer 23$A$[mg/cm$^2$]= (mass $M3$−mass $M4$)/(area $S2$ of deformation layer 23$A$)

The basis weight of the deformation layer 23B is determined as follows. First, after a front surface of the deformation layer 23B is exposed by peeling of the electrically conductive layer 24B from the sensor 20, or the like, a mass M5 of the sensor 20 in this state is measured. Next, after the deformation layer 23B is removed by dissolution of the deformation layer 23B with a solvent, or the like, a mass M6 of the sensor 20 in this state is measured. Finally, the basis weight of the deformation layer 23B is determined by the following expression.

Basis weight of deformation layer 23$B$[mg/cm$^2$]= (mass $M5$−mass $M6$)/(area $S3$ of deformation layer 23$B$)

(Electrically Conductive Layer)

The electrically conductive layer 24A has at least one of flexibility or elasticity. In a case where pressure acts on the sensing surface 20S, the electrically conductive layer 24A bends toward the detection layer 21A. The electrically conductive layer 24B may or may not have at least one of flexibility or elasticity; however, in order to make the sensor 20 mountable on a curved surface, it is preferable that the electrically conductive layer 24B have flexibility.

The electrically conductive layer 24A has a first surface 24AS1, and a second surface 24AS2 on side opposite to the first surface 24AS1. The second surface 24AS2 is opposed to the first surface 21AS1 of the detection layer 21A. The electrically conductive layer 24B has a first surface 24BS1, and a second surface 24BS2 on side opposite to the first surface 24BS1. The first surface 24BS1 is opposed to the second surface 21BS2 of the detection layer 21B.

An elastic modulus of the electrically conductive layer 24A is preferably 10 MPa or less. In a case where the elastic modulus of the electrically conductive layer 24A is 10 MPa or less, flexibility of the electrically conductive layer 24A is improved, and when pressure acts on the sensing surface 20S, the pressure easily propagates to the detection layer 21B, which makes it easy to deform the detection layer 21B. This makes it possible to improve detection sensitivity of the sensing section SE22. The elastic modulus described above is measured according to JIS K 7161.

The electrically conductive layer 24A and the electrically conductive layer 24B are so-called ground electrodes, and are coupled to a reference potential. Examples of shapes of the electrically conductive layer 24A and the electrically conductive layer 24B include a thin film shape, a foil shape, a mesh shape, and the like; however, the shapes of the electrically conductive layer 24A and the electrically conductive layer 24B are not limited to these shapes. Each of the electrically conductive layer 24A and the electrically conductive layer 24B may be supported by an unillustrated base.

It is sufficient if the electrically conductive layers 24A and 24B have electrical conductivity, and examples of the electrically conductive layers 24A and 24B include an inorganic electrically conductive layer including an inorganic electrically conductive material, an organic electrically conductive layer including an organic electrically conductive material, an organic-inorganic electrically conductive layer including both an inorganic electrically conductive material and an organic electrically conductive material, and the like. The inorganic electrically conductive material and the organic electrically conductive material may be particles. The electrically conductive layers 24A and 24B may be electrically conductive clothes.

Examples of the inorganic electrically conductive material include metals, metal oxides, and the like. It is defined that the metals here encompass semimetals. Examples of the metals include metals such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, and an alloy including two or more types of these metals, and the likes; however, the metals are not limited to these metals. A specific example of the alloy is stainless steel; however, the alloy is not limited thereto. Examples of the metal oxides include indium tin oxide (ITO), zinc oxide, indium oxide, antimony-doped tin oxide, fluorine-doped tin oxide, aluminum-doped zinc oxide, gallium-doped zinc oxide, silicon-doped zinc oxide, a zinc oxide-tin oxide system, an indium oxide-tin oxide system, a zinc oxide-indium oxide-magnesium oxide system, and the like; however, the metal oxides are not limited to these metal oxides.

Examples of the organic electrically conductive material include a carbon material, an electrically conductive polymer, and the like. Examples of the carbon material include carbon black, carbon fiber, fullerene, graphene, carbon nanotubes, carbon microcoils, nanohorns, and the like; however, the carbon material is not limited to these carbon materials. As the electrically conductive polymer, for example, substituted or unsubstituted polyaniline, polypyrrole, polythiophene, or the like is usable; however, the electrically conductive polymer is not limited to these electrically conductive polymers.

The electrically conductive layers 24A and 24B may be thin films fabricated by one of a dry process and a wet process. As the dry process, for example, a sputtering method, an evaporation method, or the like is usable; however, the dry process is not specifically limited to these methods.

Providing the electrically conductive layers 24A and 24B on both surfaces of the sensor 20 makes it possible to prevent external noise (external electric field) from entering the sensor 20. This makes it possible to suppress a decrease in detection accuracy of the sensor 20 or false detection due to the external noise.

(Deformation Layer)

The deformation layer 23A separates the detection layer 21A and the electrically conductive layer 24A from each other to make the detection layer 21A and the electrically conductive layer 24A parallel to each other. It is possible to adjust sensitivity and a dynamic range of the sensing section SE21 by the thickness of the deformation layer 23A. The deformation layer 23A is configured to be elastically deformable in accordance with pressure acting on the sensing surface 20S, that is, pressure acting in the thickness direction of the sensor 20. The deformation layer 23A may be supported by an unillustrated base.

The deformation layer 23B separates the detection layer 21B and the electrically conductive layer 24B from each other to make the detection layer 21B and the electrically conductive layer 24B parallel to each other. It is possible to adjust sensitivity and a dynamic range of the sensing section SE22 by the thickness of the deformation layer 23B. The deformation layer 23B is configured to be elastically deformable in accordance with pressure acting on the sensing surface 20S, that is, pressure acting in the thickness direction of the sensor 20. The deformation layer 23A may be supported by an unillustrated base.

The 25% CLD values of the deformation layer 23A and the deformation layer 23B may be the same or substantially the same as each other. The deformation layers 23A and 23B each include, for example, a foam resin, an insulating elastomer, or the like. The foam resin is a so-called sponge, and is, for example, at least one type of foamed polyurethane (polyurethane foam), foamed polyethylene (polyethylene foam), foamed polyolefin (polyolefin foam), foamed acrylic (acrylic foam), sponge rubber, or the like. The insulating elastomer is, for example, at least one type of a silicone-based elastomer, an acrylic-based elastomer, an urethane-based elastomer, a styrene-based elastomer, or the like.

(Adhesive Layer)

The adhesive layer includes an adhesive or a double-faced adhesive film having an insulating property. As the adhesive, for example, at least one type of an acrylic-based adhesive, a silicone-based adhesive, or an urethane-based adhesive is usable. It is to be noted that in the present disclosure, pressure sensitive adhesion (pressure sensitive adhesion) is defined as one type of adhesion (adhesion). According to this definition, a pressure sensitive adhesive layer is regarded as one type of the adhesive layer.

[Operation of Sensor]

(Operation of Sensor Upon Pressure Detection)

FIG. 7 is a cross-sectional view for describing an example of an operation of the sensor 20 upon pressure detection. Ina case where the sensing surface 20S is pressed by an object 41 to cause pressure to act on the sensing surface 20S, the electrically conductive layer 24A bends at a pressure acting point as a center toward the detection layer 21A to crush a portion of the deformation layer 23A. This causes a portion of the electrically conductive layer 24A and a portion of detection layer 21A to come close to each other. As a result, some of lines of electric force of a plurality of sensing sections SE21 included in the portion, which comes close to the electrically conductive layer 24A, of the detection layer 21A (that is, some of lines of electric force between the sense electrodes 36 and the pulse electrodes 37) travel toward the electrically conductive layer 24A to change the capacitances of the plurality of sensing sections SE21.

In addition, pressure acts on the first surface 21AS1 of the detection layer 21A by the portion crushed as described above of the deformation layer 23A, and the detection layer 21A, the separation layer 22, and the detection layer 21B each bend at a pressure acting point as a center toward the electrically conductive layer 24B. This causes a portion of the detection layer 21B and a portion of the electrically conductive layer 24B to come close to each other. As a result, some of lines of electric force of a plurality of sensing sections SE22 included in the portion, which comes close to the electrically conductive layer 24B, of the detection layer 21B (that is, some of lines of electric force between the sense electrodes 36 and the pulse electrodes 37) travel toward the electrically conductive layer 24B to change the capacitances of the plurality of sensing sections SE22.

The IC 13A sequentially scans the plurality of sensing sections SE21 included in the detection layer 21A to acquire an output signal distribution, that is, a capacitance distribution from the plurality of sensing sections SE21.

Similarly, the IC 13B sequentially scans the plurality of sensing sections SE22 included in the detection layer 21B to acquire an output signal distribution, that is, a capacitance distribution from the plurality of sensing sections SE21. The IC 13A and the IC 13B output the acquired output signal distributions to the CPU 12A of the host device 12.

The CPU 12A computes magnitude of pressure and a pressure acting position on the basis of the output signal distribution received from the IC 13A. A reason for computing the magnitude of pressure and the pressure acting position on the basis of the output signal distribution of the IC 13A is that the detection layer 21A is closer to the sensing surface 20S and has higher detection sensitivity, as compared with the detection layer 21B. However, the CPU 12A may compute the magnitude of pressure and the pressure acting position on the basis of the output signal distribution received from the IC 13B, or may compute the magnitude of pressure and the pressure acting position on the basis of the output signal distributions received from both the IC 13A and the IC 13B.

(Operation of Sensor upon Shear Force Detection)

FIG. 8 is a cross-sectional view for describing an example of an operation of the sensor 20 upon shear force detection. In a case where the object 41 moves in the in-plane direction of the sensing surface 20S, and a shear force acts on the sensor 20, the separation layer 22 is elastically deformed in the in-plane direction of the sensor 20, and relative positions of the detection layer 21A and the detection layer 21B in the in-plane direction (X and Y directions) of the sensor 20 are displaced. That is, the relative positions of the sensing sections SE21 and the sensing sections SE22 in the in-plane direction of the sensor 20 are displaced. This causes a centroid position of the output signal distribution (capacitance distribution) of the detection layer 21A and a centroid position of the output signal distribution (capacitance distribution) of the detection layer 21B to be displaced in the in-plane direction (X and Y directions) of the sensor 20. It is to be noted that in order to detect a shear force, it is necessary for pressure to act on the sensing surface 20S by the object 41; however, deformation of respective layers of the sensor 20 by this pressure is not illustrated in FIG. 8.

FIG. 9 is a graph illustrating an example of an output signal distribution DB1 of the detection layer 21A and an output signal distribution DB2 of the detection layer 21B in a state in which only pressure acts on the sensor 20. The output signal distribution DB1 and the output signal distribution DB2 each correspond to a capacitance distribution (pressure distribution). In a state in which only pressure acts on the sensor 20, a centroid position of the output signal distribution DB1 of the detection layer 21A and a centroid position of the output signal distribution DB2 of the detection layer 21B coincide with each other.

FIG. 10 is a graph illustrating an example of the output signal distribution DB1 of the detection layer 21A and the output signal distribution DB2 of the detection layer 21B in a state in which a shear force acts on the sensor 20. In the state in which a shear force acts on the sensor 20, the centroid position of the output signal distribution DB1 of the detection layer 21A and the centroid position of the output signal distribution DB2 of the detection layer 21B are displaced.

The CPU 12A calculates a three-axis force on the basis of the output signal distribution of the detection layer 21A and the output signal distribution of the detection layer 21B outputted from the sensor module 11. More specifically, the CPU 12A calculates a pressure centroid position in the detection layer 21A from the output signal distribution DB1 of the detection layer 21A, and calculates a pressure centroid position in the detection layer 21B from the output signal distribution DB2 of the detection layer 21B. The CPU 12A calculates magnitude and a direction of a shear force from a difference between the pressure centroid position in the detection layer 21A and the pressure centroid position in the detection layer 21B.

[Effects]

As described above, in the sensor 20 according to the first embodiment, it is possible to detect a three-axis force distribution with a relatively simple and space-saving configuration as a whole. In addition, it is possible to detect the three-axis force distribution at any position in an effective region of the sensing surface 20S.

In contrast, as with PTL 1 described above, in a case where a multi-axis force sensor includes a combination of a plurality of pressure sensors having a single detection axis to detect a multi-axis force, a configuration of the multi-axis force sensor becomes complicated. In addition, in a case where a plurality of multi-axis force sensors are arranged in order to perform detection in a surface distribution, large space is occupied.

2 Second Embodiment

[Configuration of Sensor]

FIG. 11 is a cross-sectional view of an example of a configuration of a sensor 20A according to a second embodiment of the present disclosure. The sensor 20A differs from the sensor 20 according to the first embodiment in that a separation layer 25 having a stacked structure is included in place of the separation layer 22 (see FIG. 2). It is to be noted that in the second embodiment, components similar to those of the first embodiment are denoted by the same reference signs, and description thereof is omitted.

(Separation Layer)

The separation layer 25 includes an electrically conductive layer (third electrically conductive layer) 24C, a separation layer (first separation layer) 25A, and a separation layer (second separation layer) 25B. The electrically conductive layer 24C is provided between the separation layer 25A and the separation layer 25B. The separation layer 25A is provided between the detection layer 21A and the electrically conductive layer 24C to separate the detection layer 21A and the electrically conductive layer 24C from each other. The separation layer 25B is provided between the detection layer 21B and the electrically conductive layer 24C to separate the detection layer 21B and the electrically conductive layer 24C from each other. The separation layer 25A and the separation layer 25B are configured to be elastically deformable in the in-plane direction of the sensing surface 20S (that is, the in-plane direction of the sensor 20) by a shear force acting in the in-plane direction of the sensing surface 20S.

Materials of the separation layer 25A and the separation layer 25B are similar to that of the separation layer 22 in the first embodiment.

A 25% CLD values of each of the separation layer 25A and the separation layer 25B is 10 or more times the 25% CLD value of the deformation layer 23A, preferably 30 or more times the 25% CLD value of the deformation layer 23A, and more preferably 50 or more times the 25% CLD value of the deformation layer 23A. In a case where the 25% CLD value of each of the separation layer 25A and the separation layer 25B is 10 or more times the 25% CLD value of the deformation layer 23A, it is possible to improve detection sensitivity of the sensing section SE21.

The 25% CLD value of each of the separation layer 25A and the separation layer 25B is 10 or more times the 25% CLD value of the deformation layer 23B, preferably 30 or more times the 25% CLD value of the deformation layer 23B, and more preferably 50 or more times the 25% CLD value of the deformation layer 23B. In a case where the 25% CLD value of each of the separation layer 25A and the separation layer 25B is 10 or more times the 25% CLD value of the deformation layer 23B, it is possible to improve detection sensitivity of the sensing section SE22.

The 25% CLD value of each of the separation layer 25A and the separation layer 25B is preferably 500 kPa or less. In a case where the 25% CLD value of each of the separation layer 25A and the separation layer 25B exceeds 500 kPa, it may be difficult to elastically deform the separation layers 25A and the separation layer 25B in the in-plane direction of the sensing surface 20S (that is, an in-plane direction of the sensor 20A) by a shear force acting in the in-plane direction of the sensing surface 20S. Accordingly, detection sensitivity to a shear force in the in-plane direction of the sensor 20A may be decreased.

The 25% CLD values of the separation layer 25A and the separation layer 25B are measured according to JIS K 6254.

A total thickness of the separation layer 25A and the separation layer 25B is preferably twice or more the thickness of the deformation layer 23A, more preferably four or more times the thickness of the deformation layer 23A, and still more preferably eight or more times the thickness of the deformation layer 23A. In a case where the total thickness of the separation layer 25A and the separation layer 25B is twice or more the thickness of the deformation layer 23A, it is possible to further improve the detection sensitivity to the shear force.

The total thickness of the separation layer 25A and the separation layer 25B is preferably twice or more the thickness of the deformation layer 23B, more preferably four or more times the thickness of the deformation layer 23B, and still more preferably eight or more times the thickness of the deformation layer 23B. In a case where the total thickness of the separation layer 25A and the separation layer 25B is twice or more the thickness of the deformation layer 23B, it is possible to further improve the detection sensitivity to the shear force.

The total thickness of the separation layer 25A and the separation layer 25B is preferably 10000 μm or less, and more preferably 4000 μm or less. In a case where the total thickness of the separation layer 25A and the separation layer 25B exceeds 10000 μm, it may be difficult to apply the sensor 20A to an electronic apparatus or the like.

The thicknesses of the separation layer 25A and the separation layer 25B are determined by a method similar to a method of measuring the thickness of the separation layer 22 in the first embodiment.

A total basis weight of the separation layer 25A and the separation layer 25B is 10 or more times the basis weight of the deformation layer 23A, more preferably 25 or more times the basis weight of the deformation layer 23B. In a case where the total basis weight of the separation layer 25A and the separation layer 25B is 10 or more times the basis weight of the deformation layer 23A, it is possible to further improve detection sensitivity of the sensing section SE21.

The total basis weight of the separation layer 25A and the separation layer 25B is 10 or more times the basis weight of the deformation layer 23B, more preferably 25 or more times the basis weight of the deformation layer 23B. In a case where the total basis weight of the separation layer 25A and the separation layer 25B is 10 or more times the basis weight of the deformation layer 23AB, it is possible to further improve detection sensitivity of the sensing section SE22.

The total basis weight of the separation layer 25A and the separation layer 25B is preferably 1000 mg/cm$^2$ or less. In a case where the total basis weight of the separation layer 25A and the separation layer 25B exceeds 1000 mg/cm$^2$, it may be difficult to elastically deform the separation layer 25A and the separation layer 25B in the in-plane direction of the sensing surface 20S (that is, the in-plane direction of the sensor 20A) by a shear force acting in the in-plane direction of the sensing surface 20S. Accordingly, detection sensitivity to a shear force in the in-plane direction of the sensor 20A may be decreased.

The basis weights of the separation layer 25A and the separation layer 25B are determined by a method similar to a method of measuring the basis weight of the separation layer 22 in the first embodiment.

(Electrically Conductive Layer)

The electrically conductive layer 24C is provided between the separation layer 25A and the separation layer 25B as described above to suppress electromagnetic interference between the detection layer 21A and the detection layer 21B. The electrically conductive layer 24C has at least one of flexibility or elasticity. In a case where pressure acts on the sensing surface 20S, the electrically conductive layer 24C bends toward the detection layer 21B. A shape and a material of the electrically conductive layer 24C are similar to those of the electrically conductive layer 24A in the first embodiment.

[Operation of Sensor]

(Operation of Sensor Upon Pressure Detection)

FIG. 12 is a cross-sectional view for describing an example of an operation of the sensor 20A upon pressure detection. The operation of the sensor 20A upon pressure detection is similar to the operation of the sensor 20 upon pressure detection in the first embodiment except for the following point. In a case where the sensing surface 20S is pressed by the object 41, and pressure acts on the first surface 21AS1 of the detection layer 21A by a pressed portion of the deformation layer 23A, the detection layer 21A, the separation layer 25, and the detection layer 21B each bend at a pressure acting point as a center toward the electrically conductive layer 24B.

(Operation of Sensor Upon Shear Force Detection)

FIG. 13 is a cross-sectional view for describing an example of an operation of the sensor 20A upon shear force detection. The operation of the sensor 20A upon shear force detection is similar to the operation of the sensor 20A except for the following point. In a case where a shear force acts on the sensor 20, the separation layer 25A and the separation layer 25B are elastically deformed in the in-plane direction of the sensor 20, and relative positions of the detection layer 21A and the detection layer 21B in the in-plane direction of the sensor 20 are displaced.

[Effects]

The sensor 20A according to the second embodiment further includes the electrically conductive layer 24C between the detection layer 21A and the detection layer 21B. This makes it possible to further suppress electromagnetic interference between the detection layer 21A and the detection layer 21B. Accordingly, in the sensor 20A, it is possible to further suppress a decrease in detection accuracy or false detection, as compared with the sensor 20 according to the first embodiment.

3 Third Embodiment

[Configuration of Sensor]

FIG. 14 is a cross-sectional view of an example of a configuration of a sensor 50 according to a third embodiment. The sensor 50 includes the detection layer (first detection layer) 21A, a detection layer (second detection layer) 51B, a separation layer 52, the deformation layer (first deformation layer) 23A, a deformation layer (second deformation layer) 53B, the electrically conductive layer (first electrically conductive layer) 24A, an electrically conductive layer (second electrically conductive layer) 54B, an electrically conductive layer (third electrically conductive layer) 54C, and an adhesive layer 55. It is to be noted that the electrically conductive layer 54C and the adhesive layer 55 are included as necessary, and may not be included. It is to be noted that in the third embodiment, components similar to those of the first embodiment are denoted by the same reference signs, and description thereof is omitted.

Unillustrated adhesive layers are provided between respective layers of the sensor 50 except for between the detection layer 51B and the adhesive layer 55 and between the electrically conductive layer 54C and the adhesive layer 55 to bond the respective layers together. However, in a case where at least one of two adjacent layers has an adhesive property, the adhesive layer may not be provided.

The detection layer 51B has a first surface 51BS1 opposed to the second surface 21AS2 of the detection layer 21A, and a second surface 51BS2 on side opposite to the first surface 51BS1. The detection layer 21A and the detection layer 51B are disposed in parallel to each other. The electrically conductive layer 54B is provided between the detection layer 21A and the detection layer 51B. The electrically conductive layer 54B is disposed in parallel to the detection layer 21A and the detection layer 51B. The electrically conductive layer 54C is provided to be opposed to the second surface 51BS2 of the detection layer 51B. The electrically conductive layer 54B is disposed in parallel to the detection layer 51B. The separation layer 52 is provided between the detection layer 21A and the electrically conductive layer 54B. The adhesive layer 55 is provided between the detection layer 51B and the electrically conductive layer 54C.

(Detection Layer)

The detection layer 51B is a mutual capacitive type detection layer. The detection layer 51B includes a plurality of sensing sections (second sensing sections) SE52. The sensing section SE52 detects pressure acting on the sensing surface 20S, and outputs a detection result to the IC 13B. Specifically, the sensing section SE52 detects a capacitance corresponding to a distance between the sensing section SE52 and the electrically conductive layer 54B, and outputs a detection result to the IC 13B.

The configuration of the detection layer 51B is similar to that of the detection layer 21A in the first embodiment.

(Separation Layer)

The separation layer 52 separates the detection layer 21A and the electrically conductive layer 54B from each other. The separation layer 52 is configured to be elastically deformable in the in-plane direction of the sensing surface 20S (that is, an in-plane direction of the sensor 50) by a shear force acting in the in-plane direction of the sensing surface 20S.

A material of the separation layer 52 is similar to that of the separation layer 22 in the first embodiment.

A 25% CLD value of the separation layer 52 is 10 or more times the 25% CLD value of the deformation layer 23A, preferably 30 or more times the 25% CLD value of the deformation layer 23A, and more preferably 50 or more times the 25% CLD value of the deformation layer 23A. In a case where the 25% CLD value of the separation layer 52 is 10 or more times the 25% CLD value of the deformation layer 23A, it is possible to improve detection sensitivity of the sensing section SE21.

The 25% CLD value of the separation layer 52 is 10 or more times a 25% CLD value of the deformation layer 53B, preferably 30 or more times the 25% CLD value of the deformation layer 53B, and more preferably 50 or more times the 25% CLD value of the deformation layer 53B. In a case where the 25% CLD value of the separation layer 52 is 10 or more times the 25% CLD value of the deformation layer 53B, it is possible to improve detection sensitivity of the sensing section SE52.

The 25% CLD value of the separation layer 52 is preferably 500 kPa or less. In a case where the 25% CLD value of the separation layer 52 exceeds 500 kPa, it may be difficult to elastically deform the separation layer 52 in the in-plane direction of the sensing surface 20S (that is, the in-plane direction of the sensor 50) by a shear force acting in the in-plane direction of the sensing surface 20S. Accordingly, detection sensitivity to a shear force in the in-plane direction of the sensor 50 may be decreased.

The 25% CLD values of the separation layer 52 and the deformation layer 53B are measured according to JIS K 6254.

A thickness of the separation layer 52 is preferably twice or more the thickness of the deformation layer 23A, more preferably four or more times the thickness of the deformation layer 23A, and still more preferably eight or more times the thickness of the deformation layer 23A. In a case where the thickness of the separation layer 52 is twice or more the thickness of the deformation layer 23A, it is possible to further improve the detection sensitivity to the shear force.

The thickness of the separation layer 52 is preferably twice or more a thickness of the deformation layer 53B, more preferably four or more times the thickness of the deformation layer 23A, and still more preferably eight or more times the thickness of the deformation layer 53B. In a case where the thickness of the separation layer 52 is twice or more the thickness of the deformation layer 53B, it is possible to further improve the detection sensitivity to the shear force.

The thickness of the separation layer 52 is preferably 10000 μm or less, and more preferably 4000 μm or less. In a case where the thickness of the separation layer 52 exceeds 10000 μm, it may be difficult to apply the sensor 50 to an electronic apparatus or the like.

The thicknesses of the separation layer 52 and the deformation layer 53B are determined by a method similar to a method of measuring the thicknesses of the separation layer 22, the deformation layer 23A, and the deformation layer 23B in the first embodiment.

A basis weight of the separation layer 52 is preferably 10 or more times the basis weight of the deformation layer 23A, and more preferably 25 or more times the basis weight of the deformation layer 23A. In a case where the basis weight of the separation layer 52 is 10 or more times the basis weight of the deformation layer 23A, it is possible to further improve detection sensitivity of the sensing section SE21.

The basis weight of the separation layer 52 is preferably 10 or more times a basis weight of the deformation layer 53B, and more preferably 25 or more times the basis weight of the deformation layer 53B. In a case where the basis weight of the separation layer 52 is 10 or more times the basis weight of the deformation layer 53B, it is possible to further improve detection sensitivity of the sensing section SE52.

The basis weight of the separation layer 52 is preferably 1000 mg/cm$^2$ or less. In a case where the basis weight of the separation layer 52 exceeds 1000 mg/cm$^2$, it may be difficult to elastically deform the separation layer 52 in the in-plane direction of the sensing surface 20S (that is, the in-plane direction of the sensor 50) by a shear force acting in the in-plane direction of the sensing surface 20S. Accordingly, detection sensitivity to a shear force in the in-plane direction of the sensor 50 may be decreased.

The basis weights of the separation layer 52 and the deformation layer 53B are determined by a method similar to a method of measuring the basis weights of the separation layer 22, the deformation layer 23A, and the deformation layer 23B in the first embodiment.

(Electrically Conductive Layer)

The electrically conductive layer 54B has at least one of flexibility or elasticity. In a case where pressure acts on the sensing surface 20S, the electrically conductive layer 54B bends toward the detection layer 51B. The electrically conductive layer 54C may or may not have at least one of flexibility or elasticity; however, in order to make the sensor 50 mountable on a curved surface, it is preferable that the electrically conductive layer 54C have at least one of flexibility or elasticity.

The electrically conductive layer 54B has a first surface 54BS1, and a second surface 54BS2 on side opposite to the first surface 54BS1. The second surface 54BS2 is opposed to the first surface 21BS1 of the detection layer 51B. The electrically conductive layer 54C has a first surface 54CS1, and a second surface 54CS2 on side opposite to the first surface 54CS1. The first surface 54CS1 is opposed to the second surface 21BS2 of the detection layer 51B.

The electrically conductive layer 54B and the electrically conductive layer 54C are so-called ground electrodes, and are coupled to a reference potential. Shapes and materials of the electrically conductive layer 54B and the electrically conductive layer 54C are similar to those of the electrically conductive layer 24A in the first embodiment.

(Deformation Layer)

The deformation layer 53B separates the detection layer 51B and the electrically conductive layer 54B from each other to make the detection layer 51B and the electrically conductive layer 54B parallel to each other. It is possible to adjust sensitivity and a dynamic range of the detection layer 51B by the thickness of the deformation layer 53B. The deformation layer 53B is configured to be elastically deformable in accordance with pressure acting on the sensing surface 20S, that is, pressure acting in a thickness direction of the sensor 50.

(Adhesive Layer)

The adhesive layer 55 bonds the detection layer 51B and the electrically conductive layer 54C together, and separates the detection layer 51B and the electrically conductive layer 54C from each other. It is possible to adjust sensitivity and the dynamic range of the detection layer 51B by a thickness of the adhesive layer 55. The adhesive layer 55 is, for example, a base having both surfaces provided with adhesive layers. The adhesive layer 55 may have a configuration in which a plurality of the above-described bases is stacked.

[Operation of Sensor]

(Operation of Sensor Upon Pressure Detection)

FIG. 15 is a cross-sectional view for describing an example of an operation of the sensor 50 upon pressures detection.

In a case where the sensing surface 20S is pressed by the object 41 to cause pressure to act on the sensing surface 20S, as with the operation of the sensor 20 according to the first embodiment, a portion of the electrically conductive layer 24A and a portion of detection layer 21A come close to each other to change capacitances of a plurality of sensing sections SE21.

In addition, in a case where pressure acts on the first surface 21AS1 of the detection layer 21A by the portion crushed as described above of the deformation layer 23A, the detection layer 21A, the separation layer 52, and the electrically conductive layer 54B each bend at a pressure acting point as a center toward the detection layer 51B to crush a portion of the deformation layer 53B. This causes a portion of the electrically conductive layer 54B and a portion of the detection layer 51B to come close to each other. As a result, some of lines of electric force of a plurality of sensing sections SE52 included in the portion, which comes close to the electrically conductive layer 54B, of the detection layer 51B (that is, some of lines of electric force between the sense electrodes 36 and the pulse electrodes 37) travel toward the electrically conductive layer 54B to change the capacitances of the sensing sections SE52.

(Operation of Sensor Upon Shear Force Detection)

FIG. 16 is a cross-sectional view for describing an example of an operation of the sensor 50 upon shear force detection. Ina case where a shear force acts on the sensor 50, the separation layer 52 is elastically deformed in the in-plane direction of the sensor 50, and relative positions of the sensing sections SE21 and the sensing sections SE52 in the in-plane direction (X and Y directions) of the sensor 50 are displaced. This causes the centroid position of the output signal distribution (capacitance distribution) of the detection layer 21A and a centroid position of an output signal distribution (capacitance distribution) of the detection layer 51B to be displaced in the in-plane direction (X and Y directions) of the sensor 50.

[Effects]

The sensor 50 according to the third embodiment includes the deformation layer 53B above the detection layer 51B. This makes it possible to improve detection sensitivity to pressure and a shear force as compared with the sensor 20 according to the first embodiment that includes the deformation layer 23B below the detection layer 21B.

4 Fourth Embodiment

[Configuration of Sensor]

FIG. 17 is a cross-sectional view of an example of a configuration of a sensor 60 according to a fourth embodiment of the present disclosure. The sensor 60 includes a detection layer (first detection layer) 61A, a detection layer (second detection layer) 61B, a separation layer 62, the deformation layer (first deformation layer) 23A, the deformation layer (second deformation layer) 23B, a deformation layer (third deformation layer) 63A, a deformation layer (fourth deformation layer) 63B, the electrically conductive layer (first electrically conductive layer) 24A, the electrically conductive layer (second electrically conductive layer) 24B, an electrically conductive layer (third electrically conductive layer) 64A, and an electrically conductive layer (fourth electrically conductive layer) 64B. It is to be noted that in the fourth embodiment, components similar to those of the first embodiment are denoted by the same reference signs, and description thereof is omitted.

A first sensor 60A includes a stacked body of the electrically conductive layer 64A, the deformation layer 63A, the detection layer 21A, the deformation layer 23A, and the electrically conductive layer 24A. A second sensor 60B includes a stacked body of the electrically conductive layer 24B, the deformation layer 23B, the detection layer 61B, the deformation layer 63B, and the electrically conductive layer 64B.

Unillustrated adhesive layers are provided between respective layers of the sensor 60 to bond the respective layers together. However, in a case where at least one of two adjacent layers has an adhesive property, the adhesive layer may not be provided.

The detection layer 61A has a first surface 61AS1, and a second surface 61AS2 on side opposite to the first surface 61AS1. The detection layer 61B has a first surface 61BS1 opposed to the second surface 61AS2, and a second surface 61BS2 on side opposite to the first surface 61BS1. The detection layer 61A and the detection layer 61B are disposed in parallel to each other. The separation layer 62 is provided between the detection layer 61A and the detection layer 21B. That is, the separation layer 62 is provided between the first sensor 60A and the second sensor 60B.

The electrically conductive layer 24A is provided to be opposed to the first surface 61AS1 of the detection layer 61A. The electrically conductive layer 24A is disposed in parallel to the detection layer 61A. The electrically conductive layer 24B is provided to be opposed to the second surface 21BS2 of the detection layer 61B. The electrically conductive layer 24B is disposed in parallel to the detection layer 61B. The electrically conductive layer 64A is provided between the detection layer 61A and the separation layer 62. The electrically conductive layer 64A is disposed in parallel to the detection layer 61A. The electrically conductive layer 64B is provided between the detection layer 61B and the separation layer 62. The electrically conductive layer 64B is disposed in parallel to the detection layer 61B. The deformation layer 23A is provided between the detection layer 61A and the electrically conductive layer 24A. The deformation layer 23B is provided between the detection layer 61B and the electrically conductive layer 24B. The deformation layer 63A is provided between the detection layer 61A and the electrically conductive layer 64A. The deformation layer 63B is provided between the detection layer 61B and the electrically conductive layer 64B.

(Detection Layer)

The detection layer 61A and the detection layer 61B are mutual capacitive type detection layers. The detection layer 61A has flexibility. In a case where pressure acts on the sensing surface 20S, the detection layer 61A bends toward the electrically conductive layer 64A. The detection layer 61A includes a plurality of sensing sections (first sensing sections) SE61. The sensing section SE61 detects pressure acting on the sensing surface 20S, and outputs a detection result to the IC 13A. Specifically, the sensing section SE61 detects a capacitance corresponding to a distance between the sensing section SE61 and the electrically conductive layer 24A and a distance between the sensing section SE21 and the electrically conductive layer 64A, and outputs a detection result to the IC 13A.

The detection layer 61B has flexibility. In a case where pressure acts on the sensing surface 20S, the detection layer 61B bends toward the electrically conductive layer 24B. The detection layer 61B includes a plurality of sensing sections (first sensing sections) SE62. The sensing section SE62 detects pressure acting on the sensing surface 20S, and outputs a detection result to the IC 13B. Specifically, the sensing section SE62 detects a capacitance corresponding to a distance between the sensing section SE62 and the electrically conductive layer 64B and a distance between the sensing section SE62 and the electrically conductive layer 24B, and outputs a detection result to the IC 13B.

The detection layer 61A and the detection layer 61B have a configuration similar to the configuration of the detection layer 21A in the first embodiment.

(Separation Layer)

The separation layer 62 separates the electrically conductive layer 64A and the electrically conductive layer 64B from each other. That is, the separation layer 62 separates the first sensor 60A and the second sensor 60B from each other. The separation layer 62 is configured to be elastically deformable in the in-plane direction of the sensing surface 20S (that is, the in-plane direction of the sensor 20) by a shear force acting in the in-plane direction of the sensing surface 20S.

A material of the separation layer 62 is similar to that of the separation layer 22 in the first embodiment.

A 25% CLD value of the separation layer 62 is 10 or more times the 25% CLD value of the deformation layer 23A, preferably 30 or more times the 25% CLD value of the deformation layer 23A, and more preferably 50 or more times the 25% CLD value of the deformation layer 23A. In a case where the 25% CLD value of the separation layer 62 is 10 or more times the 25% CLD value of the deformation layer 23A, it is possible to improve detection sensitivity of the sensing section SE61.

The 25% CLD value of the separation layer 62 is 10 or more times a 25% CLD value of the deformation layer 63A, preferably 30 or more times the 25% CLD value of the deformation layer 63A, and more preferably 50 or more times the 25% CLD value of the deformation layer 63A. In a case where the 25% CLD value of the separation layer 62 is 10 or more times the 25% CLD value of the deformation layer 63A, it is possible to improve detection sensitivity of the sensing section SE61.

The 25% CLD value of the separation layer 62 is 10 or more times the 25% CLD value of the deformation layer 23B, preferably 30 or more times the 25% CLD value of the deformation layer 23B, and more preferably 50 or more times the 25% CLD value of the deformation layer 23B. In a case where the 25% CLD value of the separation layer 62 is 10 or more times the 25% CLD value of the deformation layer 23B, it is possible to improve detection sensitivity of the sensing section SE62.

The 25% CLD value of the separation layer 62 is 10 or more times a 25% CLD value of the deformation layer 63B, preferably 30 or more times the 25% CLD value of the deformation layer 63B, and more preferably 50 or more times the 25% CLD value of the deformation layer 63B. In a case where the 25% CLD value of the separation layer 62 is 10 or more times the 25% CLD value of the deformation layer 63B, it is possible to improve detection sensitivity of the sensing section SE62.

The 25% CLD value of the separation layer 62 is preferably 500 kPa or less. In a case where the 25% CLD value of the separation layer 62 exceeds 500 kPa, it may be difficult to elastically deform the separation layer 62 in the in-plane direction of the sensing surface 20S (that is, a in-plane direction of the sensor 60) by a shear force acting in the in-plane direction of the sensing surface 20S. Accordingly, detection sensitivity to a shear force in the in-plane direction of the sensor 60 may be decreased.

The 25% CLD values of the separation layer 62, the deformation layer 63A, and the deformation layer 63B are measured according to JIS K 6254.

A thickness of the separation layer 62 is preferably twice or more the thickness of the deformation layer 23A, more preferably four or more times the thickness of the deformation layer 23A, and still more preferably eight or more times the thickness of the deformation layer 23A. In a case where the thickness of the separation layer 22 is twice or more the thickness of the deformation layer 23A, it is possible to further improve the detection sensitivity to the shear force.

The thickness of the separation layer 62 is preferably twice or more a thickness of the deformation layer 63A, more preferably four or more times the thickness of the deformation layer 63A, and still more preferably eight or more times the thickness of the deformation layer 63A. In a case where the thickness of the separation layer 62 is twice or more the thickness of the deformation layer 63A, it is possible to further improve the detection sensitivity to the shear force.

The thickness of the separation layer 62 is preferably twice or more the thickness of the deformation layer 23B, more preferably four or more times the thickness of the deformation layer 23B, and still more preferably eight or more times the thickness of the deformation layer 23B. In a case where the thickness of the separation layer 62 is twice or more the thickness of the deformation layer 23B, it is possible to further improve the detection sensitivity to the shear force.

The thickness of the separation layer 62 is preferably twice or more a thickness of the deformation layer 63B, more preferably four or more times the thickness of the deformation layer 63B, and still more preferably eight or more times the thickness of the deformation layer 63B. In a case where the thickness of the separation layer 62 is twice or more the thickness of the deformation layer 63B, it is possible to further improve the detection sensitivity to the shear force.

The thickness of the separation layer 62 is preferably 10000 µm or less, and more preferably 4000 µm or less. In a case where the thickness of the separation layer 62 exceeds 10000 µm, it may be difficult to apply the sensor 60 to an electronic apparatus or the like.

The thicknesses of the separation layer 62, the deformation layer 63A, and the deformation layer 63B are determined by a method similar to the method of measuring the thicknesses of the separation layer 22, the deformation layer 23A, and the deformation layer 23B in the first embodiment.

A basis weight of the separation layer 62 is preferably 10 or more times the basis weight of the deformation layer 23A, and more preferably 25 or more times the basis weight of the deformation layer 23A. In a case where the basis weight of the separation layer 62 is 10 or more times the basis weight of the deformation layer 23A, it is possible to further improve detection sensitivity of the sensing section SE61.

The basis weight of the separation layer 62 is preferably 10 or more times a basis weight of the deformation layer 63A, and more preferably 25 or more times the basis weight of the deformation layer 633A. In a case where the basis weight of the separation layer 62 is 10 or more times the basis weight of the deformation layer 63A, it is possible to further improve detection sensitivity of the sensing section SE61.

The basis weight of the separation layer 62 is preferably 10 or more times the basis weight of the deformation layer 23B, and more preferably 25 or more times the basis weight of the deformation layer 23B. In a case where the basis weight of the separation layer 62 is 10 or more times the basis weight of the deformation layer 23B, it is possible to further improve detection sensitivity of the sensing section SE62.

The basis weight of the separation layer 62 is preferably 10 or more times a basis weight of the deformation layer 63B, and more preferably 25 or more times the basis weight of the deformation layer 63B. In a case where the basis weight of the separation layer 62 is 10 or more times the basis weight of the deformation layer 63B, it is possible to further improve detection sensitivity of the sensing section SE62.

The basis weight of the separation layer 62 is preferably 1000 mg/cm$^2$ or less. In a case where the basis weight of the separation layer 62 exceeds 1000 mg/cm$^2$, it may be difficult to elastically deform the separation layer 62 in the in-plane direction of the sensing surface 20S (that is, the in-plane direction of the sensor 60) by a shear force acting in the in-plane direction of the sensing surface 20S. Accordingly, detection sensitivity to a shear force in the in-plane direction of the sensor 60 may be decreased.

The basis weights of the separation layer 62, the deformation layer 63A, and the deformation layer 63B are determined by a method similar to the method of measuring the basis weights of the separation layer 22, the deformation layer 23A, and the deformation layer 23B in the first embodiment.

(Electrically Conductive Layer)

The electrically conductive layer 64A has at least one of flexibility or elasticity. In a case where pressure acts on the sensing surface 20S, the electrically conductive layer 64A bends toward the detection layer 61B. The electrically conductive layer 64B has at least one of flexibility or elasticity. In a case where pressure acts on the sensing surface 20S, the electrically conductive layer 64B bends toward the detection layer 61B.

The electrically conductive layer 64A has a first surface 64AS1, and a second surface 64AS2 on side opposite to the first surface 64AS1. The first surface 64AS1 is opposed to the second surface 61AS2 of the detection layer 61A. The electrically conductive layer 64B has a first surface 64BS1, and a second surface 64BS2 on side opposite to the first surface 64BS1. The second surface 64BS2 is opposed to the first surface 61BS1 of the detection layer 61B.

The electrically conductive layer 64A and the electrically conductive layer 64B are so-called ground electrodes, and are coupled to a reference potential. Shapes and materials of the electrically conductive layer 64A and the electrically conductive layer 64B are similar to the shape and the material of the electrically conductive layer 24A in the first embodiment.

(Deformation Layer)

The deformation layer 63A separates the detection layer 61A and the electrically conductive layer 62A from each other to make the detection layer 61A and the electrically conductive layer 64A parallel to each other. It is possible to adjust sensitivity and a dynamic range of the detection layer 61A by the thickness of the deformation layer 63A. The deformation layer 63A is configured to be elastically deformable in accordance with pressure acting on the sensing surface 20S, that is, pressure acting in a thickness direction of the sensor 60.

The deformation layer 63B separates the detection layer 61B and the electrically conductive layer 64B from each other to make the detection layer 61B and the electrically conductive layer 64B parallel to each other. It is possible to adjust sensitivity and a dynamic range of the detection layer 61B by the thickness of the deformation layer 63B. The deformation layer 63B is configured to be elastically deformable in accordance with pressure acting on the sensing surface 20S, that is, pressure acting in the thickness direction of the sensor 60.

Materials of the deformation layer 63A and the deformation layer 63B are similar to that of the deformation layer 23A in the first embodiment.

[Operation of Sensor]

(Operation of Sensor Upon Pressure Detection)

FIG. 18 is a cross-sectional view for describing an example of an operation of the sensor 60 upon pressure detection. In a case where the sensing surface 20S is pressed by the object 41 to cause pressure to act on the sensing surface 20S, as with the operation of the sensor 20 in the first embodiment, a portion of the electrically conductive layer 24A and a portion of the detection layer 61A come close to each other. In addition, in a case where pressure acts on the first surface 61AS1 of the detection layer 61A by a portion, which is crushed by the electrically conductive layer 24A, of the deformation layer 23A, the detection layer 61A bends at a pressure acting point as a center toward the electrically conductive layer 64A to crush a portion of the deformation layer 63A. This causes a portion of the detection layer 61A and a portion of the electrically conductive layer 64A to come close to each other.

As described above, the portion of the electrically conductive layer 24A and the portion of the detection layer 61A come close to each other, and the portion of the detection layer 61A and the portion of the electrically conductive layer 64A come close to each other, which causes some of lines of electric force of a plurality of sensing sections SE61 included in the portion, which comes close to the electrically conductive layer 24A and the electrically conductive layer 64A, of the detection layer 61A (that is, some of lines of electric force between the sense electrodes 36 and the pulse electrodes 37) to travel toward the electrically conductive layer 24A and the electrically conductive layer 64A, thereby changing the capacitances of the plurality of sensing sections SE61.

In a case where pressure acts on the first surface of the electrically conductive layer 64A by the portion crushed as described above of the deformation layer 63A, the electrically conductive layer 64A, the separation layer 62, and the electrically conductive layer 64B each bend at a pressure acting point as a center toward the detection layer 61B to crush a portion of the deformation layer 63B. This causes a portion of the electrically conductive layer 64B and a portion of the detection layer 61B to come close to each other. In addition, in a case where pressure acts on the first surface 61BS1 of the detection layer 61B by the portion crushed as described above of the deformation layer 63B, the detection layer 61B bends at a pressure acting point as a center toward the electrically conductive layer 24B to crush a portion of the deformation layer 23B. This causes a portion of the detection layer 61B and a portion of the electrically conductive layer 24B to come close to each other.

As described above, the portion of the electrically conductive layer 64B and the portion of the detection layer 61B come close to each other, and the portion of the detection layer 61B and the portion of the electrically conductive layer 24B come close to each other, which causes some of lines of electric force of a plurality of sensing sections SE62 included in the portion, which comes close to the electrically conductive layer 64B and the electrically conductive layer 24B, of the detection layer 61B (that is, some of lines of electric force between the sense electrodes 36 and the pulse electrodes 37) to travel toward the electrically conductive layer 64B and the electrically conductive layer 24B, thereby changing the capacitances of the plurality of sensing sections SE62.

(Operation of Sensor Upon Shear Force Detection)

FIG. 19 is a cross-sectional view for describing an example of an operation of the sensor 60 upon shear force detection. In a case where a shear force acts on the sensor 60, the separation layer 62 is elastically deformed in the in-plane direction of the sensor 60, and relative positions of the sensing sections SE61 and the sensing sections SE62 in the in-plane direction (X and Y directions) of the sensor 60 are displaced. This causes a centroid position of an output signal distribution (capacitance distribution) of the detection layer 61A and a centroid position of an output signal distribution (capacitance distribution) of the detection layer 61B to be displaced in the in-plane direction (X and Y directions) of the sensor 60.

[Effects]

In the sensor 60 according to the fourth embodiment, the electrically conductive layer 24A and the electrically conductive layer 64A are respectively provided on side of the first surface 61AS1 of the detection layer 61A and on side of the second surface 61AS2 of the detection layer 61A. In addition, the electrically conductive layer 24B and the electrically conductive layer 64B are respectively provided on side of the first surface 61BS1 of the detection layer 61B and on side of the second surface 61BS2 of the detection layer 61B. This makes it possible to make detection sensitivity of the sensing section SE61 and the sensing section SE62 higher than detection sensitivity of the sensing section SE21 and the sensing section SE22 in the first embodiment. Accordingly, the sensor 60 acquires higher detection sensitivity, as compared with the sensor 20 according to the first embodiment.

In addition, the sensor 60 according to the fourth embodiment may be configured by interposing the separation layer 62 between the first sensor 60A and the second sensor 60B that have the same configuration. This makes it possible to detect a three-axis force distribution with a relatively simple and space-saving configuration as a whole, as with the sensor 20 according to the first embodiment.

5 Fifth Embodiment

[Configuration of Sensor]

FIG. 20 is a cross-sectional view of an example of a configuration of a sensor 70 according to a fifth embodiment of the present disclosure. The sensor 70 includes a detection layer 71, a separation layer 72, a deformation layer 73, an electrically conductive layer 74A, and an electrically conductive layer 74B.

The detection layer 71 has a first surface 71S1, and a second surface 71S2 on side opposite to the first surface 71S1. The electrically conductive layer 74A is provided to be opposed to the first surface 71S1 of the detection layer 71. The electrically conductive layer 74A is disposed in parallel to the detection layer 71. The electrically conductive layer 74B is provided to be opposed to the second surface 71S2 of the detection layer 71. The electrically conductive layer 74B is disposed in parallel to the detection layer 71. The separation layer 72 is provided between the detection layer 71 and the electrically conductive layer 74A. The deformation layer 73 is provided between the detection layer 71 and the electrically conductive layer 74B.

(Detection Layer)

The detection layer 71 is a mutual capacitive type detection layer. The detection layer 71 has flexibility. In a case where pressure acts on the sensing surface 20S, the detection layer 71 bends toward the electrically conductive layer 74B. The detection layer 71 includes a plurality of sensing sections SE71. The sensing section SE71 detects pressure acting on the sensing surface 20S, and outputs a detection result to the IC 13A. Specifically, the sensing section SE71 detects a capacitance corresponding to a distance between the sensing section SE71 and the electrically conductive layer 74B, and outputs a detection result to the IC 13A. It is to be noted that in the fifth embodiment, the IC 13B illustrated in FIG. 1 may not be included.

The detection layer 71 has a configuration similar to that of the detection layer 21A in the first embodiment.

(Separation Layer)

The separation layer 72 separates the detection layer 71 and the electrically conductive layer 74A from each other to make the detection layer 71 and the electrically conductive layer 74A parallel to each other. The separation layer 72 is configured to be elastically deformable in the in-plane direction of the sensing surface 20S (that is, the in-plane direction of the sensor 20) by a shear force acting in the in-plane direction of the sensing surface 20S.

A material of the separation layer 72 is similar to that of the separation layer 22 in the first embodiment.

A 25% CLD value of the separation layer 72 is 10 or more times a 25% CLD value of the deformation layer 73, preferably 30 or more times the 25% CLD value of the deformation layer 73, and more preferably 50 or more times the 25% CLD value of the deformation layer 73. In a case where the 25% CLD value of the separation layer 72 is 10 or more times the 25% CLD value of the deformation layer 73, it is possible to improve detection sensitivity of the sensor 70 to pressure and a shear force.

The 25% CLD value of the separation layer 72 is preferably 500 kPa or less. In a case where the 25% CLD value of the separation layer 72 exceeds 500 kPa, it may be difficult to elastically deform the separation layer 72 in the in-plane direction of the sensing surface 20S (that is, an in-plane direction of the sensor 70) by a shear force acting in the in-plane direction of the sensing surface 20S. Accordingly, detection sensitivity to a shear force in the in-plane direction of the sensor 70 may be decreased.

The 25% CLD values of the separation layer 72 and the deformation layer 73 are measured according to JIS K 6254.

A thickness of the separation layer 72 is preferably twice a thickness of the deformation layer 73, more preferably four or more times the thickness of the deformation layer 73, and still more preferably eight or more times the thickness of the deformation layer 23A. In a case where the thickness of the separation layer 72 is twice or more the thickness of the deformation layer 73, it is possible to further improve the detection sensitivity of the sensor 70 to the shear force.

The thickness of the separation layer 72 is preferably 10000 µm or less, and more preferably 4000 µm or less. In a case where the thickness of the separation layer 72 exceeds 10000 µm, it may be difficult to apply the sensor 70 to an electronic apparatus or the like.

The thicknesses of the separation layer 72 and the deformation layer 73 are determined by a method similar to the method of measuring the thicknesses of the separation layer 22, the deformation layer 23A, and the deformation layer 23B in the first embodiment.

A basis weight of the separation layer 72 is preferably 10 or more times a basis weight of the deformation layer 73, and more preferably 25 or more times the basis weight of the deformation layer 73. In a case where the basis weight of the separation layer 72 is 10 or more times the basis weight of the deformation layer 73, it is possible to further improve detection sensitivity of the sensor 70 to pressure and a shear force.

The basis weight of the separation layer 72 is preferably 1000 mg/cm$^2$ or less. In a case where the basis weight of the separation layer 72 exceeds 1000 mg/cm$^2$, it may be difficult to elastically deform the separation layer 72 in the in-plane direction of the sensing surface 20S (that is, the in-plane direction of the sensor 70) by a shear force acting in the in-plane direction of the sensing surface 20S. Accordingly, detection sensitivity to a shear force in the in-plane direction of the sensor 70 may be decreased.

The basis weights of the separation layer 72 and the deformation layer 73 are determined by a method similar to the method of measuring the basis weights of the separation layer 22, the deformation layer 23A, and the deformation layer 23B in the first embodiment.

(Electrically Conductive Layer)

The electrically conductive layer 74A has at least one of flexibility or elasticity. In a case where pressure acts on the sensing surface 20S, the electrically conductive layer 74A bends toward the detection layer 71. The electrically conductive layer 74B may or may not have at least one of flexibility or elasticity; however, in order to make the sensor 70 mountable on a curved surface, it is preferable that the electrically conductive layer 74B have at least one of flexibility or elasticity.

The electrically conductive layer 74A has a first surface 74AS1, and a second surface 74AS2 on side opposite to the first surface 74AS1. The second surface 74AS2 is opposed to the first surface 71S1 of the detection layer 71. The electrically conductive layer 74B has a first surface 74BS1, and a second surface 74BS2 on side opposite to the first surface 74BS1. The first surface 74BS1 is opposed to the second surface 71S2 of the detection layer 71.

The electrically conductive layer 74A and the electrically conductive layer 74B are so-called ground electrodes, and are coupled to a reference potential. Shapes and materials of the electrically conductive layer 74A and the electrically conductive layer 74B are similar to the shape and the material of the electrically conductive layer 24A in the first embodiment.

(Deformation Layer)

The deformation layer 73 separates the detection layer 71 and the electrically conductive layer 74B from each other to make the detection layer 71 and the electrically conductive layer 74B parallel to each other. It is possible to adjust sensitivity and a dynamic range of the detection layer 71 by the thickness of the deformation layer 73.

The deformation layer 73 is configured to be elastically deformable in accordance with pressure acting on the sensing surface 20S, that is, pressure acting in a thickness direction of the sensor 70. A material of the deformation layer 73 is similar to that of the deformation layer 23A in the first embodiment.

[Operation of Sensor]
(Operation of Sensor Upon Pressure Detection)

In a case where the sensing surface 20S is pressed by the object 41 to cause pressure to act on the sensing surface 20S, the electrically conductive layer 74A, the separation layer 72, and the detection layer 71 each bend at a pressure acting point as a center toward the electrically conductive layer 74B to crush a portion of the deformation layer 73. This causes a portion of the detection layer 71 and a portion of the electrically conductive layer 74B to come close to each other. As a result, some of lines of electric force of a plurality of sensing sections SE71 included in the portion, which comes close to the electrically conductive layer 74A, of the detection layer 71 (that is, some of lines of electric force between the sense electrodes 36 and the pulse electrodes 37) travel toward the electrically conductive layer 74A to change the capacitances of the sensing sections SE71.

(Operation of Sensor Upon Shear Force Detection)

In a case where a shear force acts on the sensor 70, the separation layer 72 is elastically deformed in the in-plane direction of the sensor 70, and a pressure acting position of the sensing surface 20S is displaced in the in-plane direction of the sensor 70. The CPU 12A detects change in a signal distribution in the in-plane direction of the sensor 70 on a time-series basis, which makes it possible to detect a shear force.

[Effects]

In the sensor 50 according to the fifth embodiment, it is possible to detect a three-axis force with a simpler configuration than that of the sensor 20 according to the first embodiment.

6 Sixth Embodiment

[Configuration of Sensor]

FIG. 28 is a cross-sectional view of an example of a configuration of a sensor 120 according to a sixth embodiment of the present disclosure. The sensor 120 differs from the sensor 70 according to the fifth embodiment in that a deformation layer 121 is included in place of the separation layer 72 (see FIG. 20). The sensor 120 may include an exterior material 122 above the first surface 74AS1 of the electrically conductive layer 74A. It is to be noted that in the sixth embodiment, components similar to those of the fifth embodiment are denoted by the same reference signs, and description thereof is omitted.

The deformation layer 121 has a function and a configuration similar to those of the deformation layer 23A in the first embodiment. The exterior material 122 has flexibility. In a case where pressure acts on a front surface of the exterior material 122, the exterior material 122 bends toward the detection layer 71. The exterior material 122 includes, for example, at least one type selected from a group including a polymeric resin layer, a metal layer, and an metal oxide layer.

[Operation of Sensor]
(Operation of Sensor Upon Pressure Detection)

In a case where the front surface of the external material 122 is pressed by the object 41 to cause pressure to act on the sensing surface 20S, the electrically conductive layer 74A bends at a pressure acting point as a center toward the detection layer 71 to crush a portion of the deformation layer 121. This causes a portion of the electrically conductive layer 74A and a portion of the detection layer 71 to come close to each other. As a result, some of lines of electric force of a plurality of sensing sections SE71 included in the portion, which comes close to the electrically conductive layer 74, of the detection layer 71 travel toward the electrically conductive layer 74A to change the capacitances of the sensing sections SE71.

In addition, pressure acts on the first surface 71S1 of the detection layer 71 by the portion crushed as described above of the deformation layer 121, and the detection layer 71 bends at a pressure acting point as a center toward the electrically conductive layer 74B. This causes a portion of the detection layer 71 and a portion of the electrically conductive layer 74B to come close to each other. As a result, some of lines of electric force of a plurality of sensing sections SE71 included in the portion, which comes close to the electrically conductive layer 74B, of the detection layer 71 travel toward the electrically conductive layer 74B to change the capacitances of the plurality of sensing sections SE71.

The IC 13A sequentially scans the plurality of sensing sections SE71 included in the detection layer 71 to acquire an output signal distribution, that is, a capacitance distribution from the plurality of sensing sections SE21. The IC 13A outputs the acquired output signal distribution to the CPU 12A of the host device 12. The CPU 12A computes magnitude of pressure and a pressure acting position on the basis of the output signal distribution received from the IC 13A.

In a case where the sensor module 11 includes the sensor 120 described above, the sensor module 11 may not include the IC 13B (see FIG. 1).

6 Modification Examples

Modification Example 1

In the second embodiment, as illustrated in FIG. 21, each of the separation layer 25A and the separation layer 25B may be divided into a plurality of sections having the same pattern in the in-plane direction of the sensing surface 20S, the divided sections of the separation layer 25A and the divided sections of the separation layer 25B may be superimposed on each other in the thickness direction of the sensor 20A. This makes it possible to detect a three-axis force at a plurality of locations in the sensing surface 20S.

Similarly, in the first embodiment, the separation layer 22 may be divided into a plurality of sections in the in-plane direction of the sensing surface 20S. In the third embodiment, the separation layer 52 may be divided into a plurality of sections in the in-plane direction of the sensing surface 20S. In the fourth embodiment, the separation layer 62 may be divided into a plurality of sections in the in-plane direction of the sensing surface 20S. In the fifth embodiment, the separation layer 72 may be divided into a plurality of sections in the in-plane direction of the sensing surface 20S. Even in these cases, it is possible to detect a three-axis force at a plurality of locations in the sensing surface 20S.

Modification Example 2

In the second embodiment, description has been given of a case where the arrangement pitch P1 of the plurality of sensing sections SE21 included in the detection layer 21A and the arrangement pitch P2 of the plurality of sensing sections SE22 included in the detection layer 21B are the same as each other; however, as illustrated in FIG. 22, the arrangement pitch P1 of the plurality of sensing sections SE22 and the arrangement pitch P2 of the plurality of sensing sections SE21 may be different from each other.

In this case, the arrangement pitch P2 of the plurality of sensing sections SE22 may be larger than the arrangement pitch PI of the plurality of sensing sections SE21, and an area of the sensing section SE22 may be larger than an area of the sensing section SE21. In a case where pressure acts on the sensing surface 20S, pressure acts on the detection layer 21B on lower side via a plurality of layers such as the deformation layer 23A and the separation layer 25; therefore, a deformation range of the detection layer 21B on the lower side tends to be broader than a deformation range of the detection layer 21A on upper side. Accordingly, as described above, the arrangement pitch P2 of the plurality of sensing sections SE22 is larger than the arrangement pitch P1 of the plurality of sensing sections SE21, and the area of the sensing section SE22 is larger than the area of the sensing section SE21, which makes it possible to improve sensitivity of the detection layer 21B. Here, the area of the sensing section SE21 means an area of the sensing section SE21 in a plan view of the sensing section SE21 from a Z-axis direction (a thickness direction of the detection layer 21A). In addition, the area of the sensing section SE22 means an area of the sensing section SE22 in a plan view of the sensing section SE22 from the Z-axis direction (a thickness direction of the detection layer 21B).

Similarly, in the first embodiment, the arrangement pitch P2 of the plurality of sensing sections SE22 may be larger than the arrangement pitch P1 of the plurality of sensing sections SE21, and the area of the sensing section SE22 may be larger than the area of the sensing section SE21. In the third embodiment, the arrangement pitch P2 of the plurality of sensing sections SE52 may be larger than the arrangement pitch P1 of the plurality of sensing sections SE21, and an area of the sensing section SE52 may be larger than an area of the sensing section SE21. In the fourth embodiment, the arrangement pitch P2 of the plurality of sensing sections SE62 may be larger than the arrangement pitch P1 of the plurality of sensing sections SE61, and an area of the sensing section SE62 may be larger than an area of the sensing section SE61.

Modification Example 3

In the first and second embodiments, the 25% CLD value of the deformation layer 23A may be smaller than the 25% CLD value of the deformation layer 23B. Accordingly, when pressure acts on the sensing surface 20S, the deformation layer 23A is crushed in a low pressure range (e.g., equal to or higher than 1 g and equal to or lower than 100 g), and the deformation layer 23B is crushed in a high pressure range (e.g., higher than 100 g and equal to or lower than 500 g). The high pressure range (second pressure range) is set to be a higher range than the low pressure range (first pressure range).

In a case where the configuration described above is adopted, the detection layer 21A may be used for pressure detection in the low pressure range (e.g., equal to or higher than 1 g and equal to or lower than 100 g), and the detection layer 21B may be used for pressure detection in the high pressure range (e.g., higher than 100 g and equal to or lower than 500 g).

In the third embodiment, the 25% CLD value of the deformation layer 23A may be smaller than the 25% CLD value of the deformation layer 53B. Accordingly, when pressure acts on the sensing surface 20S, the deformation layer 23A is crushed in the low pressure range (e.g., equal to or higher than 1 g and equal to or lower than 100 g), and the deformation layer 53B is crushed in the high pressure range (e.g., higher than 100 g and equal to or lower than 500 g). The high pressure range (second pressure range) is set to be a higher range than the low pressure range (first pressure range).

In a case where the configuration described above is adopted, the detection layer 21A may be used for pressure detection in the low pressure range (e.g., equal to or higher than 1 g and equal to or lower than 100 g), and the detection layer 51B may be used for pressure detection in the high pressure range (e.g., higher than 100 g and equal to or lower than 500 g).

In the fourth embodiment, the 25% CLD value of the deformation layer 23A may be smaller than each of the 25% CLD values of the deformation layer 63B and the deformation layer 23B. In addition, the 25% CLD value of the deformation layer 63A may be smaller than each of the 25% CLD values of the deformation layer 63B and the deformation layer 23B. Accordingly, when pressure acts on the sensing surface 20S, the deformation layer 23A and the deformation layer 63A are crushed in the low pressure range (e.g., equal to or higher than 1 g and equal to or lower than 100 g), and the deformation layer 63B and the deformation layer 23B are crushed in the high pressure range (e.g., higher than 100 g and equal to or lower than 500 g). The high pressure range (second pressure range) is set to be a higher range than the low pressure range (first pressure range).

In a case where the configuration described above is adopted, the detection layer 61A may be used for pressure detection in the low pressure range (e.g., equal to or higher than 1 g and equal to or lower than 100 g), and the detection layer 61B may be used for pressure detection in the high pressure range (e.g., higher than 100 g and equal to or lower than 500 g).

Modification Example 4

In the first embodiment, as illustrated in FIG. 23, the sensor 20 may further include a front surface layer 81 provided on a front surface (sensing surface 20S) on side of the electrode layer 24. The front surface layer 81 is a high friction layer that has a front surface having a high coefficient of friction. The sensor 20 further includes the front surface layer 81 in such a manner, which makes it possible to prevent an object from sliding on the sensing surface 20S of the sensor 20. This makes it possible to improve detection accuracy of the sensor 20 to a shear force.

The front surface layer 81 may have an irregular shape on the front surface to achieve the front surface having a high coefficient of friction, the front surface layer 81 may include a rubber-based resin (e.g., silicone rubber) to achieve the front surface having high coefficient of friction, or the front surface layer 81 may have an irregular shape on the front surface and include a rubber-based resin to achieve the front surface having a high coefficient of friction. A coefficient of static friction of the front surface of the front surface layer 81 is preferably 1 or more in terms of preventing an object from sliding on the sensing surface 20A of the sensor 20. Here, the coefficient of static friction is measured with use of a coefficient-of-friction fixture manufactured from IMADA Co., Ltd. according to JIS K 7125:1999. The front surface layer 81 may be an exterior material of an electronic apparatus or the like.

Even in the second to fifth embodiments, the sensors 20A, 50, 60, and 70 may further include the front surface layer 81 provided on the front surface (sensing surface 20S) on side of the electrically conductive layer 24A or 74A in a similar manner.

Modification Example 5

In the first to fourth embodiments, sizes of two detection layers may be different from each other. For example, in the first and second embodiments, an outer edge of the detection layer 21A may be positioned inside an outer edge of the detection layer 21B. In this case, it is possible to stably perform detection even in a case where an object hits an edge section of the sensor 20 or 20A. Similarly, in the third embodiment, the outer edge of the detection layer 21A may be positioned inside an outer edge of the detection layer 51B, and in the fourth embodiment, an outer edge of the detection layer 61A may be positioned inside an outer edge of the detection layer 61B. Even in this case, effects similar to those described above are achievable.

FIG. 24 illustrates an example of a configuration of the sensor 20A in which the outer edge of the detection layer 21A is positioned inside the outer edge of the detection layer 21B in the second embodiment. The detection layer 21A, the deformation layer 23A, the electrically conductive layer 24A, and the separation layer 25A may be included in a first stacked body 82A, and the detection layer 21B, the deformation layer 23B, the electrically conductive layer 24B, the electrically conductive layer 24C, and the separation layer 25B may be included in a second stacked body 82B. An outer edge of the first stacked body 82A may be positioned inside an outer edge of the second stacked body 82B.

Modification Example 6

In the second embodiment, as illustrated in FIG. 25, the sensor 20 may further include a cover layer 83 provided on the front surface (sensing surface 20S) on side of the electrically conductive layer 24A. The cover layer 83 includes a plurality of structures 83A and a protective layer 83B. Each of the plurality of structures 83A is provided for a corresponding one of the plurality of sensing sections SE21. That is, each of the plurality of structures 83A is provided to be superimposed on a corresponding one of the plurality of sensing sections SE21 and a corresponding one of the plurality of sensing sections SE22 in the thickness direction of the sensor 20A. The structures 83A each function as a pusher that pushes the sensing surface 20S. The plurality of structures 83A is covered with the protective layer 83B. The protective layer 83B protects the plurality of structures 83A, and prevents peeling or the like of the plurality of structures 83A.

An elastic modulus of the structure 83A is larger than an elastic modulus of the protective layer 83B. The elastic modulus of the structure 83A exceeds, for example, 100 MPa. The elastic modulus of the protective layer 83B is, for example, 100 MPa or less. The elastic moduli described above are measured according to JIS K 7161.

The structures 83A each function as a pusher that pushes the sensing surface 20S; therefore, pressure is concentrated on the sensing sections SE21 and SE22 in a corresponding portion of the sensing surface 20S. This makes it possible to improve sensitivity of the sensor 20A.

Even in the first and third to fifth embodiments, the sensors 20, 50, 60, and 70 may further include the cover layer 83 provided on the front surface (sensing surface 20S) on side of the electrically conductive layer 24A or 74A in a similar manner.

Modification Example 7

In the first to fourth embodiments, a case where the sensors 20, 20A, 50, and 60 each include two detection layers has been described; however, the sensors 20, 20A, 50, and 60 may each include three or more detection layers.

FIG. 26 is a cross-sectional view of an example of a configuration of a sensor 20B including the detection layer 21A, the detection layer 21B, and a detection layer 21C. The sensor 20B differs from the sensor 20 according to the first embodiment in that the detection layer 21C, a separation layer 22A, a deformation layer 23C, and the electrically conductive layer 24C are further included. It is to be noted that in a modification example 7, components similar to those of the first embodiment are denoted by the same reference signs, and description thereof is omitted.

The detection layer 21C has a first surface 21CS1 opposed to the second surface 21BS2 of the detection layer 21B, and a second surface 21CS2 on side opposite to the first surface 21CS1. The separation layer 22A is provided between the electrically conductive layer 24B and the detection layer 21C. The electrically conductive layer 24C is provided to be opposed to the second surface 21CS2 of the detection layer 21C. The electrically conductive layer 24C is disposed in parallel to the detection layer 21C. The deformation layer 23C is provided between the detection layer 21C and the electrically conductive layer 24C.

The detection layer 21C is a mutual capacitive type detection layer. The detection layer 21C has flexibility. In a case where pressure acts on the sensing surface 20S, the detection layer 21C bends toward the electrically conductive layer 24C. The detection layer 21C includes a plurality of sensing sections (third sensing section) SE23. The sensing section SE23 detects pressure acting on the sensing surface 20S, and outputs a detection result to an IC (not illustrated). Specifically, the sensing section SE23 detects a capacitance corresponding to a distance between the sensing section SE23 and the electrically conductive layer 24C, and outputs a detection result to the IC.

The detection layer 21C has a configuration similar to the configuration of the detection layer 21A in the first embodiment.

The separation layer 22A separates the electrically conductive layer 24B and the detection layer 21C from each other.

The separation layer 22A is configured to be elastically deformable in the in-plane direction of the sensing surface 20S (that is, an in-plane direction of the sensor 20B) by a shear force acting in the in-plane direction of the sensing surface 20S.

The material of the separation layer 72 is similar to that of the separation layer 22 in the first embodiment.

The electrically conductive layer 24C may or may not have at least one of flexibility or elasticity; however, in order to make the sensor 20B mountable on a curved surface, it is preferable that the electrically conductive layer 24C have at least one of flexibility or elasticity.

The electrically conductive layer 24C is a so-called ground electrode, and is coupled to a reference potential. A shape and a material of the electrically conductive layer 24C may be similar to the shape and the material of the electrically conductive layer 24A in the first embodiment.

The deformation layer 23C separates the detection layer 21C and the electrically conductive layer 24C from each other to make the detection layer 21C and the electrically conductive layer 24CA parallel to each other. The deformation layer 23C is configured to be elastically deformable in accordance with pressure acting on the sensing surface 20S, that is, pressure acting in a thickness direction of the sensor 20B.

A material of the deformation layer 23C is similar to that of the deformation layer 23A in the first embodiment.

Modification Example 8

In the first to fifth embodiments, description has been given of a case where the sense electrode 36 and the pulse electrode 37 each have a comb shape; however, the shapes of the sense electrode 36 and the pulse electrode 37 are not limited thereto. The sense electrode 36 and the pulse electrode 37 may have, for example, a flat plate shape, a mesh shape, a concentric shape, a spiral shape, a radial shape, a stripe shape, or the like.

Modification Example 9

In the first to fifth embodiments, description has been given of a case where the sense electrode 36 and the pulse electrode 37 are provided on the first surface 31S1 of the base 31; however, the sense electrode 36 and the pulse electrode 37 may be provided on different surfaces of the base 31. For example, the sense electrode 36 may be provided on the first surface 31S1 of the base 31, the pulse electrode 37 may be provided on the second surface 31S2 of the base 31, and the sense electrode 36 and the pulse electrode 37 may be opposed to each other with the base 31 interposed therebetween.

Modification Example 10

In the first to fifth embodiments, description has been given of a case where the detection layers 21A, 21B, 51B. 61A, 61B, and 71 are mutual capacitive type detection layers; however, the detection layers 21A, 21B, 51B, 61A, 611B, and 71 may be self-capacitive type detection layers. In this case, the detection layers 21A, 21B, 51B, 61A, 61B, and 71 each include a base, and a thin film-shaped electrode layer provided on the base.

Modification Example 11

In the first embodiment, description has been given of an example in which the sensor 20 is a capacitive type sensor that is able to detect a three-axis force distribution; however, it may be possible to detect a position of the sensor 20 in space, in addition to the three-axis force distribution described above. Specifically, for example, the sensor 20 may further include a position detector that detects the position of the sensor 20 in three-dimensional space. The position detector is preferably provided at a location other than the detection layer 21A that detects the three-axis force distribution.

FIG. 29 is a plan view of an example of a configuration of a flexible printed circuit board having a position detector 91. FIG. 30 is a cross-sectional view taken along a line XXX-XXX of FIG. 29. The flexible printed circuit board includes the detection layer 21A, the coupling section 21A1, and the position detector 91.

The position detector 91 includes a projected section 91A and a position sensor 91B. The projected section 91A is a support for supporting the position sensor 91B. The projected section 91A is projected from the coupling section 21A1. The projected section 91A has a film shape similarly to the coupling section 21A1. An electrode (not illustrated) for implementing the position sensor 91B is provided on one main surface of the projected section 91A.

The position sensor 91B detects the position of the sensor 20, and outputs an acquired result to the CPU 12A (see FIG. 1) of the host device 12. This makes it possible to receive position information about the sensor 20 together with a capacitance distribution from the sensor 20. Accordingly, in a case where the sensor 20 is provided in an end effector of a robot, the CPU 12A is able to detect the position of the end effector in three-dimensional space and pressure or the like acting on the end effector at that position on the basis of the capacitance distribution and the position information received from the sensor 20.

The position sensor 91B is provided on the one main surface of the projected section 91A. For example, the position sensor 91B is implemented on an electrode provided on the one main surface of the projected section 91A with solder 91C interposed therebetween. FIG. 30 illustrates an example in which the solder 91C is a solder ball. The above-described electrode and the plurality of coupling terminals 21 A2 are coupled to each other by a wiring line (not illustrated).

Even in the second to sixth embodiments, the sensors 20A, 50, 60, 70, and 120 may each include the position detector 91.

Modification Example 12

As illustrated in FIG. 31 and FIG. 32, a main surface (sensing surface 20S) and a side surface of the sensor 20 in the first embodiment may be covered with a cover layer 101. In this case, a front surface of a housing 102 provided with the sensor 20, together with the sensor 20, may be covered with the cover layer 101. As illustrated in FIG. 33, the side surface of the sensor 20 in the first embodiment may be covered with the cover layer 101. A waterproof sensor may be configured by the sensor 20 and the cover layer 101.

The cover layer 101 protects the sensor 20 from water and the like. In a case where the main surface of the sensor 20 is covered with the cover layer 101, the cover layer 101 is preferably in close contact with the main surface of the sensor 20. This makes it possible to suppress generation of a dead region in the sensor 20 covered with the cover layer 101. In addition, it is possible to suppress a decrease in detection accuracy of the sensor 20 covered with the cover layer 101. The cover layer 101 and the main surface of the sensor 20 may be bonded together by an adhesive layer (not illustrated). Similarly, the cover layer 101 and the side surface of the sensor 20 may be bonded together by an adhesive layer (not illustrated).

The cover layer 101 is, for example, a plastic film having a self-supporting ability or a coating film that does not have a self-supporting ability and is applied to the side surface of the sensor 20 or the main surface and the side surface of the sensor 20. The cover layer 101 may be a stacked body of a plastic film and a coating film. In this case, the coating film is preferably provided inside the plastic film.

The plastic film preferably has elasticity to be deformable in accordance with change in the shape of the sensor 20. The plastic film preferably includes an elastomer in terms of elasticity. The elastomer may be foamed body. The elastomer includes, for example, synthetic rubber. The synthetic rubber includes, for example, at least one type selected from a group including silicon rubber, urethane rubber, and acrylic rubber. The coating film includes at least one type selected from a group including gel, a grease, and an adhesive. The gel includes, for example, at least one type selected from a group including silicon gel and urethane gel. The grease includes, for example, at least one type selected from a group including a silicone-based grease, a fluorine-based grease (e.g., a PTFE grease using PTFE as a thickener), and a hydrocarbon-based grease (e.g., an apiezon grease). As described above, in this description, a pressure sensitive adhesive is defined as one type of adhesive.

As described above, the side surface of the sensor 20 is covered with the cover layer 101, which makes it possible to suppress impregnation of the deformation layers 23A and 23B with water and the like from side surfaces of the deformation layers 23A and 23B. This makes it possible to prevent the deformation layers 23A and 23B from becoming less deformable by impregnation with water and the like. Accordingly, it is possible to suppress deterioration in function of the sensor 20 due to water and the like.

In a case where the deformation layers 23A and 23B include a foam resin, entry of water and the like into the foam resin may cause the deformation layers 23A and 23B to become less deformable by pressing the sensing surface 20S. This may considerably deteriorate characteristics of the sensor 20. Accordingly, in a case where the deformation layers 23A and 23B include the foam resin, it is particularly effective to protect the sensor 20 by the cover layer 101.

Even in the sensors 20A, 50, 60, 70, and 120 in the second to sixth embodiments, the main surfaces and the side surfaces of the sensors 20A, 50, 60, 70, and 120 may be covered with the cover layer 101, or the side surfaces of the sensors 20A, 50, 60, 70, and 120 may be covered with the cover layer 101.

Modification Example 13

As illustrated in FIG. 34 and FIG. 35, the sensor 20 in the first embodiment may include a sealing section 111A and a sealing section 111B. The sealing section 111A protects the deformation layer 23A from water and the like. The sealing section 111B protects the deformation layer 23B from water and the like.

The sealing section 111A is provided between an outer edge section of the first surface 21AS1 of the detection layer 21A and an outer edge section of the second surface 24AS2 of the electrically conductive layer 24A. The sealing section 111A has a closed loop shape surrounding the side surface of the deformation layer 23A. The sealing section 111A may be in close contact with the side surface of the deformation layer 23A.

The sealing section 111B is provided between an outer edge section of the second surface 21AS2 of the detection layer 21B and an outer edge section of the first surface 24BS1 of the electrically conductive layer 24B. The sealing section 111B has a closed loop shape surrounding the side surface of the deformation layer 23B. The sealing section 111B may be in close contact with the side surface of the deformation layer 23B.

The sealing sections 111A and 111B are, for example, plastic films having a self-supporting ability or coating films that do not have a self-supporting ability and are applied to the side surfaces of the deformation layers 23A and 23B. Each of the sealing sections 111A and 111B may be a stacked body of a plastic film and a coating film. In this case, the coating film is preferably provided inside the plastic film. The plastic film may include a material similar to that of the plastic film in the modification example 12. The coating film may include a material similar to that of the coating film in the modification example 12.

As described above, the sealing section 111A surrounds the side surface of the deformation layer 23A, and the sealing section 111B surrounds the side surface of the deformation layer 23B, which makes it possible to suppress deterioration in function of the sensor 20 due to water and the like, as with the modification example 12.

In the second embodiment (see FIG. 11), the sealing section 111A may be provided between the outer edge section of the first surface 21AS1 of the detection layer 21A and the outer edge section of the second surface 24AS2 of the electrically conductive layer 24A to surround the side surface of the deformation layer 23A. The sealing section 111B may be provided between the second surface 21BS2 of the detection layer 21B and the first surface 24BS1 of the electrically conductive layer 24B to surround the side surface of the deformation layer 23B.

In the third embodiment (see FIG. 14), the sealing section 111A may be provided between the outer edge section of the first surface 21AS1 of the detection layer 21A and the outer edge section of the second surface 24AS2 of the electrically conductive layer 24A to surround the side surface of the deformation layer 23A. The sealing section 111B may be provided between an outer edge section of the first surface 21BA1 of the detection layer 51B and an outer edge section of the second surface 54BS2 of the electrically conductive layer 54B to surround the side surface of the deformation layer 53B.

In the fourth embodiment (see FIG. 17), the sealing section 111A may be provided between an outer edge section of the first surface 61AS1 of the detection layer 61A and the outer edge section of the second surface 24AS2 of the electrically conductive layer 24A to surround the side surface of the deformation layer 23A. The sealing section 111A may be provided between an outer edge section of the second surface 61AS2 of the detection layer 61A and an outer edge section of the first surface 64AS1 of the electrically conductive layer 64A to surround the side surface of the deformation layer 63A. The sealing section 111B may be provided between an outer edge section of the first surface 61BS1 of the detection layer 61B and an outer edge section of the second surface 64BS2 of the electrically conductive layer 64B to surround the side surface of the deformation layer 63B. The sealing section 111B may be provided between an outer edge section of the second surface 61BS2 of the detection layer 61B and the outer edge section of the first surface 24BS1 of the electrically conductive layer 24B to surround the side surface of the deformation layer 23B.

In the fifth embodiment (see FIG. 20), the sealing section 111B may be provided between an outer edge section of the second surface 71S2 of the detection layer 71 and an outer edge section of the first surface 74BS1 of the electrically conductive layer 74B to surround the side surface of the deformation layer 73.

In the sixth embodiment (see FIG. 28), the sealing section 111A may be provided between an outer edge section of the first surface 71S1 of the detection layer 71 and an outer edge section of the second surface 74AS2 of the electrically conductive layer 74A to surround the side surface of the deformation layer 121. The sealing section 111B may be provided between an outer edge section of the second surface 71S2 of the detection layer 71 and an outer edge section of the first surface 74BS1 of the electrically conductive layer 74B to surround the side surface of the deformation layer 73.

Modification Example 14

The sensor 120 in the sixth embodiment may include a gap layer 123 in place of the deformation layer 73 (see FIG. 28), as illustrated in FIG. 36. The side surface of the sensor 120 may be covered with the cover layer 101. Although not illustrated, the main surface (sensing surface 20S) and the side surface of the sensor 120 may be covered with the cover layer 101. In this case, the exterior material 122 may be provided inside the cover layer 101, or may be provided outside the cover layer 101.

The gap layer 123 has an insulating property, and spaces the electrically conductive layer 74B and the detection layer 71 apart from each other. An initial capacitance of the sensor 20 is adjusted by a thickness of the gap layer 123. The gap layer 123 may hardly elastically be deformed by pressure applied to the sensing surface 20S to maintain substantially constant space between the electrically conductive layer 74B and the detection layer 71.

The gap layer 123 may or may not have an adhesive property. In a case where the gap layer 123 has an adhesive property, the electrically conductive layer 74B and the detection layer 71 are bonded together by the gap layer 123. The gap layer 123 having an adhesive property includes a single-layer adhesive layer, or a stacked body in which adhesive layers are provided on both surfaces of a base (e.g., a double-faced adhesive film).

As described above, in a case where the sensor 120 includes the gap layer 123 in place of the deformation layer 73, the detection layer 71 detects a capacitance corresponding to a distance between the sensing section SE71 and the electrically conductive layer 74A, and outputs a detection result to the IC 13A.

In the above-described example, description has been given of an example in which the side surface of the sensor 120 is covered with the cover layer 101; however, as illustrated in FIG. 37, the sensor 120 may include the sealing section 111A. The sealing section 111A is provided between the outer edge section of the first surface 71S1 of the detection layer 71 and the outer edge section of the second surface 74AS2 of the electrically conductive layer 74A to surround the side surface of the deformation layer 121. The cover layer 101 and the sealing section 111A may be used in combination.

7 Application Examples

[Example of Electronic Apparatus]

At least one type of the sensor 20, 20A, 20B, 50, 60, or 70 according to the first to fifth embodiments and the modification examples thereof is applicable to various electronic apparatuses. At least one type of the sensor 120 according to the sixth embodiment and the modification examples thereof is also applicable to various electronic apparatuses. These sensors are applicable to, for example, a personal computer, a mobile phone such as a smartphone, a television, a remote controller, a camera, a gaming console, a navigation system, an electronic book, an electronic dictionary, a portable music player, a keyboard, a wearable terminal, a radio, a stereo, medical equipment, a robot, and the like. Examples of the wearable terminal include a smart watch, a head-mounted display, a wristband, a ring, glasses, shoes, clothes, and the like.

[Examples Other than Electronic Apparatuses]

At least one type of the sensor 20, 20A, 20B. 50, 60, or 70 according to the first to fifth embodiments and the modification examples thereof is applicable to various ones other than electronic apparatuses. At least one type of the sensor 120 according to the sixth embodiment and the modification examples thereof is also applicable to various ones other than electronic apparatuses. These sensors are applicable to, for example, electric apparatuses such as a power tool, a refrigerator, an air conditioner, a water heater, a microwave oven, a dishwasher, a washing machine, a dryer, a lighting apparatus, and a toy. Furthermore, the sensors are applicable to a building including a house, a building member, a vehicle, furniture such as a table or a desk, a manufacturing apparatus, an analyzer, and the like. Examples of the building member include a paving stone, a wall material, a floor tile, a floorboard, and the like. Examples of the vehicle include a wheeled vehicle (e.g., an automobile, a motorcycle, and the like), a vessel, a submarine, a rail vehicle, an aircraft, a spacecraft, an elevator, play equipment, and the like.

[Application Example to Robot Hand]

At least one type of the sensor 20, 20A, 20B, 50, 60, or 70 according to the first to fifth embodiments and the modification examples thereof may be applied to a robot hand. At least one type of the sensor 120 according to the sixth embodiment and the modification examples thereof may be applied to a robot hand.

FIG. 27 illustrates a configuration of a robot hand 140 to which sensors 113-1 to 113-16 are applied. Each of the sensors 113-1 to 113-16 is one of the sensors 20, 20A, 20B, 50, 60, and 70 according to the first to fifth embodiments and the modification examples thereof. Each of the sensors 113-1 to 113-16 may be at least one type of the sensor 120 according to the sixth embodiment and the modification examples thereof.

The sensors 113-1 and 113-2 are provided on a palm included in the robot hand 140. The sensor 113-3 is provided above a first joint on a palmar surface of a thumb included in the robot hand 140, and the sensor 113-4 is provided between the first joint and a second joint on the palmar surface of the thumb. The sensor 113-5 is provided above a first joint on a palmar surface of an index finger. The sensor 113-6 is provided between the first joint and a second joint on the palmer surface of the index finger. The sensor 113-7 is provided between the second joint and a third joint on the palmer surface of the index finger.

Furthermore, the sensor 113-8 is provided above a first joint on a palmar surface of a middle finger, and the sensor 113-9 is provided between the first joint and a second joint on the palmar surface of the middle finger. The sensor 113-10 is provided between the second joint and a third joint on the palmar surface of the middle finger. The sensor 113-11 is provided above a first joint on a palmar surface of a ring finger. The sensor 113-12 is provided between the first joint and a second joint on the palmar surface of the ring finger. The sensor 113-13 is provided between the second joint and a third joint on the palmar surface of the ring finger. The sensor 113-14 is provided above a first joint on a palmar surface of a little finger. The sensor 113-15 is provided between the first joint and a second joint on the palmar surface of the little finger. The sensor 113-16 is provided between the second joint and a third joint on the palmar surface of the little finger.

EXAMPLES

Hereinafter, the present disclosure is described in detail with examples; however, the present disclosure is not limited only to these examples.

In the following examples and the following comparative examples, 25% CLD, thicknesses, and basis weights of separation layers and deformation layers (first deformation layers and second deformation layers) were determined by measurement methods described in the first embodiment.

Sensors of examples 1 to 6 correspond to the sensor 50 according to the third embodiment. It is to be noted that in the following examples, components corresponding to those of the embodiments described above are denoted by the same reference signs, and description thereof is omitted.

Examples 1 to 6 and Comparative Examples 1 to 5

Sensors were fabricated by stacking the following members.

First electrically conductive layer: An electrically conductive cloth having a thickness of 30 μm
First deformation layer: A sponge having 25% CLD, a thickness, and a basis weight illustrated in Table 1
First detection layer: An FPC having a thickness of 100 μm
Separation layer: silicone gel having 25% CLD, a thickness, and a basis weight illustrated in Table 1
Second electrically conductive layer: An electrically conductive cloth having a thickness of 30 μm
Second deformation layer: A sponge having 25% CLD, a thickness, and a basis weight illustrated in Table 1
First detection layer: An FPC having a thickness of 100 μm
Adhesive layer: A stacked body of a double-faced tape having a thickness of 100 μm and a double-faced tape having a thickness of 30 μm
Third electrically conductive layer: an electrically conductive cloth having a thickness of 30 μm It is to be noted that the sensor was fabricated to have a surface on side of the first electrically conductive layer as a sensing surface and a surface on side of the third electrically conductive layer as a back surface of both surfaces of the sensor.

(Detection Sensitivity in Z-Axis Direction)

Detection sensitivity (S/N) was determined when pressing a sensing section from above in the Z-axis direction with 1 N with use of a silicon rubber key stroker having φ 6 mm.

(Detection Sensitivity in XY-Axis Direction)

Detection sensitivity (S/N) was determined when a shear force of 1 N acted in an XY-axis direction while pressing the sensing section from above in the Z-axis direction with 1 N with use of a silicon rubber key stroker having φ 6 mm.

Table 1 illustrates configurations and evaluation results of the sensors of the examples 1 to 6 and comparative examples 1 to 5.

TABLE 1

|  | 25% CLD | | Ratio of 25% CLD (Separation Layer/ Deformation Layer) | Thickness | | Ratio of Thickness (Separation Layer/ Deformation Layer) |
| --- | --- | --- | --- | --- | --- | --- |
|  | Deformation Layer [kPa] | Separation Layer [kPa] |  | Deformation Layer [μm] | Separation Layer [μm] |  |
| Example 1 | 8 | 340 | 42.5 | 300 | 2000 | 6.6 |
| Example 2 | 8 | 500 | 62.5 | 300 | 2000 | 6.6 |
| Example 3 | 10 | 340 | 34 | 500 | 2000 | 4 |
| Example 4 | 10 | 500 | 50 | 500 | 2000 | 4 |
| Example 5 | 10 | 500 | 50 | 500 | 4000 | 8 |
| Example 6 | 22 | 340 | 15.45 | 300 | 2000 | 6.6 |
| Comparative Example 1 | 340 | 340 | 1 | 2000 | 2000 | 1.66 |
| Comparative Example 2 | 8 | 8 | 1 | 300 | 300 | 1 |
| Comparative Example 3 | 8 | 10 | 1.25 | 300 | 500 | 1.66 |
| Comparative Example 4 | 340 | 8 | 0.02 | 2000 | 300 | 0.15 |
| Comparative Example 5 | 51 | 340 | 6.6 | 300 | 2000 | 6.6 |

|  | Basis Weight | | Ratio of Basis Weight (Separation Layer/ Deformation Layer) | Detection Sensitivity in Z-axis Direction [S/N] | Detection Sensitivity in XY-axis Direction [S/N] |
| --- | --- | --- | --- | --- | --- |
|  | Deformation Layer [mg/cm$^2$] | Separation Layer [mg/cm$^2$] |  |  |  |
| Example 1 | 7.2 | 200 | 27.8 | 5.0 | 3.0 |
| Example 2 | 7.2 | 200 | 27.8 | 5.0 | 2.0 |
| Example 3 | 16 | 200 | 12.5 | 4.0 | 2.0 |
| Example 4 | 16 | 200 | 12.5 | 4.0 | 2.0 |
| Example 5 | 16 | 400 | 25 | 4.0 | 4.0 |
| Example 6 | 20 | 200 | 10 | 2.0 | 1.2 |

TABLE 1-continued

| | | | | | |
|---|---|---|---|---|---|
| Comparative Example 1 | 200 | 200 | 1 | Unmeasurable | Unmeasurable |
| Comparative Example 2 | 7.2 | 7.2 | 1 | 6.0 | Unmeasurable |
| Comparative Example 3 | 7.2 | 16 | 2.2 | 5.0 | Unmeasurable |
| Comparative Example 4 | 200 | 7.2 | 0.04 | 2.0 | Unmeasurable |
| Comparative Example 5 | 40 | 200 | 5 | 1.3 | Unmeasurable |

In Table 1, the "deformation layer" means the first deformation layer and the second deformation layer.

The following can be seen from Table 1.

In a case where the 25% CLD value of the separation layer is 10 or more times the 25% CLD value of each of the first and second deformation layers, pressure and a shear force are detectable.

In order to improve detection sensitivity to both pressure and a shear force, it is preferable that the 25% CLD value of the separation layer be 50 or more times the 25% CLD value of each of the first and second deformation layers, the thickness of the separation layer be eight or more times the thickness of each of the first and second deformation layers, and the basis weight of the separation layer be 25 or more times the basis weight of each of the first and second deformation layers.

Although the embodiments and the modification examples of the present disclosure have been described in detail above, the present disclosure is not limited to the embodiments and the modification examples described above, and various modifications may be made on the basis of the technical concept of the present disclosure. For example, the configurations, methods, processes, shapes, materials, numerical values, and the like listed in the embodiments and the modification examples described above are only examples, and different configurations, methods, processes, shapes, materials, numerical values, and the like may be used, as necessary. The configurations, methods, processes, shapes, materials, numerical values, and the like of the embodiments and the modification examples described above may be combined with each other as long as they do not depart from the gist of the present disclosure. In the numerical ranges described in steps in the embodiments and the modification examples described above, the upper or lower limit of the numerical range of one step may be replaced by the upper or lower limit of the numerical range of another step. Unless otherwise specified, the materials illustrated in the embodiments and the modification examples described above may be used alone or in combination of two or more of them.

In addition, the present disclosure may adopt the following configurations.

(1)

A three-axis sensor including:

a first detection layer having a first surface, and a second surface on side opposite to the first surface, and including a first sensing section of a capacitive type;

a second detection layer having a first surface opposed to the second surface of the first detection layer, and including a second sensing section of the capacitive type;

a first electrically conductive layer provided to be opposed to the first surface of the first detection layer;

a second electrically conductive layer provided between the first detection layer and the second detection layer;

a separation layer provided between the first detection layer and the second electrically conductive layer to separate the first detection layer and the second electrically conductive layer from each other;

a first deformation layer that is provided between the first electrically conductive layer and the first detection layer, and is elastically deformed in accordance with pressure acting in a thickness direction of a sensor; and a second deformation layer that is provided between the second electrically conductive layer and the second detection layer, and is elastically deformed in accordance with pressure acting in the thickness direction of the sensor, in which a 25% CLD value of the separation layer is 10 or more times a 25% CLD value of the first deformation layer, and the 25% CLD value of the separation layer is 10 or more times a 25% CLD value of the second deformation layer.

(2)

The three-axis sensor according to (1), in which a thickness of the separation layer is twice or more a thickness of the first deformation layer, and the thickness of the separation layer is twice or more a thickness of the second deformation layer.

(3)

The three-axis sensor according to (1) or (2), in which a basis weight of the separation layer is 10 or more times a basis weight of the first deformation layer, and the basis weight of the separation layer is 10 or more times a basis weight of the second deformation layer.

(4)

The three-axis sensor according to any one of (1) to (3), in which the separation layer includes gel.

(5)

The three-axis sensor according to any one of (1) to (4), in which the separation layer is elastically deformed in an in-plane direction of the sensor by a shear force acting in an in-plane direction of the first surface.

(6)

The three-axis sensor according to any one of (1) to (5), in which each of the first detection layer and the second detection layer includes a first electrode, a second electrode, and a ground electrode, the first sensing section includes the first electrode and the second electrode included in the first detection layer, and the second sensing section includes the first electrode and the second electrode included in the second detection layer.

(7)

The three-axis sensor according to (6), in which the ground electrode of the first detection layer, the ground electrode of the second detection layer, the first electrically conductive layer, and the second electrically conductive layer are coupled to a reference potential.

(8)

The three-axis sensor according to any one of (1) to (7), in which the first electrically conductive layer and the second electrically conductive layer have at least one of flexibility or elasticity.

(9)

The three-axis sensor according to any one of (1) to (8), in which the first detection layer includes a plurality of the first sensing sections, the second detection layer includes a plurality of the second sensing sections, and an arrangement pitch of the second sensing sections is larger than an arrangement pitch of the first sensing sections, and an area of the second sensing section is larger than an area of the first sensing section.

(10)

The three-axis sensor according to any one of (1) to (9), in which the 25% CLD value of the second deformation layer is larger than the 25% CLD value of the first deformation layer.

(11)

The three-axis sensor according to any one of (1) to (10), further including a front surface layer provided on a front surface on side of the first electrically conductive layer, in which a coefficient of static friction of a front surface of the front surface layer is 1 or more.

(12)

The three-axis sensor according to any one of (1) to (11), in which an outer edge of the first detection layer is positioned inside an outer edge of the second detection layer.

(13)

The three-axis sensor according to any one of (1) to (12), in which the separation layer is divided into a plurality of sections in an in-plane direction of the sensor.

(14)

The three-axis sensor according to any one of (1) to (13), in which the second detection layer has a second surface on side opposite to the first surface of the second detection layer, and the three-axis sensor further includes a third electrically conductive layer provided to be opposed to the second surface of the second detection layer.

(15)

A three-axis sensor including:

a first detection layer having a first surface, and a second surface on side opposite to the first surface, and includes a first sensing section of a capacitive type;

a second detection layer having a first surface opposed to the first surface of the first detection layer, and a second surface on side opposite to the first surface, and including a second sensing section of the capacitive type;

a separation layer provided between the first detection layer and the second detection layer to separate the first detection layer and the second detection layer from each other;

a first electrically conductive layer provided to be opposed to the first surface of the first detection layer;

a second electrically conductive layer provided to be opposed to the second surface of the second detection layer;

a first deformation layer that is provided between the first electrically conductive layer and the first detection layer, and is elastically deformed in accordance with pressure acting in a thickness direction of a sensor; and a second deformation layer that is provided between the second electrically conductive layer and the second detection layer, and is elastically deformed in accordance with pressure acting in the thickness direction of the sensor, in which a 25% CLD value of the separation layer is 10 or more times a 25% CLD value of the first deformation layer, and the 25% CLD value of the separation layer is 10 or more times a 25% CLD value of the second deformation layer.

(16)

The three-axis sensor according to (15), in which the separation layer includes a third electrically conductive layer, a first separation layer provided between the first detection layer and the third electrically conductive layer to separate the first detection layer and the third electrically conductive layer from each other, and a second separation layer provided between the third electrically conductive layer and the second detection layer to separate the third electrically conductive layer and the second detection layer from each other.

(17)

The three-axis sensor according to (15), further including:

a fourth electrically conductive layer provided between the first detection laver and the separation layer:

a third deformation layer provided between the first detection layer and the fourth electrically conductive layer;

a fifth electrically conductive layer provided between the separation layer and the second detection layer; and a fourth deformation layer provided between the fifth electrically conductive layer and the second detection layer.

(18)

A sensor module including the three-axis sensor according to any one of (1) to (17).

(19)

An Electronic Apparatus Including:

the sensor module according to (18); and a computing section that computes a three-axis force on the basis of output signal distributions of the first sensing section and the second sensing section outputted from the sensor module.

(20)
The electronic apparatus according to (19), further including an exterior material having a curved surface, in which
the three-axis sensor is provided on the curved surface.
(21)
The three-axis sensor according to one of (1) to (17), further including a cover layer, in which
the first detection layer, the second detection layer, the first electrically conductive layer, the second electrically conductive layer, the separation layer, the first deformation layer, and the second deformation layer are included in a stacked body, and
at least a side surface of the stacked body is covered with the cover layer.
(22)
The three-axis sensor according to any one of (1) to (17), further including:
a first sealing section that is provided between the first electrically conductive layer and the first detection layer to surround a side surface of the first deformation layer; and
a second sealing section that is provided between the second electrically conductive layer and the second detection layer to surround a side surface of the second deformation layer.
(23)
A waterproof three-axis sensor including:
the three-axis sensor according to any one of (1) to (17); and
a cover layer with which at least a side surface of the three-axis sensor is covered.

REFERENCE SIGNS LIST

10: electronic apparatus
11: sensor module
12: host device
13A, 13B: controller IC
20, 20A, 20B, 50, 60, 70, 120: sensor
20S: sensing surface
21A, 21B, 21C, 51B, 61A, 61B, 71: detection layer
21A1: coupling section
21A2: coupling terminal
21AS1, 21BS1, 21CS1, 31S1, 51BS1, 61AS1, 61BS1, 71S1: first surface
21AS2, 21BS2, 21CS2, 31S2, 51BS2, 61AS2, 61BS2, 71S2: second surface
22, 25, 25A, 25B, 52, 62, 72: separation layer
23A, 23B, 53B, 63A, 63B, 73, 121: deformation layer
24A, 24B, 24C, 54B, 54C, 64A, 64B, 74A, 74B: electrically conductive layer
31: base
32, 33, 38: a plurality of routing wiring lines
34A, 34B: coverlay film
35A, 35B: adhesive layer
36: sense electrode
36A: coupling line
37: pulse electrode
37A: lead wiring line
37B: through hole
41: object
55: adhesive layer
60A: first sensor
60B: second sensor
81: front surface layer
82A: first stacked body
82B: second stacked body
83: cover layer
83A: structure
83B: protective layer
91: position detector
91A: projected section
91B: position sensor
91C: solder
101: cover layer
102: housing
111A, 111B: sealing section
122: exterior material
123: gap layer
DB1, DB2: output signal distribution
P1, P2: arrangement pitch
SE21, SE22, SE23, SE52, SE61, SE62, SE71: sensing section

The invention claimed is:
1. A three-axis sensor comprising:
a first detection layer having a first surface, and a second surface on side opposite to the first surface, and including a first sensing section of a capacitive type;
a second detection layer having a first surface opposed to the second surface of the first detection layer, and including a second sensing section of the capacitive type;
a first electrically conductive layer provided to be opposed to the first surface of the first detection layer;
a second electrically conductive layer provided between the first detection layer and the second detection layer;
a separation layer provided between the first detection layer and the second electrically conductive layer to separate the first detection layer and the second electrically conductive layer from each other;
a first deformation layer that is provided between the first electrically conductive layer and the first detection layer, and is elastically deformed in accordance with pressure acting in a thickness direction of a sensor; and
a second deformation layer that is provided between the second electrically conductive layer and the second detection layer, and is elastically deformed in accordance with pressure acting in the thickness direction of the sensor, wherein
a 25% CLD value of the separation layer is 10 or more times a 25% CLD value of the first deformation layer, and
the 25% CLD value of the separation layer is 10 or more times a 25% CLD value of the second deformation layer.
2. The three-axis sensor according to claim 1, wherein
a thickness of the separation layer is twice or more a thickness of the first deformation layer, and
the thickness of the separation layer is twice or more a thickness of the second deformation layer.
3. The three-axis sensor according to claim 1, wherein
a basis weight of the separation layer is 10 or more times a basis weight of the first deformation layer, and
the basis weight of the separation layer is 10 or more times a basis weight of the second deformation layer.
4. The three-axis sensor according to claim 1, wherein the separation layer includes gel.
5. The three-axis sensor according to claim 1, wherein the separation layer is elastically deformed in an in-plane direction of the sensor by a shear force acting in an in-plane direction of the first surface.

6. The three-axis sensor according to claim 1, wherein
each of the first detection layer and the second detection layer includes a first electrode, a second electrode, and a ground electrode,
the first sensing section includes the first electrode and the second electrode included in the first detection layer, and
the second sensing section includes the first electrode and the second electrode included in the second detection layer.

7. The three-axis sensor according to claim 6, wherein the ground electrode of the first detection layer, the ground electrode of the second detection layer, the first electrically conductive layer, and the second electrically conductive layer are coupled to a reference potential.

8. The three-axis sensor according to claim 1, wherein the first electrically conductive layer and the second electrically conductive layer have at least one of flexibility or elasticity.

9. The three-axis sensor according to claim 1, wherein
the first detection layer includes a plurality of the first sensing sections,
the second detection layer includes a plurality of the second sensing sections, and
an arrangement pitch of the second sensing sections is larger than an arrangement pitch of the first sensing sections, and an area of the second sensing section is larger than an area of the first sensing section.

10. The three-axis sensor according to claim 1, wherein the 25% CLD value of the second deformation layer is larger than the 25% CLD value of the first deformation layer.

11. The three-axis sensor according to claim 1, further comprising a front surface layer provided on a front surface on side of the first electrically conductive layer, wherein
a coefficient of static friction of a front surface of the front surface layer is 1 or more.

12. The three-axis sensor according to claim 1, wherein an outer edge of the first detection layer is positioned inside an outer edge of the second detection layer.

13. The three-axis sensor according to claim 1, wherein the separation layer is divided into a plurality of sections in an in-plane direction of the sensor.

14. The three-axis sensor according to claim 1, wherein
the second detection layer has a second surface on side opposite to the first surface of the second detection layer, and
the three-axis sensor further comprises a third electrically conductive layer provided to be opposed to the second surface of the second detection layer.

15. A sensor module comprising the three-axis sensor according to claim 1.

16. An electronic apparatus comprising:
the sensor module according to claim 15; and
a computing section that computes a three-axis force on a basis of output signal distributions of the first sensing section and the second sensing section outputted from the sensor module.

17. The electronic apparatus according to claim 16, further comprising an exterior material having a curved surface, wherein
the three-axis sensor is provided on the curved surface.

18. A three-axis sensor comprising:
a first detection layer having a first surface, and a second surface on side opposite to the first surface, and includes a first sensing section of a capacitive type;
a second detection layer having a first surface opposed to the first surface of the first detection layer, and a second surface on side opposite to the first surface, and including a second sensing section of the capacitive type;
a separation layer provided between the first detection layer and the second detection layer to separate the first detection layer and the second detection layer from each other;
a first electrically conductive layer provided to be opposed to the first surface of the first detection layer;
a second electrically conductive layer provided to be opposed to the second surface of the second detection layer;
a first deformation layer that is provided between the first electrically conductive layer and the first detection layer, and is elastically deformed in accordance with pressure acting in a thickness direction of a sensor; and
a second deformation layer that is provided between the second electrically conductive layer and the second detection layer, and is elastically deformed in accordance with pressure acting in the thickness direction of the sensor, wherein
a 25% CLD value of the separation layer is 10 or more times a 25% CLD value of the first deformation layer, and
the 25% CLD value of the separation layer is 10 or more times a 25% CLD value of the second deformation layer.

19. The three-axis sensor according to claim 18, wherein
the separation layer includes
a third electrically conductive layer,
a first separation layer provided between the first detection layer and the third electrically conductive layer to separate the first detection layer and the third electrically conductive layer from each other, and
a second separation layer provided between the third electrically conductive layer and the second detection layer to separate the third electrically conductive layer and the second detection layer from each other.

20. The three-axis sensor according to claim 18, further comprising:
a fourth electrically conductive layer provided between the first detection layer and the separation layer;
a third deformation layer provided between the first detection layer and the fourth electrically conductive layer;
a fifth electrically conductive layer provided between the separation layer and the second detection layer; and
a fourth deformation layer provided between the fifth electrically conductive layer and the second detection layer.

* * * * *